United States Patent
Liao et al.

(10) Patent No.: US 10,547,967 B2
(45) Date of Patent: Jan. 28, 2020

(54) INTEGRATED ASSISTIVE SYSTEM TO SUPPORT WAYFINDING AND SITUATION AWARENESS

(71) Applicant: Regents of the University of Minnesota, Minneapolis, MN (US)

(72) Inventors: Chen-Fu Liao, Minneapolis, MN (US); Max Donath, Minneapolis, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

(21) Appl. No.: 15/897,854

(22) Filed: Feb. 15, 2018

(65) Prior Publication Data

US 2018/0255426 A1   Sep. 6, 2018

Related U.S. Application Data

(60) Provisional application No. 62/460,460, filed on Feb. 17, 2017.

(51) Int. Cl.
| | | |
|---|---|---|
| H04W 4/021 | (2018.01) | |
| H04B 17/318 | (2015.01) | |
| H04W 8/00 | (2009.01) | |
| G08G 1/07 | (2006.01) | |
| G06F 3/0488 | (2013.01) | |
| H04W 4/80 | (2018.01) | |
| G06F 3/041 | (2006.01) | |

(52) U.S. Cl.
CPC ........ *H04W 4/021* (2013.01); *G06F 3/04883* (2013.01); *G08G 1/07* (2013.01); *H04B 17/318* (2015.01); *H04W 8/005* (2013.01); *G06F 3/041* (2013.01); *H04W 4/80* (2018.02)

(58) Field of Classification Search
CPC ...... G08B 21/0225; G01S 1/02; H04W 64/00; H04W 4/80
USPC ........... 342/417, 399; 455/456.1, 456.3, 420, 455/414.1, 418, 67.11, 41.2; 340/573.1, 340/539.13, 5.2; 370/331; 726/4
See application file for complete search history.

(56) References Cited

U.S. PATENT DOCUMENTS

2008/0120029 A1    5/2008  Zelek et al.
2012/0286997 A1*  11/2012  Lin ....................... G01S 5/0252
                                                                  342/451

(Continued)

OTHER PUBLICATIONS

Miyazaki et al., Pedestrian navigation system for mobile phones using panoramic landscape images, Proceedings of the 2005 Symposium on Applications and the Internet, 7 pages, 2006.

(Continued)

*Primary Examiner* — Kiet M Doan
(74) *Attorney, Agent, or Firm* — Westman, Champlin & Koehler, P.A.; Theodore M. Magee

(57) ABSTRACT

A method includes a mobile device receiving data from a first beacon in a plurality of beacons, wherein the data indicates a plurality signals strengths of signals received by the first beacon from the other beacons in the plurality of beacons. The mobile device uses multivariable regression based on the data received from the first beacon and signal strengths of signals received by the mobile device from the other beacons in the plurality of beacons to determine distances from the mobile device to the beacons. The mobile device determines a location of the mobile device based on the determined distances.

3 Claims, 51 Drawing Sheets

(56) References Cited

U.S. PATENT DOCUMENTS

| | | | | |
|---|---|---|---|---|
| 2016/0066155 | A1* | 3/2016 | Fan | G06F 3/0484 |
| | | | | 455/457 |
| 2016/0353463 | A1* | 12/2016 | Vigier | H04W 4/02 |
| 2017/0019769 | A1* | 1/2017 | Li | G01S 1/08 |
| 2017/0019788 | A1* | 1/2017 | Weksler | H04L 63/08 |
| 2017/0230801 | A1* | 8/2017 | Amsalem | H04W 4/043 |
| 2018/0124732 | A1* | 5/2018 | Kamthe | H04W 24/10 |
| 2018/0199190 | A1* | 7/2018 | Khan | H04L 63/0428 |

OTHER PUBLICATIONS

Navarro et al., Wi-Fi localization using RSSI fingerprinting, Digital Commons, California Polytechnic State University, http://digitalcommons.calpoly.edu/cpesp/17/, accessed 2016.

Oguejiofor et al., Outdoor localization system using RSSI measurement of wireless sensor network, International Journal of Innovative Technology and Exploring Engineering, vol. 2, Issue 2, 6 pages, 2013.

Pei et al., Using inquiry-based Bluetooth RSSI probability distributions for indoor positioning, Journal of Global Positioning Systems, vol. 9, No. 2, pp. 122-130, 2010.

Raghavan et al., Accurate mobile robot localization in indoor environments using Bluetooth, IEEE International Conference on Robotics and Automation, pp. 4391-4396, 2010.

Rose et al., Blind pedestrian body-worn navigational aid based on pedometry and smart intersection connectivity, Compendium of papers, Transportation Research Board 95th Annual Meeting, Washington D.C, 15 pages, 2016.

Ruppelt et al., High-precision and robust indoor localization based on foot-mounted inertial sensors, IEEE/ION PLANS, Savannah, GA, pp. 67-75, 2016.

Shin et al., Pedestrian dead reckoning system with phone location awareness algorithm, Proceedings of IEEE/ION PLANS, Indian Wells, CA, pp. 97-101, 2010.

Subhan et al., Indoor positioning in Bluetooth networks using fingerprinting and lateration approach, Information Science and Applications, International Conference, pp. 1-9, 2011.

Shubhan et al., Kalman filter-based hybrid indoor position estimation technique in Bluetooth networks, International Journal of Navigation and Observation, vol. 2013, Article ID 570964, 13 pages, 2013.

Subhan et al., Extended gradient RSSI predictor and filter for signal prediction and filtering in communication holes, Wireless Personal Communications, vol. 83, No. 1, pp. 297-314, 2015.

Tjan et al., Digital sign system for indoor wayfinding for the visually impaired, Computer Vision and Pattern Recognition, IEEE Computer Society Conference, San Diego, CA, 8 pages, 2005.

Ullman et al., Accommodating pedestrians with visual impairments in and around work zones, Journal of the Transportation Research Board, No. 2140, pp. 96-102, 2009.

Wang et al., Bluetooth indoor positioning using RSSI and least square estimation, IEEE, ICFCC, Shanghai, China, 5 pages, 2010.

Wang et al., Bluetooth positioning using RSSI and triangulation methods, IEEE 10th Consumer Communications and Networking Conference, 837-842, 2013.

Yousuf et al., The new frontier in accessible transportation, Public Roads, vol. 76, No. 2, 5 pages, http://www.fhwa.dot.gov/publications/publicroads/12septoct/02.cfm, 2012.

Zhao et al., Towards arbitrary placement of multi-sensors assisted mobile navigation system, presented at ION GNSS 2010 Conference, Portland, OR, 9 pages.

Zhang et al., A comprehensive study of Bluetooth fingerprinting-based algorithms for locatlization, IEEE 27th International Conference on Advanced Information Networking and Applications Workshops, pp. 300-305, 2013.

Zhou et al., Position measurement using Bluetooth, IEEE Transactions on Consumer Electronics, vol. 52, No. 2, pp. 555-558, 2006.

Zhu et al., RSSI based Bluetooth low energy indoor positioning, 2014 International Conference on Indoor Positioning and Indoor Navigation, Oct. 27-30, 2014, 9 pages.

Altini et al., Bluetooth indoor localization with multiple neural networks, 5th IEEE International Symposium on Wireless Pervasive Computing, pp. 295-300, 2010.

Aslan et al., The bum bag navigator (BBN): an advanced pedestrian navigation system, in Proceedings AIMS 2004, 5 pages.

Accessible Transportation Technologies Research Initiative (ATTRI), http://www.its.dot.gov/attri/, accessed May 2016.

Bageshware et al., A stochastic observability test for discrete-time Kalman filters, Journal of Guidance Control, and Dynamics, vol. 32, No. 4, 51 pages, 2009.

Bandara et al., Design and implementation of a bluetooth signal strength based location sensing system, IEEE Radio and Wireless Conference, 4 pages, Atlanta, GA, 2004.

Barlow et al., Blind pedestrians and the changing technology and geometry of signalized intersections: Safety, orientation, and independence, Journal of Visual Impairment & Blindness, vol. 99, No. 10, pp. 587-598, 2005.

Bebek et al., Personal navigation via high-resolution gait-corrected inertial measurement units, IEEE Transactions on Instrumentation and Measurement, vol. 59, No. 11, pp. 3018-3027, 2010.

Bentzen et al., Wayfinding system for transportation services. Remote infrared audible signage for transit stations, surface transit, and intersections, Transportation Research Record, Paper No. 99-8333, pp. 19-26, 1999.

Bentzen et al., Addressing barriers to blind pedestrians at signalized intersections, ITE Journal, pp. 32-35, 2000.

Bousbia-Salah et al., A navigation aid for blind people, Journal of Intelligent & Robotic Systems, vol. 64, pp. 387-400, 2011.

Coughlan et al., Crosswatch: a system for providing guidance to visually impaired travelers at traffic intersections, Journal of Assistive Technologies, vol. 7, No. 2, 15 pages, 2013.

D'Andrea, Practices and preferences among students who read braille and use assistive technology, Journal of Visual Impairment and Blindness, vol. 106, No. 10, 213 pages, 2012.

Dang et al., A virtual blind cane using a line laser-based vision system and an inertial measurement unit, Sensors, vol. 16, No. 95, 18 pages, 2016.

Denis et al., Perspectives on human spatial cognition: memory, navigation, and environmental learning, Psychological Research, vol. 71, pp. 235-239, 2007.

Diaz et al., Bluepass: an indoor Bluetooth-based localization system for mobile applications, IEEE Symposium on Computers and Communications, pp. 779-783, 2010.

Dong et al., Edge self-monitoring for wireless sensor networks, IEEE Transactions on Parallel and Distributed Systems, vol. 22, No. 3, pp. 514-527, 2011.

Dong et al., Evaluation of the Reliability of RSSI for Indoor Localization, Wireless Communications in Unusual and Confined Areas, 6 pages, 2012.

Fang et al., Robust wireless LAN location fingerprinting by SVD-based noise reduction, Proceedings of Communication Control Signal Process, pp. 295-298, 2008.

Fang et al., An enhanced device localization approach using mutual signal strength in cellular networks, IEEE Internet of Things Journal, vol. 2, No. 6, pp. 596-603, 2015.

FHWA, Designing sidewalks and trails for access, Part II of II: Best Practices Design Guide, US Department of Transportation, Federal Highway Administration, https://www.fhwa.dot.gov/environment/bicycle_pedestrian/publications/sidewalk2/, 3 pages, accessed May 2016.

FHWA, Manual on uniform traffic control beacons (MUTCD), http://mutcd.fhwa.dot.gov/pdfs/2009r1r2/pdf_index.htm, pp. 495-508, accessed May 2016.

Gartner et al., Location technologies for pedestrian navigation, GIS Development, http://www.citeulike.org/user/flashfonic/article/1804922, 3 pages, accessed May 2016.

Gaunet et al., Exploring the functional specifications of a localized wayfinding verbal aid for blind pedestrians: Simple and structured urban areas, Human-Computer Interaction, vol. 20, pp. 267-314, 2005.

(56) References Cited

OTHER PUBLICATIONS

Gaunet, Verbal guidance rules for a localized wayfinding aid intended for blind-pedestrians in urban areas, Universal Access in the Information Society, vol. 4, No. 4, pp. 338-353, 2006.
Giudice et al., Wayfinding with words: spatial learning and navigation using dynamically updated verbal descriptions, Psychological Research, vol. 71, pp. 347-358, 2007.
Golledge et al., Designing a personal guidance system to aid navigation without sight: progress on the GIS component, International Journal of Geographical Information Systems, vol. 5, No. 4, pp. 373-395, 1991.
Golledge et al., Stated preferences for components of a personal guidance system for nonvisual navigation, Journal of Visual Impairment and Blindness, vol. 98, No. 3, pp. 135-147, 2004.
Guth et al., Veering by blind pedestrians: individual differences and their implications for instruction, Journal of Visual Impairment & Blindness, vol. 89, No. 1, 20 pages, 95.
Harkey et al., Guidelines for accessible pedestrian signals, Final Report, NCHRP 117B, Transportation Research Board, http://onlinepubs.trb.org/onlinepubs/nchrp/nchrp_w117b.pdf, accessed 2016.
Havik et al., The effectiveness of verbal information provided by electronic travel aids for visually impaired persons, Journal of Visual Impairment & Blindness, pp. 624-637, 2011.
Hesch et al., Design and analysis of a portable indoor localization aid for the visually impaired, International Journal of Robotics Research, vol. 29, No. 11, 14 pages, 2010.
Hsin et al., Self-monitoring of wireless sensor networks, Computer Communications, vol. 29, pp. 462-476, 2006.
Johnson et al., A navigation aid for the blind using tactile-visual sensory substitution, Proceedings of the 28th IEEE EMBS annual International Conference, New York, NY, 4 pages, 2006.
Jones et al., ONTRACK: Dynamically adapting music playback to support navigation, Personal and Ubiquitous Computing, vol. 12, No. 7, pp. 513-525, 2008.
Kikawa et al., A presence-detection method using RSSI of a Bluetooth Device, International Journal of Informatics Society, vol. 2, No. 1, pp. 23-31, 2010.
Kim et al., Design of an auditory guidance system for the blind with signal transformation from stereo ultrasonic to binaural audio, Artificial Life and Robotics, vol. 4, No. 4, pp. 220.226, 2000.
Kim et al., Stereo camera based virtual cane system with identifiable distance tactile feedback for the blind, Sensors, vol. 14, pp. 10412-10431, 2014.
Katzky et al., Performance of blind and sighted persons on spatial tasks, Journal of Visual Impairment & Blindness, pp. 70-82, 1995.
Katzky et al., Spatial updating of self-position and orientation during real, imagined, and virtual locomotion, Psychological Science, Research Report, vol. 9, No. 4, pp. 293-298, 1998.
Kotanen et al., Experiments on local positioning with Bluetooth, Proceedings of the International Conference on Information Technology: Computers and Communications, 7 pages, 2003.
Legge et al., Indoor navigation by people with visual impairment using a digital sign system, Open Access, PLoS ONE vol. 8, Issue 10, 15 pages, 2013.
Li, User preferences, information transactions and location-based services: A study of urban pedestrian wayfinding, Computers, Environment and Urban Systems, vol. 30, No. 6, pp. 726-740, 2006.
Liao et al., Development of mobile accessible pedestrian signals (MAPS) for blind pedestrians at signalized intersections, Intelligent Transportation Systems, Final Report, 135 pages, 2010.
Liao, Using smartphone app to support visually impaired pedestrians at signalized intersection crossings, Transportation Research Record, No. 2393, pp. 12-20, 2013.
Liao, Development of a navigation system using smartphone and Bluetooth technologies to help the visually impaired navigate work zones safely (Report #2014-12), Final Report, Office of Transportation System Management, 86 pages, 2014.
Liao et al., Battery-efficient location change detection for Smartphone-based travel data collection: A Wi-Fi fingerprint approach, Compendium of papers, 95th Annual TRB meeting, Washington, D.C., 21 pages, 2016.
Loomis et al., Navigation system for the blind: Auditory display modes and guidance, Presence, vol. 7, No. 2, pp. 193-203, 1998.
Loomis et al., Navigating without vision: Basic and applied research, Optometry and Vision Science, vol. 78, No. 5, pp. 282-289, 2001.
Loomis et al., Personal guidance system for people with visual impairment: A comparison of spatial displays for route guidance, Journal of Visual Impairment & Blindness, vol. 99, No. 4, pp. 219-232, 2001.
Marston et al., Nonvisual route following with guidance from a simple haptic or auditory display, Journal of Visual Impairment & Blindness, pp. 203-211, 2007.

\* cited by examiner

```
with index_query as (
    select st_distance(geom, ST_SetSRID(ST_MakePoint(x, y), 4326))
    as distance from MAPS_Street_Shapefile
    order by geom <#>ST_SetSRID(ST_MakePoint(x, y), 4326)
    limit 20
) select * from index_query order by distance limit 4;
```

FIG. 5

INTEGRATED ASSISTIVE SYSTEM TO SUPPORT WAYFINDING AND SITUATION AWARENESS

CROSS-REFERENCE OF RELATED APPLICATION

The present application is based on and claims the benefit of U.S. provisional patent application Ser. No. 62/460,460, filed Feb. 17, 2017, the content of which is hereby incorporated by reference in its entirety.

The Government has an interest in the patent as a result of funding derived from U.S. DOT Grant # DTRT13-G-UTC35.

BACKGROUND

People with vision impairment usually use a white cane as their primary tool for wayfinding and obstacle detection. Environmental cues, though not always reliable, are used to support the decision making of the visually impaired at various levels of navigation and situation awareness. Due to differences in spatial perception as compared to sighted people, they often encounter physical as well as information barriers along a trip.

The discussion above is merely provided for general background information and is not intended to be used as an aid in determining the scope of the claimed subject matter. The claimed subject matter is not limited to implementations that solve any or all disadvantages noted in the background.

SUMMARY

A method includes a mobile device receiving data from a first beacon in a plurality of beacons, wherein the data indicates a plurality of signal strengths of signals received by the first beacon from the other beacons in the plurality of beacons. The mobile device uses multivariable regression based on the data received from the first beacon and signal strengths of signals received by the mobile device from the other beacons in the plurality of beacons to determine distances from the mobile device to the beacons. The mobile device determines a location of the mobile device based on the determined distances.

In accordance with a further embodiment, a method includes receiving from a mobile device respective signal strengths of signals received by a first beacon from a plurality of other beacons including from a second beacon. The received signal strength of the signal received by the first beacon from the second beacon is compared to a stored signal strength for signals received by the first beacon from the second beacon. The comparison is used to indicate that the second beacon may have been moved relative to the first beacon.

In a still further embodiment, a beacon includes processing circuits that cause the beacon to alternate between scanning for signals from neighboring beacons and acting as a server. When scanning for signals, the beacon stores the signal strength and an identifier of the corresponding neighboring beacon for each signal that is detected. When acting as a server, the beacon transmits the stored signal strength and identifier to the mobile device.

In a still further embodiment, a mobile device includes a touch-sensitive display for the visually impaired and a processor that executes an application such that when a user performs a gesture relative to the touch-sensitive display, the application transmits a signal to cause a pedestrian crossing request to be submitted to a traffic signal controller.

BRIEF DESCRIPTION OF THE DRAWINGS

FIG. 5 shows Pseudo Code for Index Assisted KNN Search.

DETAILED DESCRIPTION

Crossing Requests

Traffic signals found at the intersection of two roads or at the intersection of a walkway and a road are controlled by a traffic signal controller, which uses a combination of signals from vehicle sensors, signals from pedestrian crossing request buttons, and timing algorithms to set the color of the vehicle traffic signals for the various traffic flows at the intersection, and the "walk", "don't walk" signals for the various allowed pedestrian paths across the lanes of traffic at the intersection. At some intersections, a "walk" signal will not be provided for a particular pedestrian path unless a pedestrian crossing request button is selected.

Pedestrian crossing request buttons are typically mounted on a pole supporting one of the traffic signals or on a separate pole dedicated to crossing request buttons. For the visually impaired, finding the crossing request button can be difficult since there is no uniformity in where the crossing request button is located relative to the intersection.

Figure 1:
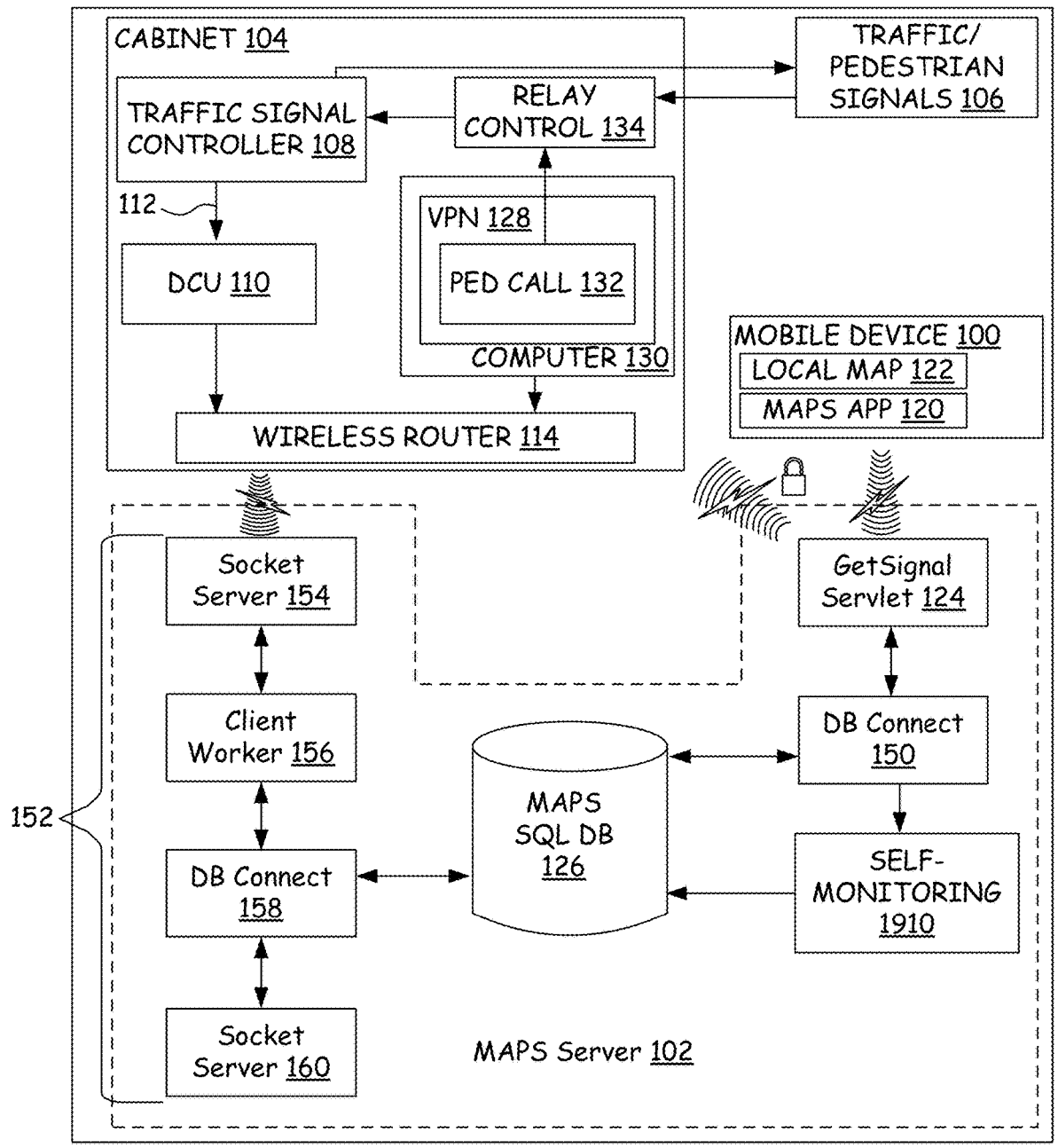
FIG. 1 is a block diagram of an assistive system in accordance with one embodiment.

In accordance with one embodiment, a system is provided that allows the visually impaired to make a crossing request to a traffic signal controller through a mobile device, such as a smartphone. FIG. 1 provides a block diagram of one embodiment of such a system.

In FIG. 1, the system is shown to include a mobile device 100, a Mobile Accessible Pedestrian System (MAPS) server 102, a traffic control cabinet 104, and traffic/pedestrian signals 106. Traffic/Pedestrian signals 106 include various traffic control lights such as red, yellow, green, and various arrows as well as various pedestrian signs such as "walk", "don't walk", a walk icon, a don't walk icon, and a time remaining to cross, for example. Traffic control cabinet 104 includes a traffic signal controller 108, which is in communication with and controls the various traffic lights and signs of traffic/pedestrian signals 106 based on an internal timing algorithm and inputs from vehicle sensors and pedestrian crossing request buttons.

When a visually impaired pedestrian reaches an intersection, they position themselves in a position to cross one of the roads at the intersection. The pedestrian then submits a gesture to their mobile device, such as a double-tap on the smartphone screen for example, to indicate that they want to cross the road. Upon receiving this gesture, a Mobile Accessible Pedestrian System (MAPS) application 120 on mobile device 100 retrieves information from a positioning system in the mobile device that indicates the location and orientation of the pedestrian.

In accordance with one embodiment, the positioning system includes Global Positioning System (GPS) receiver and a digital compass. The GPS receiver provides a current location of the mobile device and the digital compass indicates what direction the mobile device is pointing. The positioning system may alternatively use Assisted-GPS (A-GPS), which utilizes knowledge about the location of nearby Wi-Fi stations or nearby cellular towers, and signals received from those stations and towers to improve the accuracy of the position determination. The accuracy of a GPS based solution can be further improved if it receives Wide Area Augmentation System (WAAS) corrections or uses additional hardware, such as a differential GPS (DGPS) receiver, for acquiring positioning corrections.

Application 120 then uses the location and orientation information and information in a digital map 122 on mobile device 100 to identify the intersection that the pedestrian is positioned at, the roadway they wish to cross and the direction they will travel while crossing. In accordance with one embodiment, digital map 122 is a geospatial database that contains intersection geometry, street name, number of lanes, and direction information. The geospatial database is structured to identify each corner of an intersection and its neighboring nodes (intersection corners) in the vicinity.

Figure 2:
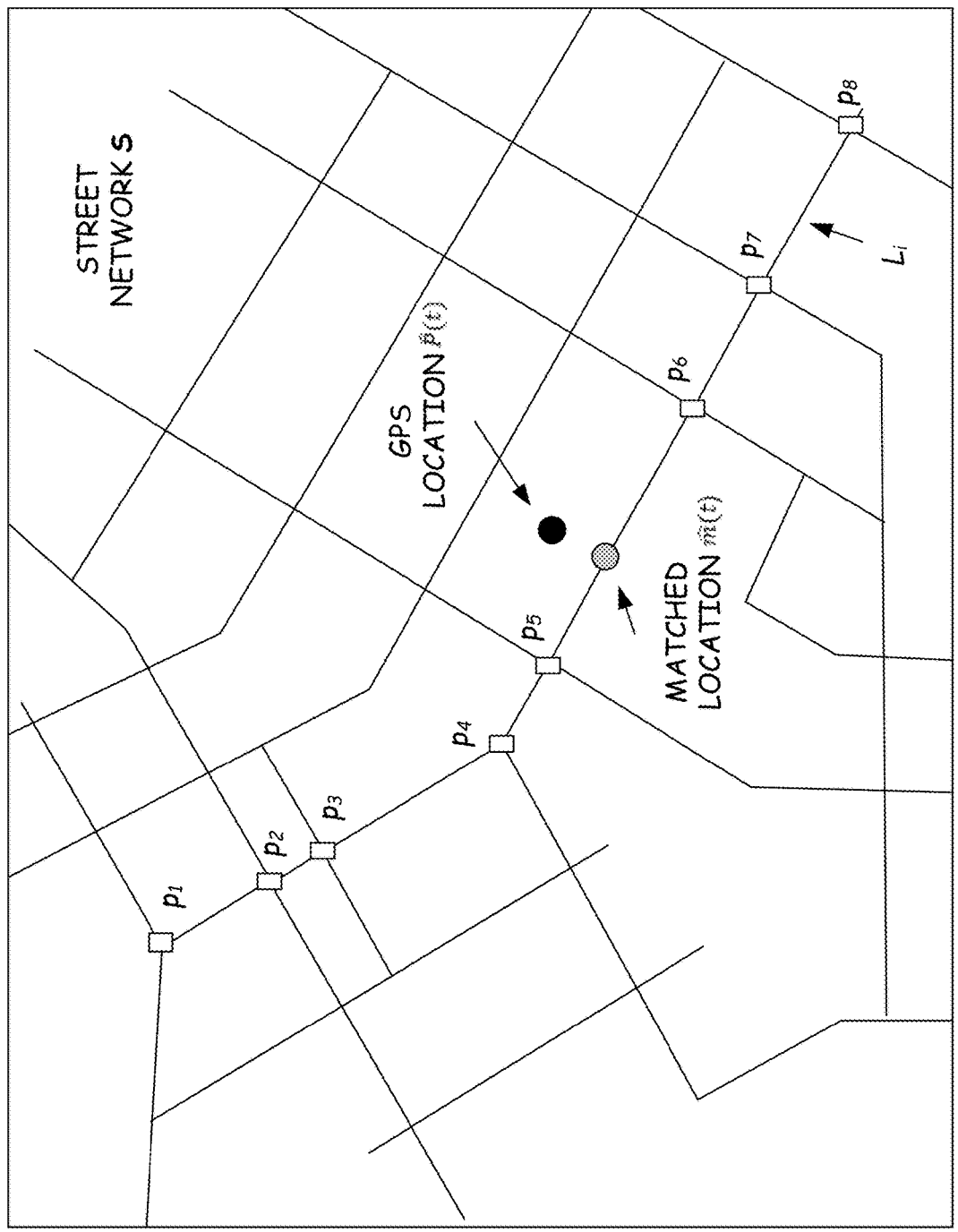
FIG. 2 is a map showing the relationship between a GPS location and a street network.

To identify the intersection that the pedestrian is standing at, the GPS longitude and latitude is projected onto a map and the closest position on a street is selected as the actual location of the person. As illustrated in FIG. 2, consider a map, S, consisting of a set of polylines (Li) in $R^2$, where $L_i \in S$. Each polyline consists of a finite series of points $(p_{1, 2}, \ldots, p_n)$. The objective of a map matching problem is to match a known measurement, for example, a GPS location, $\hat{p}(t)$, with a polyline ($L_i$) in the street network (S) and determine a location on $L_i$ that best corresponds to $\hat{p}(t)$.

The minimum distance between a GPS location, $\hat{p}(t)$, and a polyline (Li) can be expressed as equation (3-1). However, when GPS positioning inaccuracy is greater than the street network density, the map matching algorithm using the minimum norm distance becomes unreliable. Heading information, $\hat{h}(\hat{m}(t), \hat{m}(t-1))$, derived from previous location and previous route information can be incorporated to help determine a user's location in the network.

$$\text{Min}\{\text{Dist}[\hat{p}(t)\lambda_*p_j+(1-\lambda)p_{j+1}]\} \quad (3\text{-}1)$$

where, $$\lambda \in [0,1], p_j \in L_i, j = 1 \text{ to } n$$

Figure 3:
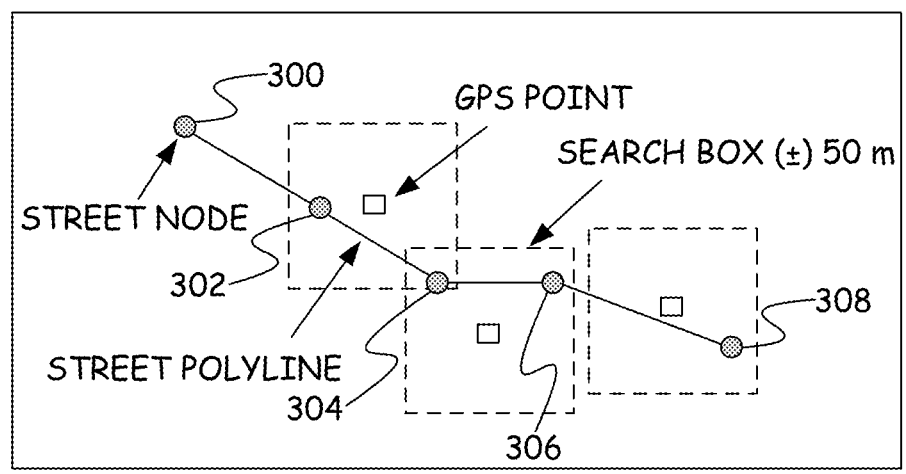
FIG. 3 provides an example of searching for street nodes.

Alternatively, a nearest neighbor search can be performed to identify the location of the pedestrian on the map. The nearest neighbor point search is begun by extracting all the point features (such as nodes 300, 302, 304, 306, and 308 as displayed in FIG. 3) from each roadway polyline in the geospatial database. All points in a polyline that are within 50 meters of a GPS point are included and stored for further consideration. As illustrated in FIG. 3, a bounding box of ±50 m is used for searching nodes of street polylines in the neighborhood of estimated GPS measurements. Only the roadway segments (polylines) within the 50 meters of a GPS points are considered by the 'select by location (SL)' procedure which was implemented in a script.

The nearest neighbor algorithm was initially used to find a solution for the traveling salesman problem (TSP). Given a dataset with n points and a query point, p, the nearest neighbor (NN) problem is to find the point closest to the query point. The nearest neighbor algorithm is defined as follows.

Given
A dataset q with n points,
A query point p, and
An initial minimum computed distance ($d_m$) is set to $\infty$
For each point $q_i$, where i=1 to n
Compute the distance between point p and $q_1$.
If the computed distance, $d_i$, is the less than minimum distance ($d_m$), then set $d_m = d_i$
Result is the value of minimum distance, $d_m$.

Figure 4:
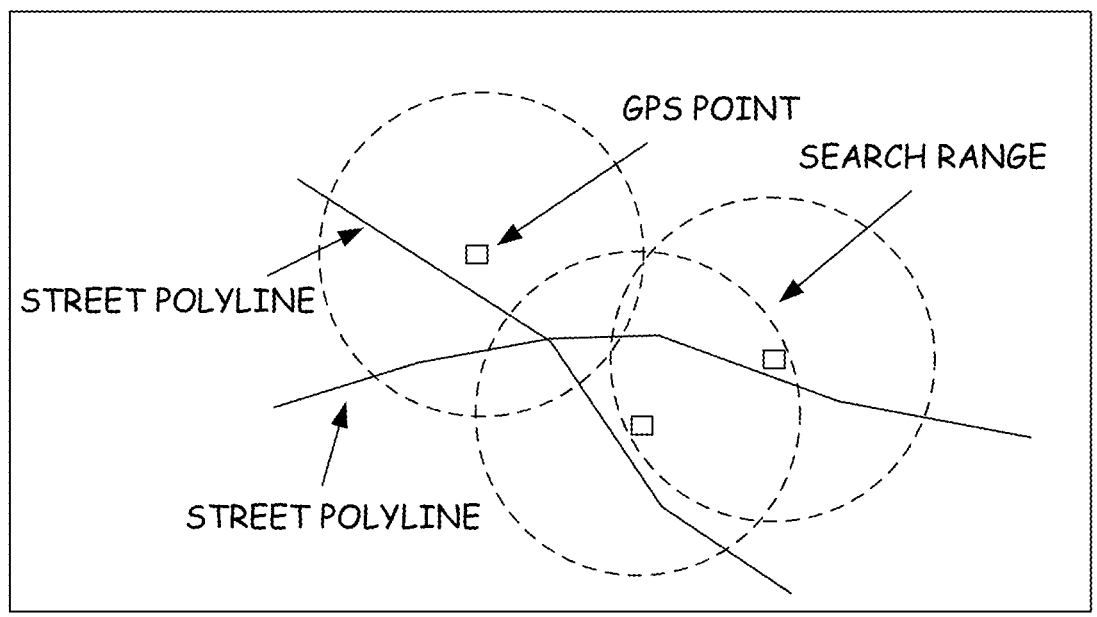
FIG. 4 is a graph showing an Index-Assisted K nearest Neighbors (KNN) Search.

A $K^{th}$ Nearest Neighbors (KNN) technique, supported by an informative and efficient index structure, has been used in spatial database applications to effectively reduce the search space. The KNN query can be applied to find k nearest objects in a two dimensional (latitude, longitude) roadway network. As illustrated in FIG. 4, evaluation of KNN queries for a large roadway network can be computationally expensive, because the distance is a function of the network paths connecting the points.

In accordance with one embodiment, a two-phase query was implemented based on a Generalized Search Tree (GiST) for supporting the KNN search in a PostGIS DB server. The GiST is a balanced, tree-structured access method that acts as a base template in which to implement arbitrary indexing schemes.

For point data, the bounding boxes are equivalent to the points, so the results are exact. But for any other geometry types (lines, polygons, etc.) the results are approximate. For example, the pseudo script displayed in FIG. 5 is used to find the 4 closest objects nearby a GPS point (x, y). The indexed query selects the 20 nearest objects by box distance, and the second query pulls the 10 actual closest from that set.

After identifying the intersection where the pedestrian is standing, application 120 transmits the intersection and roadway crossing information together with a pedestrian crossing request to MAPS server 102. In accordance with one embodiment, this information is transmitted over a wireless channel such as a cellular network, for example, to a servlet program 124 that handles communications with mobile device clients such as MAPS application 120.

Upon receiving the request and the intersection information, servlet 124 authenticates mobile device 100. User authentication can be implemented using the smartphone International Mobile Equipment Identity (IMEI) number with password protection, for example. Servlet 124 then updates a pushbutton request flag in a database 126, and uses the intersection information to identify a Virtual Private Network (VPN) 128 operating on a computer 130 installed in cabinet 104 of the intersection. In particular, the identifier for the intersection is used to identify the VPN that has been assigned to the intersection. The objective of using VPN is to ensure system security so that no unauthorized users or systems can trigger the pushbutton request remotely. Thus, in such embodiments, mobile device 100 is not permitted to make pedestrian crossing request directly to cabinet 104.

Servlet 124 then sends a request to a pedestrian call program 132 executing within VPN 128 through a wireless router/modem 114 in cabinet 104. In the request, servlet 124 indicates the roadway that the pedestrian wants to cross and the direction that they want to cross. Pedestrian call 132 uses this information to identify a crossing request relay assigned to the roadway and crossing direction and sends a command to a relay control 134 to close the relay. In accordance with one embodiment, relay control 134 is a USB relay digital output device that receives commands through a USB connection to computer 130 and controls signal paths for the various crossing request buttons of the intersection. One example of such a device is a USB IO manufactured by ACCES I/O Products, Inc. The closing of the relay is detected by traffic signal controller 108 and is functionally equivalent to a person pressing a mechanical pushbutton at the intersection to make a pedestrian crossing request.

Figure 6:
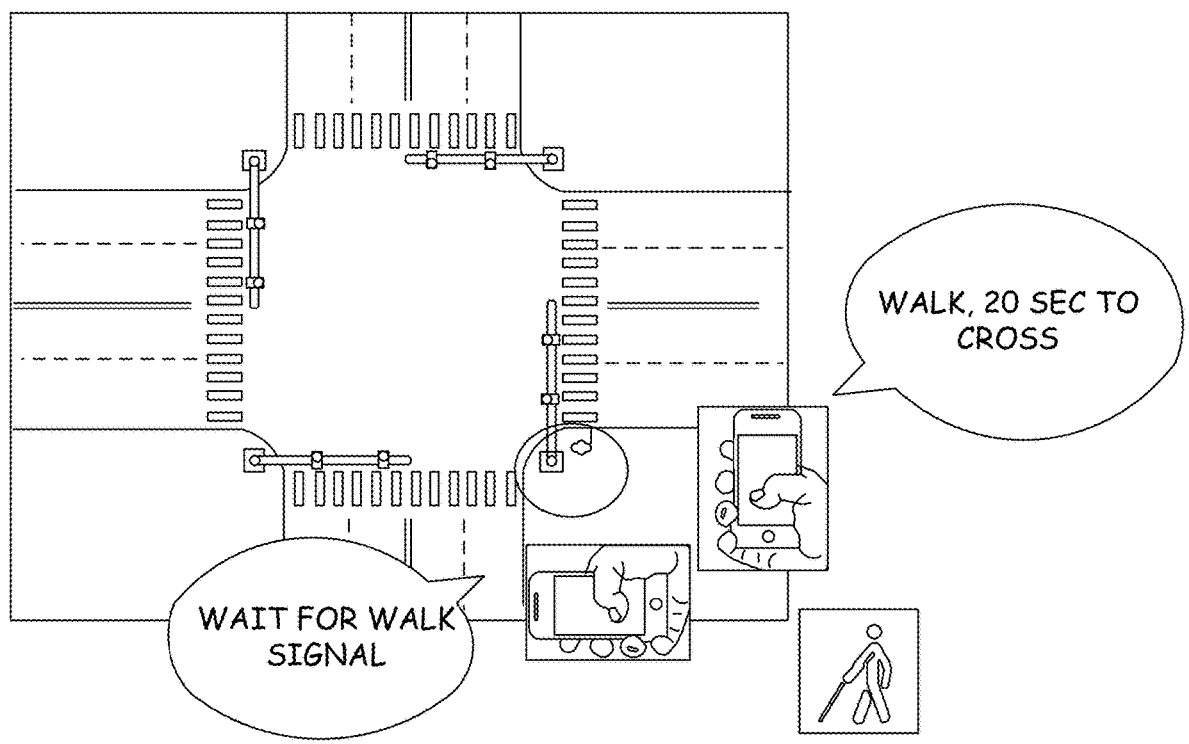
FIG. 6 shows announcements made after a crossing call request is made.

After sending the pedestrian crossing request, MAPS application 120 sends repeated requests for the current signal state to servlet 124 of maps server 102. Servlet 124 uses a database connection 150 to read the signal state from database 126 and returns the current signal state to MAPS application 120. MAPS application 120 then provides speech feedback to the blind pedestrians by using a Text-To-Speech (TTS) interface on mobile device 100 For example, as illustrated in FIG. 6, mobile device 100 announces "Please wait for walk signal" every 5 seconds. As soon as the walk sign is on, the smartphone vibrates for 1 second to alert the user and then announces, "walk sign is on, 20 seconds left". When it's about 5 seconds before the ending of a walk phase, the smartphone vibrates again then announce "5 seconds left" to alert the user to finish the crossing soon. The objective of the vibration alert is to raise the user's awareness of the upcoming audible messages.

MAPS server 102 obtains the signal state of each intersection using a network socket listener program 152 that processes signal data from a data collection unit (DCU) 110, which communicates to MAPS server 102 through wireless router/modem 114. As illustrated in FIG. 1, socket listener 152 includes a socket server 154, a client worker 156, a database connection 158 and signal data classes 160, and is a multi-thread application designed to handle traffic signal data and pedestrian walk phases from multiple intersections.

Data Collection Unit (DCU) 110 obtains signal timing (what time a phase changes) and phasing information (the states of the various traffic signals) from traffic signal controller 108 through a Synchronous Data Link Control (SDLC) interface, i.e., Bus Interface Unit (BIU) 112.

In order to provide real-time signal and timing data, DCU 110 continuously monitors the states of signal phases, pedestrian walk sign, and loop detectors. When there is a signal phase or a detector state change, the DCU transmits a text string to socket server 154.

For example, a detector state change from on (high) to off (low) will generate the following output string.
$D010408122300031478114000000328!
Where,
$: Leading character
Intersection ID: 0104
Date: 08-12-23 (yy-mm-dd) Time: 00:03:14.781
Detector ID: 14

Detector occupied duration: 328 ms
!: End of data string

In accordance with one embodiment, no data is sent to socket server 154 when the detector status changes from off to on (i.e., rising edge).

As another example, a signal state change generates the following string output string.

$S010112030214154070004G00015000!

Where, $: Leading character
Intersection ID: 0101
Date: 12-03-02 (yy-mm-dd)
Time: 14:15:40.700
Phase: 04
Status: G (i.e., green)
Duration: 15000 ms
!: End of data string When the data is sent, the status changes from green to red/yellow. The signal string sent is the information about the previous signal state and not the current one. For example, the above string indicates that G was the previous signal state that lasted for 15000 milliseconds. The phase numbers are 1 to 8 for the normal signal phases and 9-12 for the pedestrian phases.

The various signal statuses sent by the DCU are
R=>Previous signal was R and current signal is G
G=>Previous signal was G and current signal is Y
Y=>Previous signal was Y and current signal is R
F=>Previous signal was a flashing state.

In accordance with one embodiment, database 126 contains the following tables that store intersection spatial information, signal timing and pushbutton requests.

The 'intx_geo' table stores the intersection geometry information such as street name and number of lanes. It contains the 'Intx_ID', 'Walk_Phase', 'Walk_Time', 'Cross_Street', and 'Num_Lane' data fields. A sample of the intersection geometry table is listed in Table 1. The walk_phase is the phase number for pedestrian crossing in a direction.

TABLE 1

Sample List of Intersection Geometry Table

| Intx_ID | Walk_Phase | Walk_Time | Cross_Street | Num_Lane |
|---|---|---|---|---|
| 101 | 2 | 24 | Rhode Island Avenue | 4 |
| 101 | 4 | 15 | Highway 55 | 7 |

TABLE 1-continued

Sample List of Intersection Geometry Table

| Intx_ID | Walk_Phase | Walk_Time | Cross_Street | Num_Lane |
|---|---|---|---|---|
| 101 | 6 | 24 | Rhode Island Avenue | 4 |
| 101 | 8 | 15 | Highway 55 | 7 |

The 'pushbutton_request' table stores the pushbutton_request from smartphone client when double-tap is performed. It contains the 'Intx_ID', 'Phase', and 'PB_State' data fields. A sample of the pushbutton request table is listed in Table 2. When a user submits a request to cross, the PB_state will be set to 1.

TABLE 2

Sample List of Pushbutton State

| Intx_ID | Phase | PB_State |
|---|---|---|
| 101 | 2 | 0 |
| 101 | 4 | 0 |
| 101 | 6 | 0 |
| 101 | 8 | 0 |

The 'signal_state' table stores the real-time signal data from DCU. It contains the 'data_ID', 'Date', 'TimeStamp', 'Signal_State', 'Time_Left', and 'Intx_ID' data fields.

TABLE 3

Sample List of Signal State

| ID | Date | TimeStamp | Signal_State | Time_Left | Intx_ID |
|---|---|---|---|---|---|
| 377309 | Feb. 1, 2016 | 20160201142760.000 | 72 | 359.185 | 101 |
| 395613 | Feb. 3, 2016 | 20160203135940.075 | 136 | 42.031 | 101 |
| 395614 | Feb. 3, 2016 | 20160203140029.981 | 0 | 49.907 | 101 |
| 395615 | Feb. 3, 2016 | 20160203140035.966 | 34 | 59.391 | 101 |
| 395616 | Feb. 3, 2016 | 20160203140100.606 | 0 | 24.641 | 101 |
| 395617 | Feb. 3, 2016 | 20160203140108.137 | 72 | 145.063 | 101 |
| 395618 | Feb. 3, 2016 | 20160203140118.091 | 0 | 9.953 | 101 |
| 395619 | Feb. 3, 2016 | 20160203140124.106 | 33 | 19.453 | 101 |
| 395620 | Feb. 3, 2016 | 20160203140131.184 | 32 | 7.078 | 101 |
| 395621 | Feb. 3, 2016 | 20160203140136.216 | 34 | 31.562 | 101 |
| 395622 | Feb. 3, 2016 | 20160203140156.278 | 0 | 32.172 | 101 |

Figure 7:
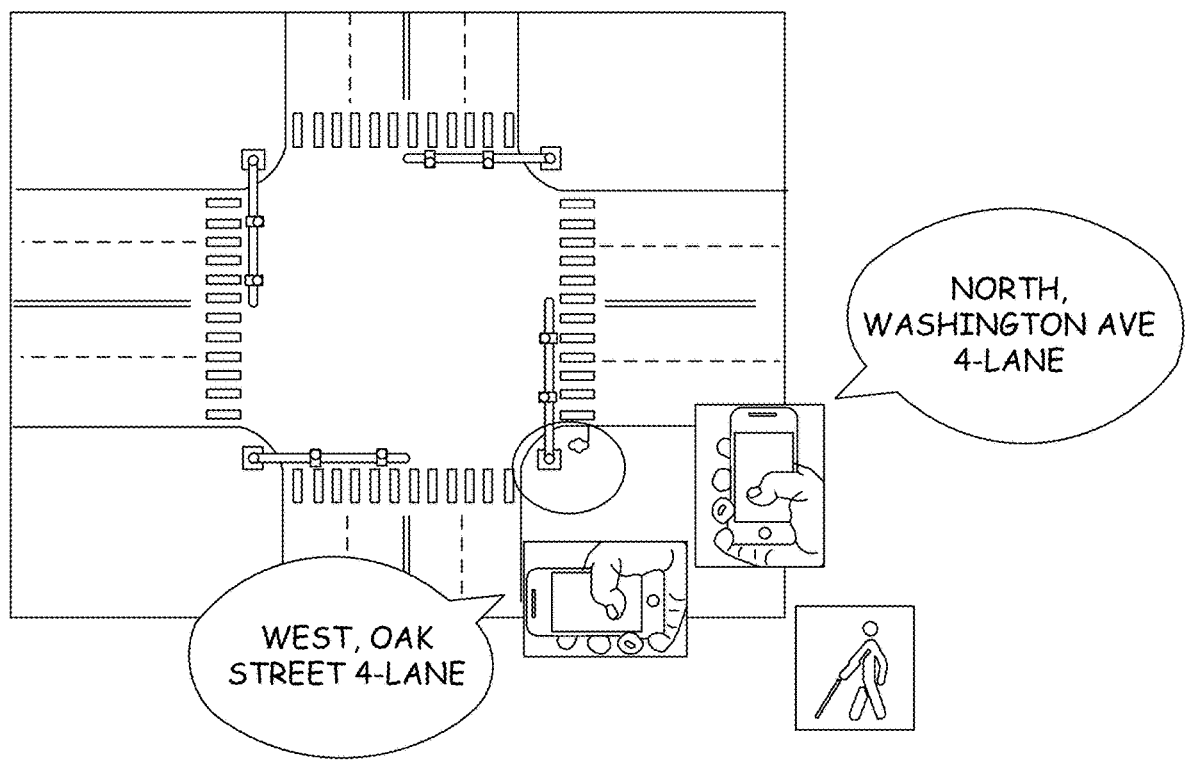
FIG. 7 shows announcements made that provide street information.

In accordance with a further embodiment, MAPS application 120 also supports a second input gesture that allows the user to request intersection geometry information, such as street name, direction, and number of lanes, at a corner of an intersection, as shown in FIG. 7. In accordance with one embodiment, this second gesture is a single-tap of the display screen. In response to the gesture, MAPS application 120 accesses local map 122 to retrieve the intersection geometry information and then converts that information in to an audio signal using TTS. For example, MAPS application 120 announces "You are pointing to east, Harvard street 2-lanes", when the user is pointing the phone in the east direction and executes a single tap of the screen. MAPS application 120 also provides direction information if there is no crossing information in the direction the user is pointed. For example, it announces, "No information for the north-east. Please turn for data", when the mobile device is pointed toward the middle of an intersection and a single tap is executed.

Experiments

Experiments were performed at two signalized intersections. The experiments involving 18 visually impaired participants and an orientation and mobility (O&M) instructor were conducted at two signalized intersections. After 15-minutes of training, the participants were asked to perform street crossing task twice at one of the two intersections with and without using the MAPS system. A set objective performance measures were developed to validate system performance.

Figure 8:
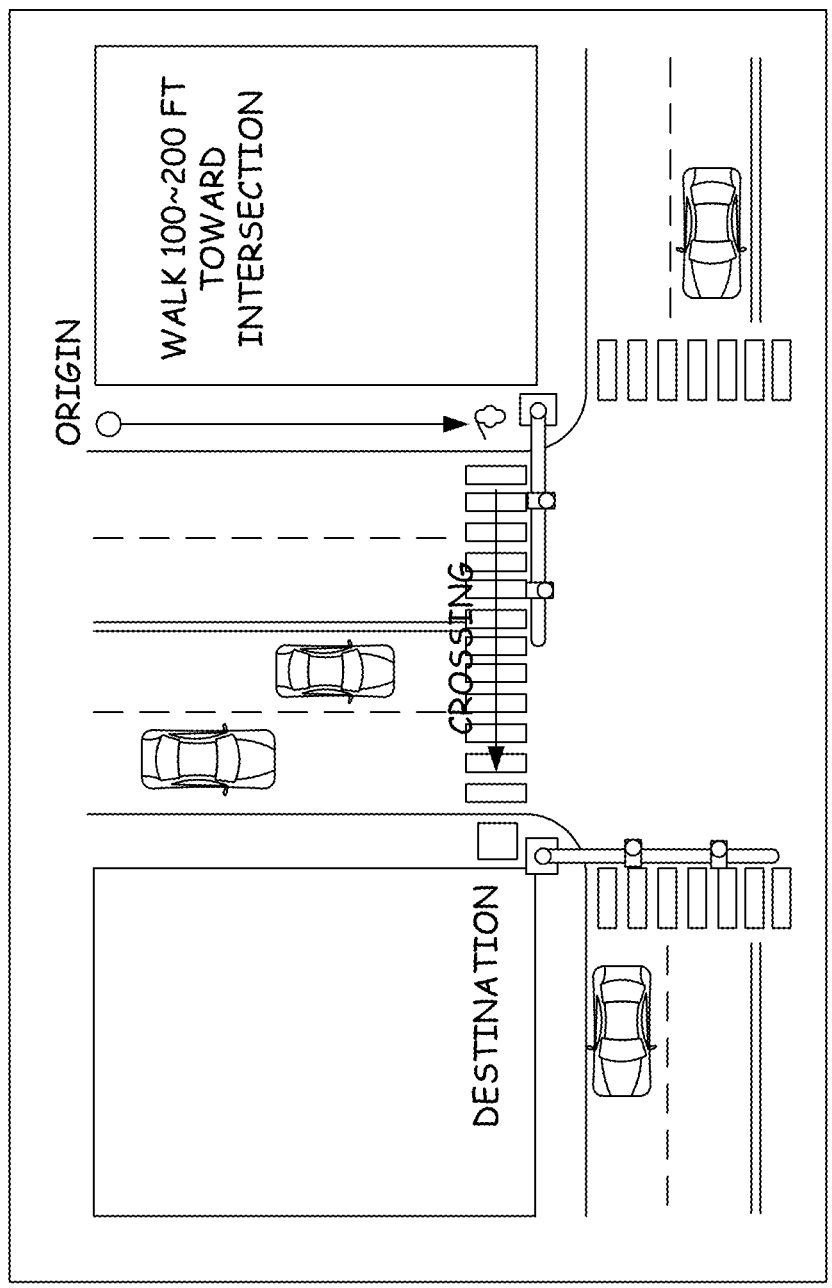
FIG. 8 provides a schematic of a test environment.

A traffic data collection unit (DCU) and a relay TO module were installed in the controller cabinet of an intersection to provide signal information to smartphone users. At each location, participants were asked to perform crossing tasks. For each crossing task, a certified O&M specialist brought each participant to a starting point which was located about 100 to 200 feet (north) away from the north-east corner of the intersection, as illustrated in FIG. 8. Visually impaired participants were asked to travel along the sidewalk using their own navigational skills to reach the corner of the intersection. While at the intersection, the visually impaired participants need to find and use the pushbutton to request a pedestrian walk signal or use the smartphone based pedestrian signal beacon to determine when it is possible to cross. Participants then cross the street that is perpendicular to the sidewalk they just travelled and arrive at the other side of street.

The pre and post-experiment questionnaires covered the following topics:

Vision,
Ability to orient by themselves,
Experience crossing intersections,
Usage and opinions of the new technology,
Opinions of the smartphone based pedestrian crossing system,
Usability and acceptance of the smartphone based pedestrian signal system,
Trust of the smartphone based traffic information system, and
Other demographic information.

Each experiment session lasted approximately 30 minutes for each participant. The field experiment was recorded using video and audio equipment to effectively capture participants' responses and intersection crossing performance, for example, walking speed, in-position time and time to step into crosswalk when walk sign is on.

Intersection #1 is located at Winnetka Avenue and Golden Valley Road. Winnetka Avenue consists of four lanes and is aligned in the north-south direction. Golden Valley Road consists of four lanes and is aligned in the east-west direction. An Accessible Pedestrian Signals (APS) system manufactured by Polara Engineering, Inc. is installed at this location and provides an audio tone to locate the push button and audio indications of the "walk" "don't walk" status.

The O&M specialist walked with each participant across Winnetka Ave. from the NW to the NE corner and turned north, then walked about 100 feet to the starting point. The O&M instructor had each individual turn 180 degrees around and said to the participants the following.

"This is the starting point and you are facing South, Winnetka is your parallel street. Please walk straight about 100 feet to the intersection, locate the pushbutton, turn right and cross Winnetka Ave., a 5-lane street. It is a print letter L shaped route. The APS will say, 'The walk sign is now on to cross Winnetka Ave.' Any questions? Let me know when you're ready and I will give a signal to the camera man. OK. Go when you are ready."

If participants were veering and in danger, the O&M instructor spoke to them "walk to your right, do you hear your traffic?" For some clients, the instructor tapped their right shoulder and said, "Walk this way". In a situation where 2 cars blocked the crosswalk, the O&M instructor said, "there is a car in the crosswalk either go around in the front of the car or the back, another car is in the cross walk", when the participant encountered the second car in the crosswalk.

No messages were communicated to participants when participants pressed the wrong pushbutton.

Intersection #2, two blocks away from the first intersection is located at Rhode Island Avenue and Highway 55 (Olson Memorial Highway). Rhode Island Avenue consists of four lanes and is aligned in the north-south direction. Highway 55 consists of seven lanes and is aligned in the east-west direction. This intersection does not have an APS system installed. Pedestrians are asked to use the existing pushbutton or the MAPS to cross the intersection.

Crossing without MAPS

The O&M specialist walked with the subject approx. ⅛ mile to a starting point 238 feet north of the NE corner of Rhode Island Ave. and Highway 55. Then the following instruction was given to the participants.

"This is the starting point and you are facing south, Rhode Island Ave. is your parallel street. Please walk straight about 200 feet to the intersection, locate the pushbutton, turn right and cross Rhode Island Ave., which is a 4-lane street. It is like a print letter L shaped route. Pushing the button will give you enough time to cross, it will not talk. Any questions? Let me know when you're ready. I will give a signal to the camera man. OK. Go when you are ready."

For most participants, the O&M specialist told them the pushbutton is located behind the wheel chair ramp and to their left.

Crossing with MAPS

The O&M specialist walked approximately ⅛ mile to the starting point 238 feet north of the NE corner of Rhode Island Ave. and Highway 55. The O&M specialist said the following to the participants.

"This is the same starting point and you are facing south, Rhode Island Ave. is your parallel street. Please walk straight about 200 feet to the intersection and line up to cross turning right, use the smartphone tap once to locate the direction west, adjust the phone direction if you do not hear the correct geometry information such as 'facing west, Rhode Island Ave. 4 lanes.' Next, double tap the smartphone and listen for the phone to speak, 'walk sign is now on to cross Rhode Island Ave.' Use your hearing, useable vision and O&M techniques to cross safely. Use the phone as secondary information. Any questions? Let me know when you're ready. I will give a signal to the camera man. OK. Go when you are ready."

The O&M specialist only had to cue a few participants when they were veering out of the crosswalk. The O&M specialist tapped the shoulder of participants on the left side to signal walk to the left or on the right shoulder to walk towards the right.

Objective measures were obtained by extracting data from the video data. Video data collected at both intersections were analyzed to compare participants' travel speed on a sidewalk versus a crosswalk, and the time to step into the crosswalk. Table 4 lists the objective measures for both intersections. Crossing task #1 was performed at intersection

1 where APS is present. Crossing task #2 and #3 were conducted at intersection #2 where no APS is installed. The participants were asked to perform crossing task #2 using the existing pushbutton at the intersection, and task #3 using our MAPS app.

As listed in Table 4, the crosswalk length at intersection #1 (APS equipped) and #2 are 94 ft (28.7 meter) and 111 ft (33.8 meter), respectively. The APS pushbutton is required at intersection #1, operated under actuated signal control plan, to call for a walk signal. At intersection #2, participants were asked to use the existing pushbutton to request crossing in the first task and then to use our beacon for a crossing request and assistance for the second crossing. The participants' travel speed on the sidewalk (2.5 mph) was slower (statistically significant) than the speed on the crosswalk (2.9 mph) using a paired t-test (p-value=0.01). However, the travel speed difference on the sidewalk and crosswalk at intersection #2 was not significant using a paired t-test (p-value=0.06 and 0.77, respectively).

On average, the visually impaired participants spent 7.8 seconds (SD 6.1 sec) in searching for the APS pushbutton at intersection #1. The standard deviation is large, mostly due to the difference of participant's personal mobility skill to locate the pushbutton by listening to the beeping tone from the APS. At intersection #2, where no pushbutton-locating tone is available for visually impaired pedestrians, the participants spent 26.6 seconds (SD 56.5 sec), on average, to locate the regular pushbutton. The pushbutton stub pole at intersection #2 is located behind the ADA ramp; it took several participants more than 2 minutes to locate the pushbutton. Four participants veered outside the crosswalk path at both intersections. The research team also observed that guide dogs can easily be distracted by people close by and thus guided the visually impaired participant toward a person nearby. For example, two guide dogs led the participants toward the camera man during the last quarter of the crosswalk instead of staying on the crosswalk path.

TABLE 4

Comparison of Objective Measures for 3 Experiments

|  | Intersection ID | | |
| --- | --- | --- | --- |
|  | 1 | 2 | |
| Intersection Type | APS | NON APS | |
| Crosswalk Length, meter (ft) | 28.7 (94) | 33.8 (111) | |
| Crossing Task # | 1 | 2 | 3 |
| Sample Size (N) | 18 | 17 | 17 |
| Ped Call | APS Push-button | Regular Push-button | MAPS |
| Crosswalk Speed, Average (mph) | 2.91 | 3.36 | 3.33 |
| Crosswalk Speed, SD (mph) | 0.44 | 0.82 | 0.60 |
| Sidewalk Speed, Average (mph) | 2.54 | 3.11 | 3.30 |
| Sidewalk Speed, SD (mph) | 0.37 | 0.54 | 0.64 |
| Sidewalk vs. Crosswalk Speed Comparisons (p-value) | 0.01 | 0.06 | 0.77 |
| Pushbutton Search Time, Average (sec) | 7.8 | 26.6 | NA |
| Pushbutton Search Time, SD (sec) | 6.1 | 56.5 | NA |
| In-Position Time, Average (sec) | 14.5 | 34.8 | 9.8 |
| In-Position Time, SD (sec) | 7.5 | 57.2 | 6.7 |
| Time to Step Into Crosswalk, Average (sec) | 3.1 | 7.1 | 5.5 |
| Time to step Into Crosswalk, SD (sec) | 1.5 | 4.7 | 3.2 |
| Number of Veers Outside Crosswalk | 4 | 2 | 4 |

The in-position time is defined as the time duration from the participant passing the pushbutton pole to a waiting location at the beginning of the crosswalk. The average in-position time at intersection #1 was 14.5 sec (SD 7.5 sec). At intersection #2, the average in-position using MAPS system was 9.8 sec (SD 6.7 sec) as compared to the average in-position time of 34.8 sec (SD 57.2) while using a regular pushbutton. The MAPS allows the visually impaired users to orient and position themselves in the ready position at the beginning of a crosswalk when there is no need to find the pushbutton.

At intersection #1, the average time to step into the crosswalk is about 3.1 seconds (SD 1.5 sec). At intersection #2 without the APS beacon, participants wait about 7.1 seconds (SD 4.7 sec) to step into the crosswalk. Without audio notification of when the walk sign is on, the visually impaired pedestrians usually have to listen to the sound from parallel traffic surges. In the experiment, the participants were asked to cross in parallel to Highway 55, which is a busy state highway with Annual Average Daily Traffic (AADT) of 33,500 vehicles. The average time for the visually impaired participants to step into the crosswalk at a non-APS equipped intersection will vary depending on the parallel traffic because the visually impaired travelers were taught to judge possible time to cross by listening to the traffic.

When using the MAPS system, the participants waited on average about 5.5 seconds (SD 3.2 sec) to step into the crosswalk. This is about 2.5 seconds longer than the time observed at an APS intersection (#1). The extra two seconds is probably incurred by, (a) the data communication between the smartphone app and the signal controller (1 sec), and (b) the announcement duration of 'walk sign is ON, xx seconds left' from the smartphone app when users were trying to listen and understand what the message meant before stepping into the crosswalk. In addition, the visually impaired pedestrians are more familiar with existing APS system and messages. The APS system has a simple message type (e.g., 'wait' or 'walk') that may contribute to the shorter step-into-crosswalk responding time. We expect the average step-into-crosswalk time will drop when users are more familiar with the MAPS system.

Using Bluetooth Beacons

As noted above, using GPS alone can produce unreliable location identification. In particular, GPS-based positioning can result in the wrong corner of an intersection being identified.

Figure 9:
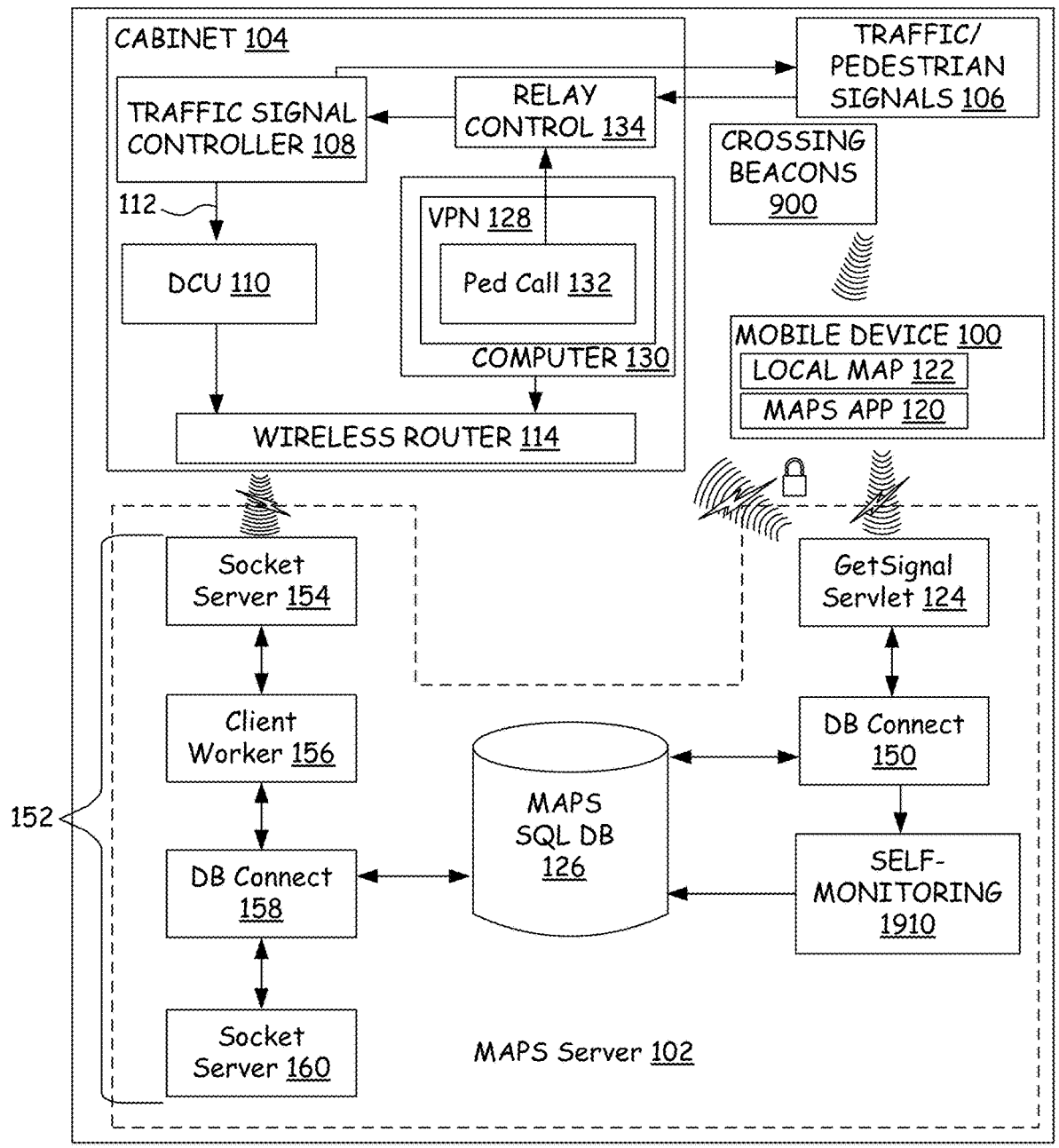
FIG. 9 provides a block diagram of an assistive system including intersection beacons.

In one embodiment, this problem is overcome by utilizing crossing Bluetooth beacons or modules mounted near each corner of an intersection. FIG. 9 shows the system of FIG. 1 augmented with a crossing Bluetooth beacon 900. Each Bluetooth module has a unique media Access Control (MAC) address that it periodically broadcasts using the Bluetooth communication protocol. Mobile device 100 includes a Bluetooth communication system that is able to receive and decode the MAC addresses of all Bluetooth modules within range of mobile device 100. In one embodiment, the range of the Bluetooth modules detected by mobile device 100 is limited such that mobile device 100 is only able to decode the MAC address of the Bluetooth module at the same corner of the intersection as mobile device 100. The unique MAC address of the Bluetooth model detected by mobile device 100 is then used as a primary key in the digital map database for determining a user's location when the GPS location is unreliable.

In one particular embodiment, tables in local map 122 associate the MAC address with a particular intersection and possible crossing directions. For example, the intersection crossing phase table defines the crosswalk direction and its associated signal phase as indexed by the MAC address (Bluetooth ID) of the Bluetooth module at that corner of the intersection. A sample of the intersection crossing phase table is listed in Table 5. When there is no crosswalk in a direction, the phase number is assigned to −1.

TABLE 5

Sample List of Intersection Crossing Phase

| Intx_ID | Bluetooth_ID | Dir | Phase |
|---|---|---|---|
| 101 | 00:12:F3:0B:49:4C | East | −1 |
| 101 | 00:12:F3:0B:49:4C | North | 8 |
| 101 | 00:12:F3:0B:49:4C | South | −1 |
| 101 | 00:12:F3:0B:49:4C | West | 2 |
| 101 | 00:12:F3:0B:49:A6 | East | 2 |
| 101 | 00:12:F3:0B:49:A6 | North | 4 |
| 101 | 00:12:F3:0B:49:A6 | South | −1 |
| 101 | 00:12:F3:0B:49:A6 | West | −1 |
| 101 | 00:12:F3:0B:4A:11 | East | −1 |
| 101 | 00:12:F3:0B:4A:11 | North | −1 |
| 101 | 00:12:F3:0B:4A:11 | South | 8 |
| 101 | 00:12:F3:0B:4A:11 | West | 6 |
| 101 | 00:12:F3:0B:4A:27 | East | 6 |
| 101 | 00:12:F3:0B:4A:27 | North | −1 |
| 101 | 00:12:F3:0B:4A:27 | South | 4 |
| 101 | 00:12:F3:0B:4A:27 | West | −1 |

In accordance with one embodiment, the data structure of local map 122 is based on a relational tree structure in which each node contains spatial relations and descriptions of its neighboring nodes.

Figure 10:
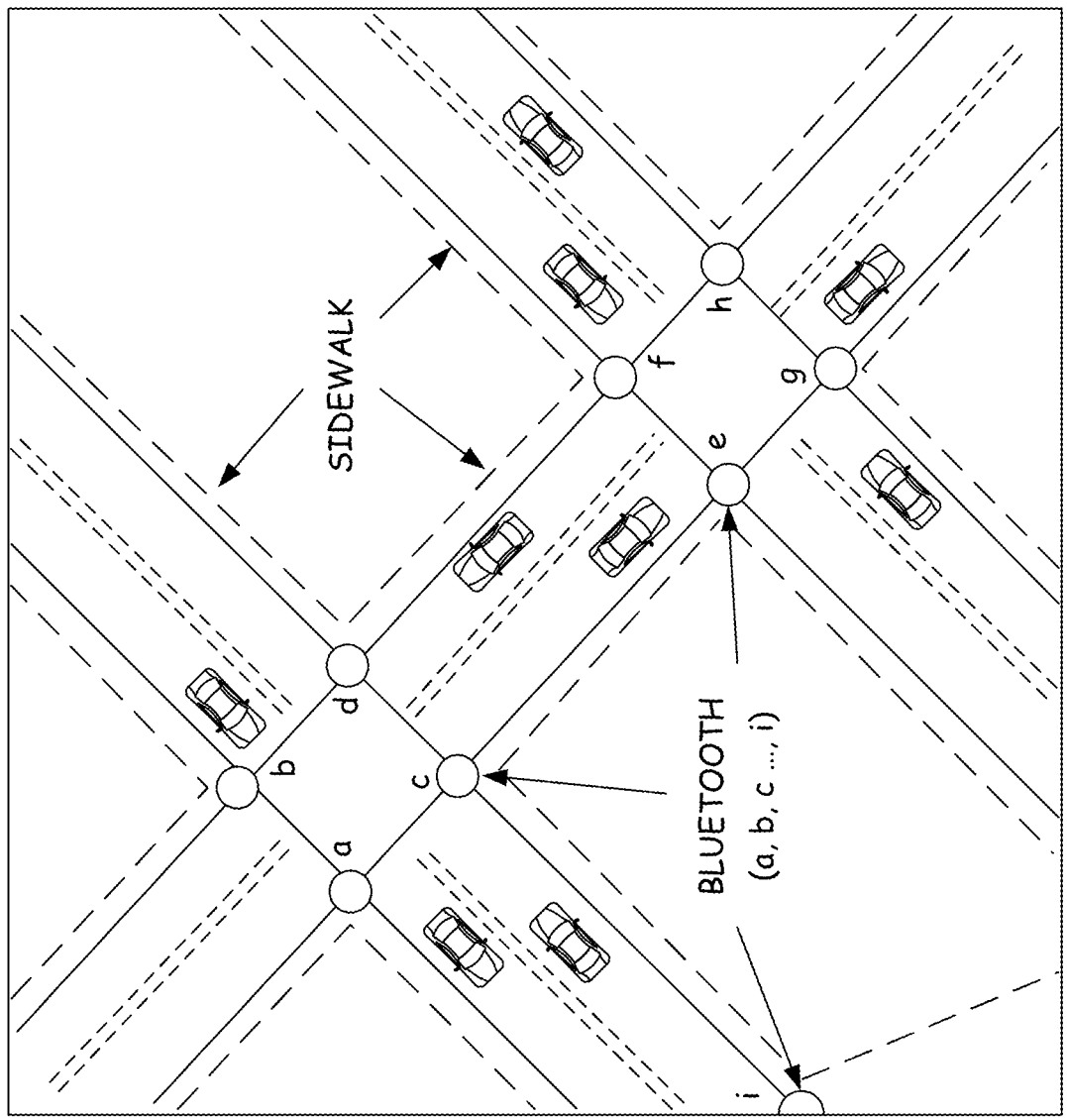
FIG. 10 provides a map showing the location of a collection of Bluetooth beacons.
Figure 11:
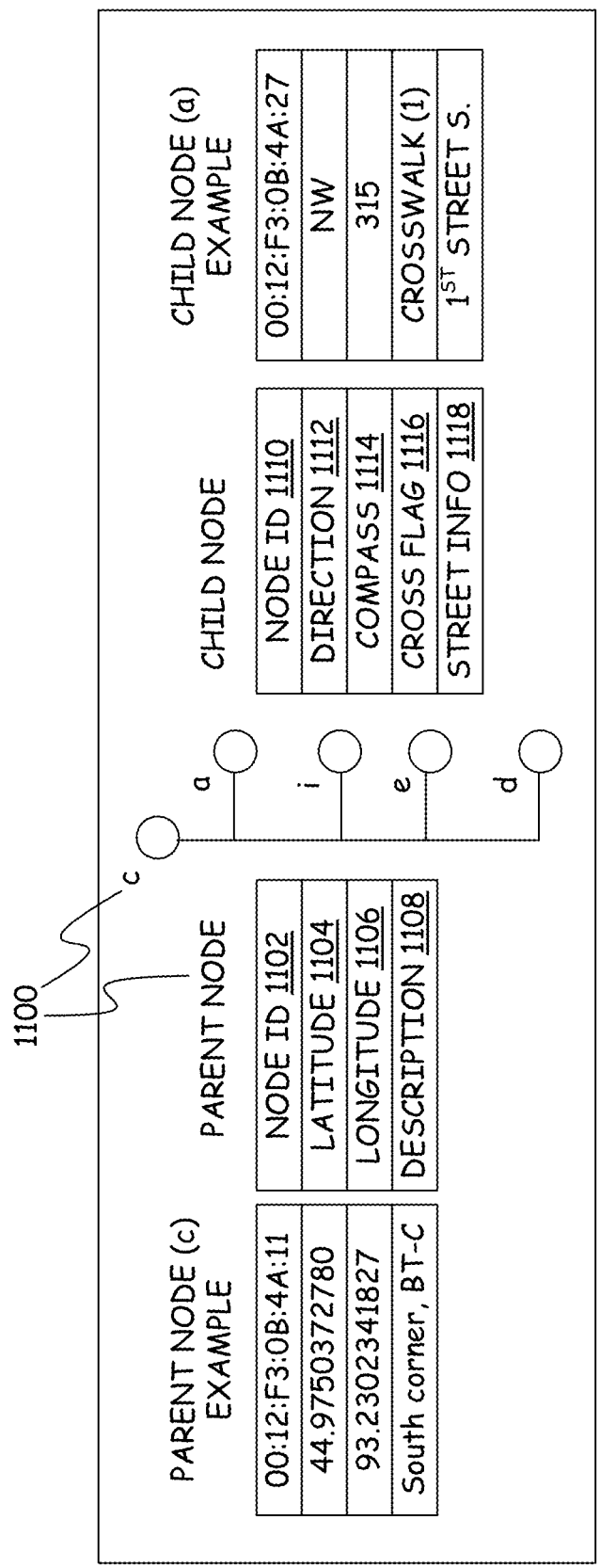
FIG. 11 provides a diagram of a data structure in accordance with one embodiment.

FIG. 10 depicts a simple street network with Bluetooth identifiers placed at corners of intersections. For example, node c is connected to 4 other nodes (a, i, e & d) in the network. The relationship is described as follows in FIG. 11.

Parent node (c) 1100: Node ID 1102, Latitude 1104, Longitude 1106, Node Description 1108.

Child nodes (a, i, e & d): each having respective Node ID 1110, Direction 1112, Compass 1114, Crosswalk Flag 1116 and Street Info 1118.

Node IDs 1102, 1110 provide a unique identifier for the Bluetooth beacon, Latitude 1104 and Longitude 1106 provide the position of the Bluetooth beacon, Node Description 1108 provides a textual description of the location of the Bluetooth beacon, Direction 1112 provides a textual description of the direction from the parent node to the child node, Compass 1114 provides the compass angle (0/360 degrees pointing North) of the vector from the parent node to the child node, Crosswalk Flag 1116 indicates whether there is a crosswalk between the parent node and the child node, and Street Info 1118 provides a textual description of the street that must be crossed to travel to the child node from the parent node.

Distracted Pedestrians and Other Applications

The Governors Highway Safety Association (GHSA) estimates that the number of pedestrian fatalities jumped by 10 percent in 2015, a year-to-year increase that comes after a 19 percent increase from 2009 to 2014. A recent survey by the Pew Research Center found that Americans have grown comfortable using their mobile devices in public and 77% of the survey participants said it was okay to use mobile devices while walking down the street. The primary reasons more people on foot are dying track closely with trends in three areas: economic, social and electronic. According to the statistics from GHSA, California, Florida, Texas and New York accounted for 42 percent of the overall pedestrian deaths. California ranked first with 347 pedestrian fatalities. Based on the number killed per 100,000 residents, Florida has the highest pedestrian fatality rate of 1.35.

According to a national study, over 1,500 pedestrians were estimated to be treated in emergency rooms in 2010 for injuries related to using a mobile phone while walking. The number of such injuries has more than doubled since 2005. The study found that young people aged 16 to 25 were most likely to be injured as distracted pedestrians. They expect the problem of distracted pedestrians is likely to get worse. A new term 'pedtextrian' is frequently used to describe a person who is texting while walking, and is completely unmindful of things happening around them. A lawmaker from New Jersey proposed to fine pedestrians and/or bicyclists who use electronic devices that are not hands-free on public roads.

Figure 12:
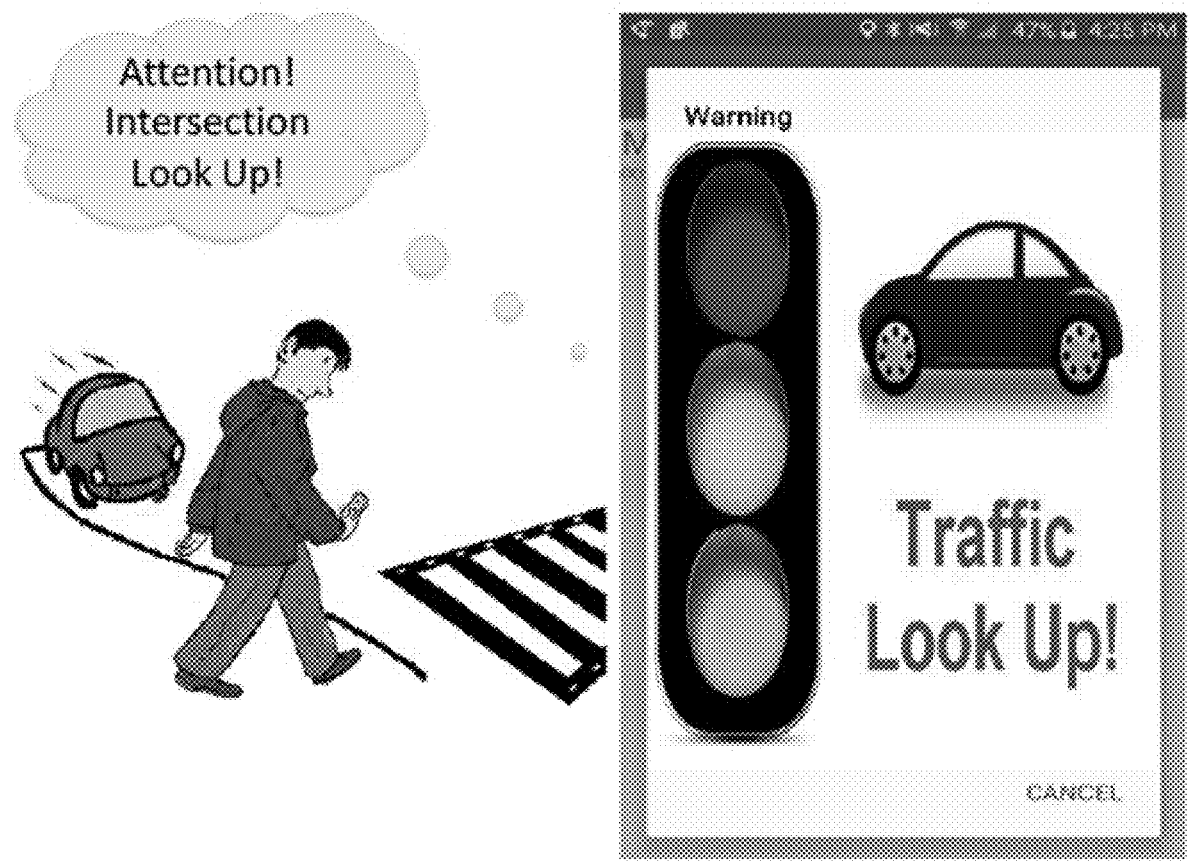
FIG. 12 provides an example of a user interface to alert a distracted pedestrian near an intersection.

In addition to providing the walk signal at signalized intersections, the MAPS system can incorporate several other potential applications, such as alerting distracted pedestrians (FIG. 12) while they are approaching an intersection and providing transit stop and arrival information.

When a Bluetooth tag is placed at a corner of an intersection, the MAPS application can detect the tag and display an audio and visual alert to the pedestrian while they are texting and walking toward a crosswalk. Similarly, when a Bluetooth tag is attached to a transit stop, the MAPS application automatically detects the tag and provides corresponding bus route or arrival information to the visually impaired. A similar approach can be applied to inform pedestrians regarding the entrance of a skyway, subway, or business building.

Work Zones

Visually impaired pedestrians also find it difficult to navigate sidewalks when work zones block a sidewalk and the pedestrian must follow a different route. In particular, visually impaired pedestrians cannot determine the length or nature of the work zone or easily identify an alternative route around the work zone.

Figure 13:
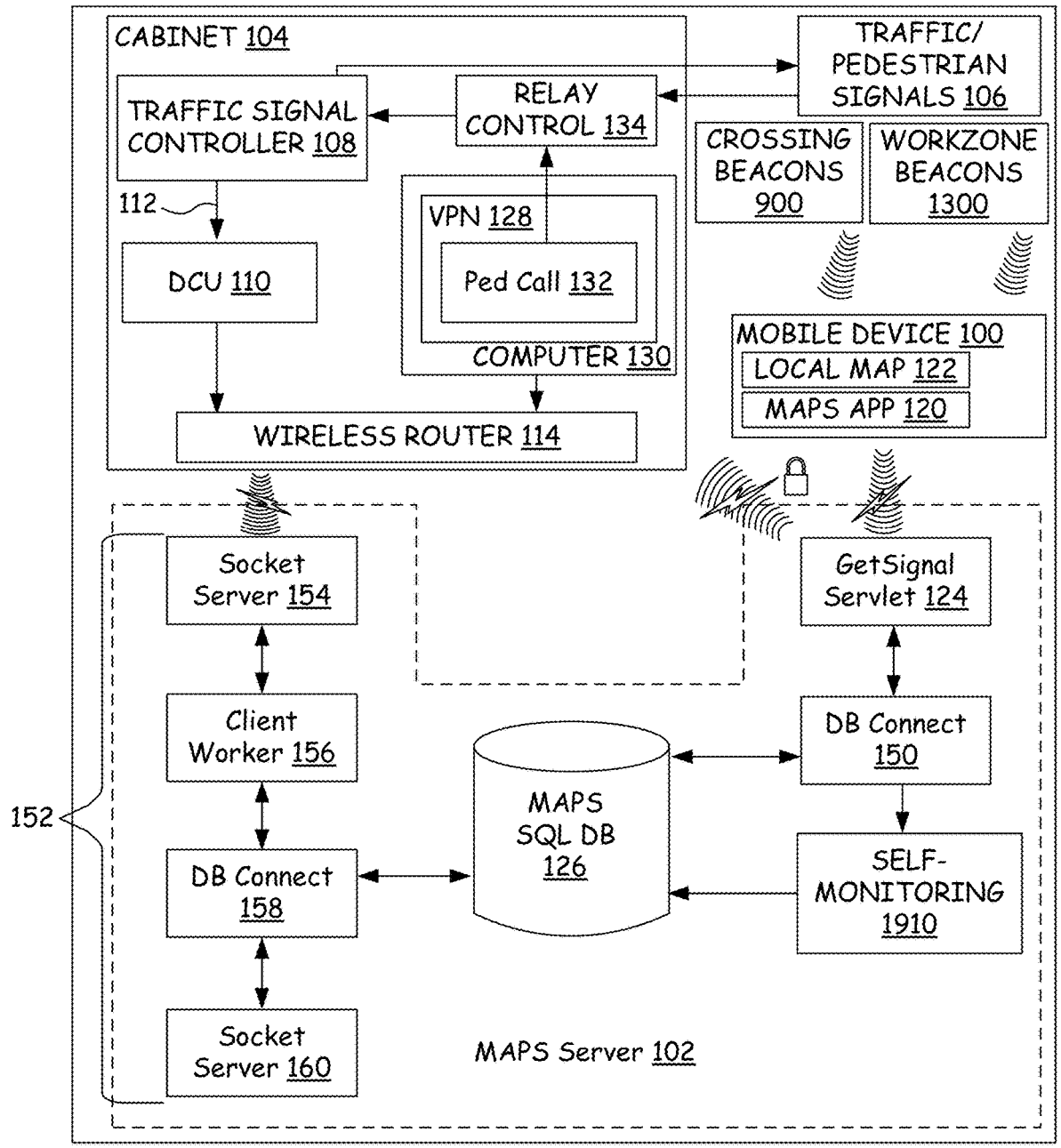
FIG. 13 is a block diagram of an assistive system including intersection beacons and work zone beacons.

In accordance with one embodiment, Bluetooth beacons are placed at the perimeter of work zones and are used to provide work zone information to visually impaired pedestrians including directions for navigating around the work zone. FIG. 13 provides a block diagram of the system of FIG. 9 augmented with work zone Bluetooth beacons 1300.

When a work zone Bluetooth beacon 1300 is detected by mobile device 100, MAPS application 120 alerts the user with a brief vibration (about 1-sec) and announces corresponding audible messages through the TTS interface. Users can perform a single-tap on the screen of mobile device 100 to repeat the audible message, if desired.

Figure 14:
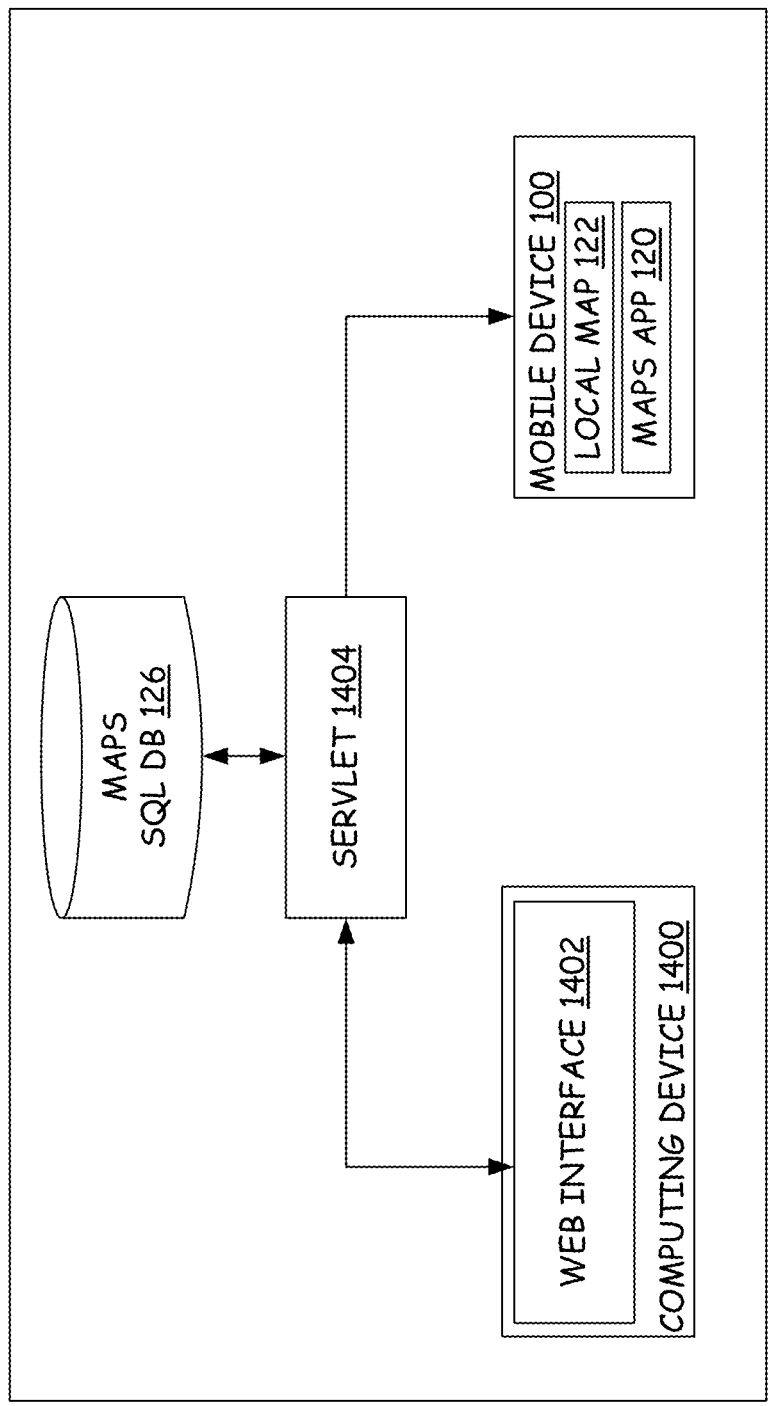
FIG. 14 is a block diagram of an architecture for uploading and downloading beacon information.

The general geometry information of a work zone area, location of Bluetooth beacons, and associated advisory messages can be readily programmed and uploaded to the spatial database 126 of MAPS server 102 through a web interface 1402 and a servlet 1404 of a 3-tier Bluetooth database system of FIG. 14. Web interface 1402 allows engineers to deploy accessible audible messages around a work zone quickly and easily using a computing device 1400.

In order to reduce the effort required in the placing the Bluetooth beacons at an intersection or a construction site, a mobile device application was implemented to provide web interface 1402 for project engineers at a construction site. This application allows the engineers to enter the messages at the location where a Bluetooth beacon is installed. The application can determine current latitude/longitude location of the mobile device, scan for Bluetooth beacons in the vicinity, and then list identified Bluetooth MAC IDs. After the field engineer selects one of the Bluetooth MAC IDs, they enter the corresponding text messages and an authorized security code. The application then submits the data to MAPS database 126 through servlet 1404 running on server 102. This approach allows construction workers to easily reconfigure the sidewalk closure in a work zone as needed and to update the audible messages in a timely manner.

Servlet 1404 handles the data transaction between the client applications (web interface 1402 and MAPS application 120) and MAPS SQL database 126. MAPS application 120 downloads spatial data from MAPS Server 102 for the area that is within +/−7 miles (or +/−0.1 degree in both latitudinal and longitudinal directions) when MAPS application 120 is started initially. MAPS application 120 continuously monitors the current GPS location and updates local map 122 every 15 minutes. MAPS application 120 always has +/−7 miles of reference data coverage in case the cellular network is temporary out of service. Currently, MAPS application 120 uses relatively small memory space (in the range of 100 KB to 200 KB) on mobile device 100.

An example of a data scheme implemented in local map 122 is shown in Table 6 and includes a message ID, latitude/longitude, message direction, Bluetooth ID location, three Description fields and an advisory message. The message ID is the MAC address of the Bluetooth module and the latitude/longitude data fields store the latitude and longitude location of the Bluetooth module. The message direction describes which direction of a traveler is affected by the construction. The Bluetooth ID location verbally describes the location where the Bluetooth beacon is installed. Description 1, 2 and 3 inform travelers regarding the nature, location, and the scale of the work zone. The advisory message contains the suggested bypassing information for the travelers. The following audible message is used as an example based on the standardized message format described above.

Attention southbound Lyndale Avenue pedestrians. [Attention] You are at the southwest corner of Lyndale and Franklin. [User location] West sidewalk closed from 22nd to 26th street for 4 blocks. [What & where] Cross Lyndale for more bypassing message. [Advisory action]

TABLE 6

Data Scheme of Spatial Database for Pedestrian Work Zones

| Data Field | Sample Value |
| --- | --- |
| Message ID | 00:12:F3:0B:4A:11 |
| Latitude | 44.98339267 |
| Longitude | −93.37697511 |
| Message Direction | Southbound Lyndale Avenue |
| Bluetooth ID Location | Southwest corner of Lyndale and Franklin |
| Description 1 | West sidewalk closed |
| Description 2 | 22nd to 26th street |
| Description 3 | 4 blocks |
| Advisory Message | Cross Lyndale for more bypassing message |

Figure 15:
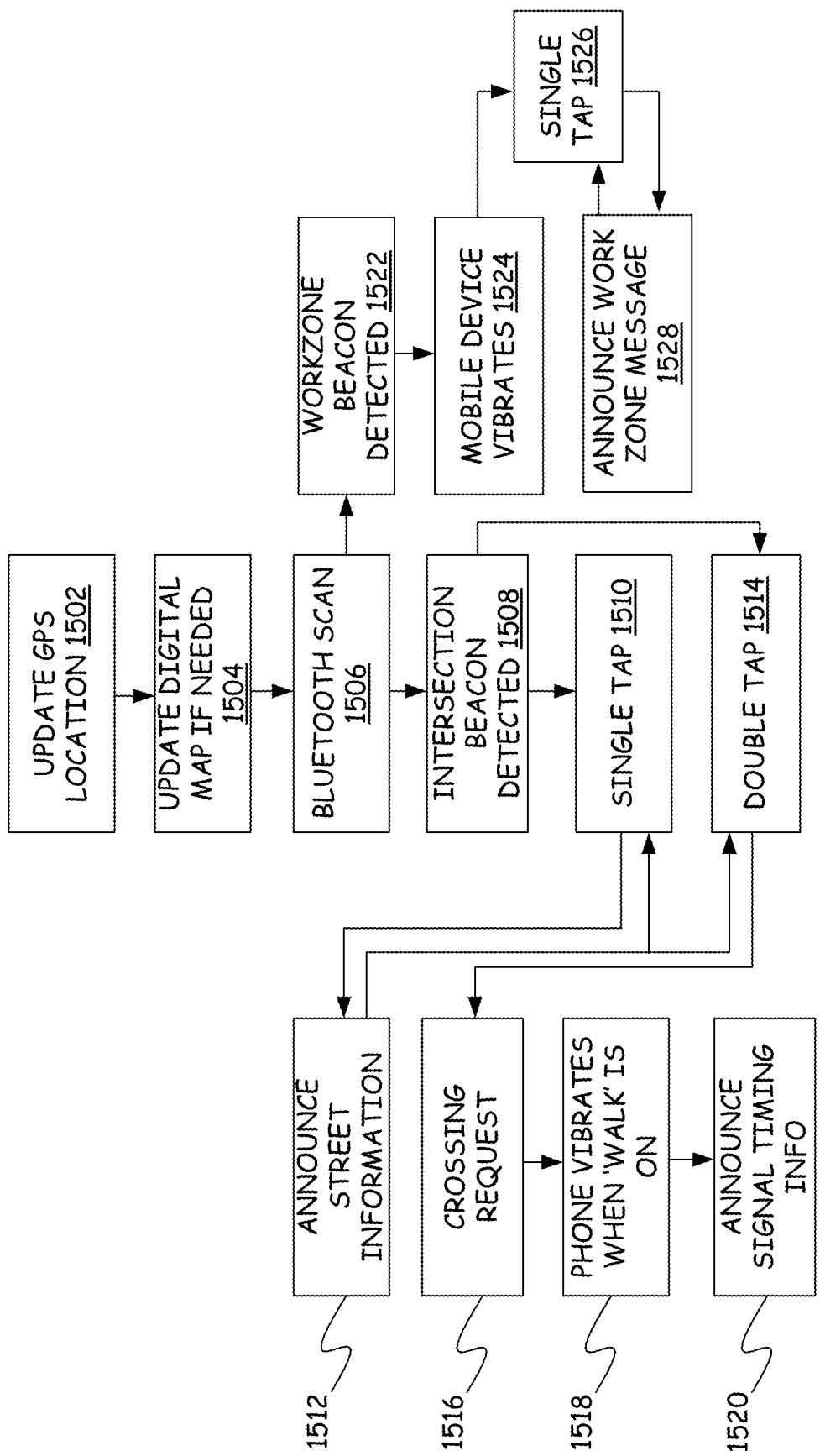
FIG. 15 is a flow diagram of an assistive method in accordance with one embodiment.

In accordance with one embodiment, the crossing request embodiment and the work zone notification embodiment are combined in MAPS application 120. FIG. 15 provides a flowchart of such an embodiment. In step 1502, mobile device 100 updates its current location based on GPS. At step 1504, MAPS application 120 compares the current location to a past location to determine if local map 122 needs to be updated and updating local map 122 if necessary. At step 1506, MAPS application 120, which runs as a service in the background, continuously scans for Bluetooth beacons in the nearby environment in discovery mode.

When an intersection beacon is detected at step 1508, MAPS application 120 waits for a single tap or double tap. When a single tap 1510 is received, MAPS application 120 uses the MAC address of the beacon and the orientation of mobile device 100 to retrieve the crossing information for the street that the pedestrian is positioned to cross. MAPS application 120 then applies the retrieved street information to a TTS to announce the street information at step 1512. When a double tap 1514 is received, MAPS application 120 submits a crossing request to cabinet 104 through MAPS server 102 at step 1516 as discussed above. When the phase of the crosswalk the pedestrian is positioned to cross changes to "walk", DCU 110 sends the phase change through MAPS server 102 to MAPS application 120, which then causes mobile device 100 to vibrate at step 1518. MAPS application 120 then announces signal timing information for the crosswalk at step 1520.

When a Bluetooth MAC address of a work zone beacon is detected at step 1522, MAPS application 120 vibrates mobile device 100 for about 1 second to alert users at step 1524. After receiving a single tap at step 1526, MAPS application 120 then announces corresponding audible message associated with the Bluetooth beacon to smartphone users using the TTS (Text to Speech) technology at step 1528. After the initial message was announced, users can repeat the message, if needed, by performing a single tap on the mobile device screen.

In accordance with one embodiment, the Bluetooth beacons are a Bluetooth 2.0 with Extended Data Range (EDR) module operating in a receiving mode. When operating in the receiving mode, the Bluetooth module consumes minimal power ranging from 15 to 50 milliwatts (mW). The Bluetooth module can be either connected to the battery of a barricade flasher, the power provided by a traffic signal or operated using a very small solar panel.

In order to reduce the power consumption and to avoid coverage overlap among Bluetooth beacons, the antenna range of the Bluetooth module (typically 246 to 496 feet, or 75 to 150 meters) was programmed (AT*AMMP=100) to cover a smaller area such as a 5 meter radius.

Figure 16:
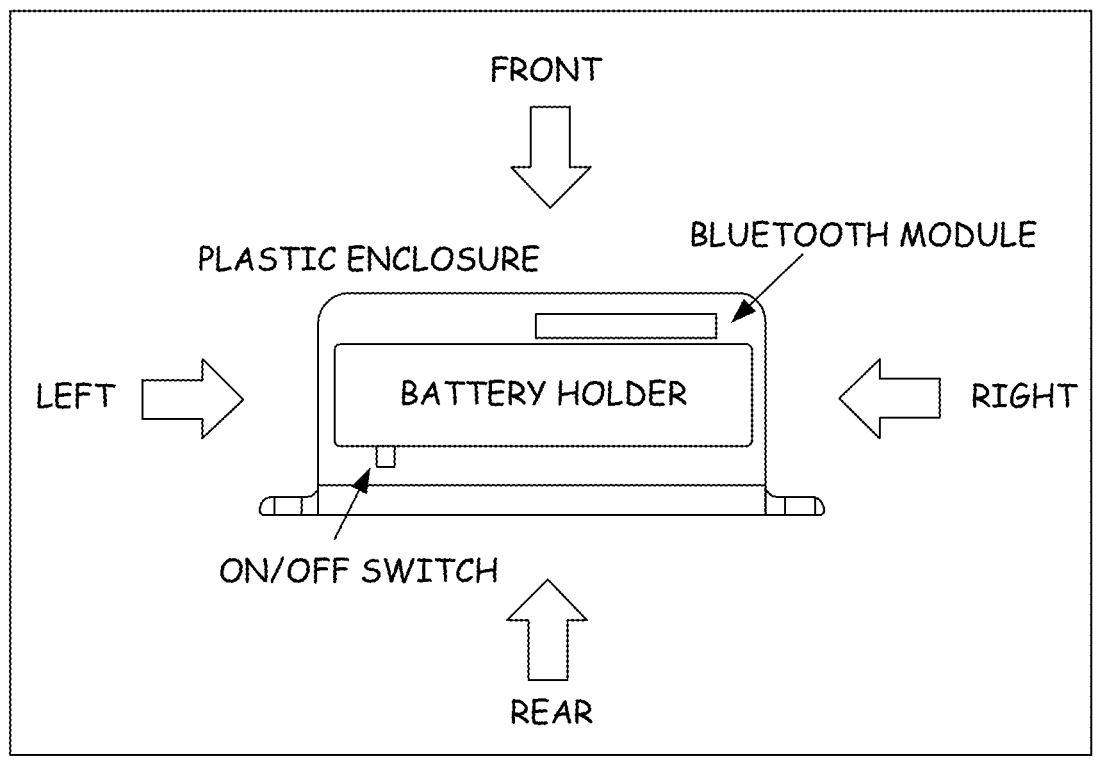
FIG. 16 is a sectional view of a Bluetooth beacon in accordance with one embodiment.

FIG. 16 illustrates a sectional view of a Bluetooth beacon in accordance with one embodiment. Table 7 lists the results from tests of the Bluetooth communication ranges when mobile device 100 detects the Bluetooth beacon. The average communication distance when approaching the Bluetooth beacon from the left direction is 4.9 feet (1.5 m) with a standard deviation of 1.8 feet (0.5 m). The average communication distance when approaching the Bluetooth beacon from the right direction is 8.7 feet (2.7 m) with a standard deviation of 5.5 feet (1.7 m). The average communication distance in front of the Bluetooth beacon is 8.7 feet (2.7 m) with a standard deviation of 3.3 feet (1 m). The average communication distance in the rear direction of the Bluetooth beacon is 13.1 feet (4 m) with standard deviation of 6.3 feet (1.9 m).

TABLE 7

Test Results of Bluetooth Communication Range

| Approach | Trial | 1 | 2 | 3 | 4 | 5 | 6 | 7 | 8 | 9 | 10 | AVG | SD |
|---|---|---|---|---|---|---|---|---|---|---|---|---|---|
| LEFT | Range (ft.) | 3 | 5 | 2 | 6 | 4 | 5 | 8 | 4 | 7 | 5 | 4.9 | 1.8 |
| RIGHT | | 7 | 11 | 3 | 1 | 12 | 17 | 17 | 9 | 5 | 5 | 8.7 | 5.5 |
| FRONT | | 8 | 10 | 11 | 14 | 12 | 7 | 10 | 7 | 3 | 5 | 8.7 | 3.3 |
| REAR | | 9 | 10 | 9 | 15 | 7 | 7 | 23 | 19 | 9.5 | 22 | 13.1 | 6.2 |

Figure 17:
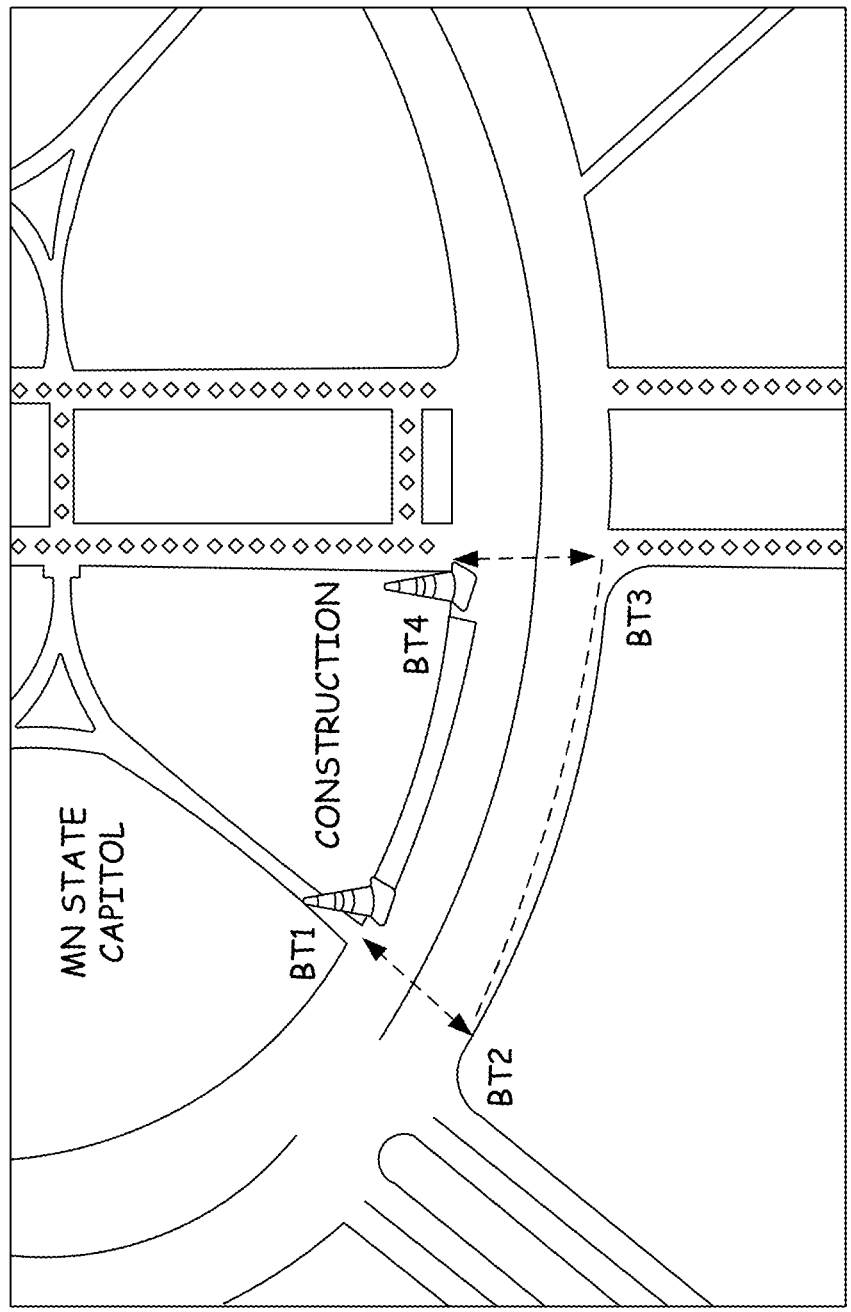
FIG. 17 is a plan view of a test site for testing a work zone assistive system.
Figure 18:
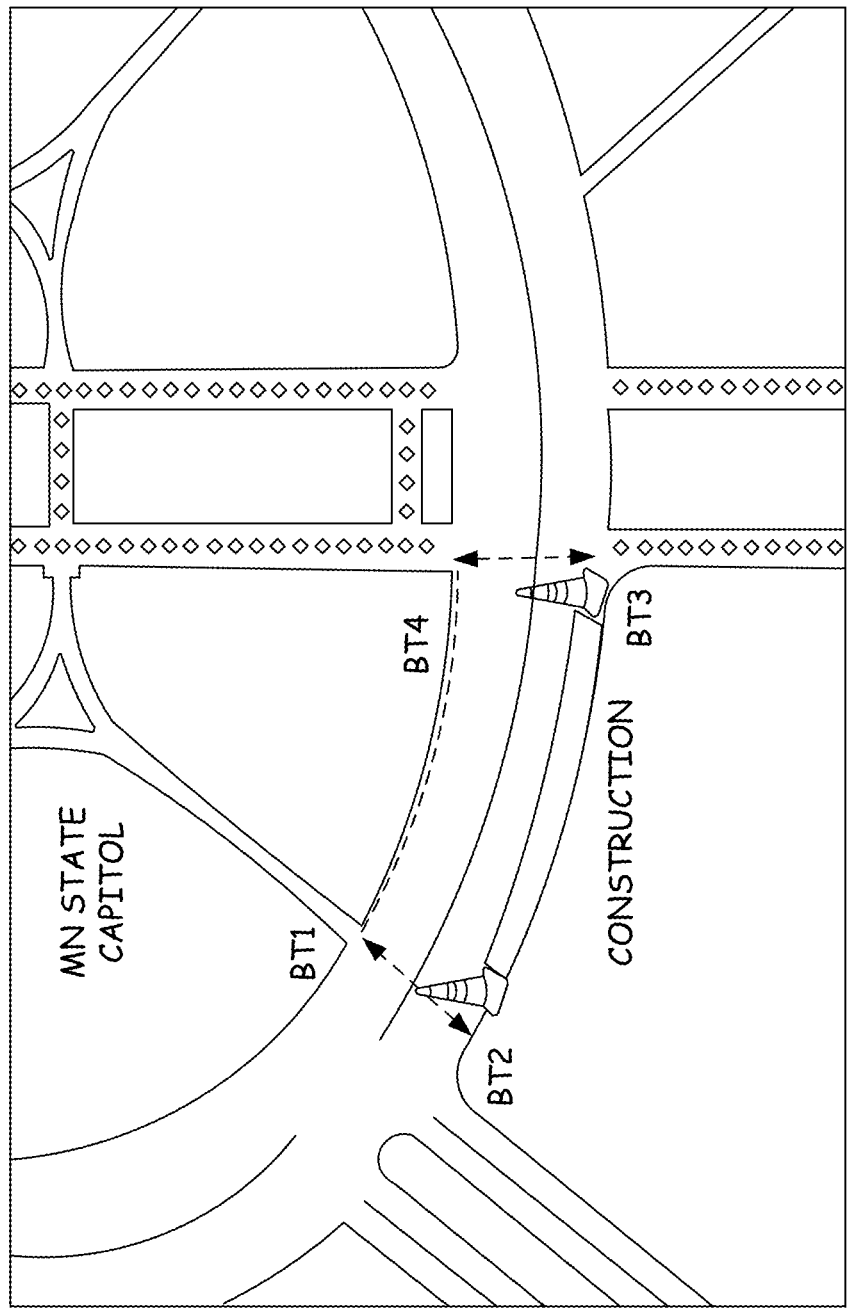
FIG. 18 is a plan view of the test site of FIG. 17 in a different testing configuration.

FIGS. 17 and 18 provide maps showing the locations of Bluetooth beacons around two separate construction sites.

In FIG. 17, the north sidewalk along the Martin Luther King Boulevard was closed as a result of temporary parking lot construction in the north mall area. Four Bluetooth beacons were each attached to a street light post near the junction of the crosswalk and sidewalk in each corner indicated by BT1, BT2, BT3, and BT4. Audible messages associated with each Bluetooth beacon were programed as follows.

BT#1 Message

Attention eastbound Martin Luther King Boulevard pedestrians.

You are at the north side of Martin Luther King Boulevard.

Sidewalk is closed on this side for 100 feet.

Cross Martin Luther King Boulevard for additional information about bypass.

BT#2 Message

Attention eastbound Martin Luther King Boulevard pedestrians.

You are at the south side of Martin Luther King Boulevard.

Sidewalk on the other side is closed for 100 feet.

Use sidewalk on this side.

BT#3 Message

Attention westbound Martin Luther King Boulevard pedestrians.

You are at the south side of Martin Luther King Boulevard.

Sidewalk on the other side is closed for 100 feet.

Use sidewalk on this side.

BT#4 Message

Attention westbound Martin Luther King Boulevard pedestrians.

You are at the north side of Martin Luther King Boulevard.

Sidewalk is closed on this side for 100 feet.

Cross Martin Luther King Boulevard for additional information about bypass.

A sighted research student was informed to start at a location about 100 feet west of the Bluetooth beacon #1 (BT1 as shown in FIG. 17) walking toward the sidewalk closure site during the construction period. The validation result confirms that the smartphone vibrated for about 1 second and announced the corresponding audible message to the traveler as he or she was walking toward a Bluetooth beacon located about 15 feet away. The person was informed to follow each audible message to bypass the work zone closure area through the suggested path (BT1→BT2→BT3→BT4).

In FIG. 18, the south sidewalk along the Martin Luther King Boulevard was closed for another parking lot construction after the north sidewalk reopened. Four Bluetooth beacons BT1, BT2, BT3, and BT4 were each attached to a light post near the junction of the crosswalk and sidewalk in each corner. The four Bluetooth beacons were placed at the same locations as in the north sidewalk closure scenario. Audible messages associated with each Bluetooth beacon were reprogramed as follows.

BT#1 Message

Attention eastbound Martin Luther King Boulevard pedestrians.

You are at the north side of Martin Luther King Boulevard.

Sidewalk on the other side is closed for 100 feet.

Use sidewalk on this side.

BT#2 Message

Attention eastbound Martin Luther King Boulevard pedestrians.

You are at the south side of Martin Luther King Boulevard.

Sidewalk is closed on this side for 100 feet.

Cross Martin Luther King Boulevard for additional information about bypass.

BT#3 Message

Attention westbound Martin Luther King Boulevard pedestrians.

You are at the south side of Martin Luther King Boulevard.

Sidewalk is closed on this side for 100 feet.

Cross Martin Luther King Boulevard for additional information about bypass.

BT#4 Message

Attention westbound Martin Luther King Boulevard pedestrians.

You are at the north side of Martin Luther King Boulevard. Sidewalk on the other side is closed for 100 feet.

Use sidewalk on this side.

A research student was informed to start at a location about 100 feet south of the Bluetooth beacon #2 (BT2 as shown in FIG. 18) walking toward the sidewalk closure site during the construction period. The validation result confirms that the smartphone vibrated for about 1 second and announced the corresponding audible message to the traveler as the person was approaching each Bluetooth beacon about 15 feet away. The test subject then followed each audible message to bypass the construction closure through the suggested path (BT2→BT1→BT4→BT3).

A Self-Monitoring Infrastructure

When Bluetooth beacons are placed at an intersection or in a work zone, it is important to ensure that the beacons remain at their original locations and function properly. In addition, the visually impaired are misled if the position information provided by the mobile device is not sufficiently accurate. The assistive information is only useful if the visually impaired can trust the information that it is valid and robust. A satellite based position solution on a mobile device is not always accurate for pedestrian navigation, particularly when a user is traveling in a GPS-denied environment (e.g., an urban canyon).

In accordance with one embodiment, a system and method provide more reliable position information and a means for the system to self-monitor the Bluetooth beacons to detect when a beacon has stopped working or has been moved. This method uses the ability of a mobile device with Bluetooth to sense the proximity of Bluetooth modules, and the ability of Bluetooth modules to sense each other. In accordance with some embodiments, algorithms are provided for ranging estimation based on the received Bluetooth signal strength. Multi-regression and triangulation methodologies are used to explore a positioning solution. A Statistical Process Control (SPC) method and several wireless signal fingerprinting techniques are also presented to monitor any changes of relative distance among beacons in a local Bluetooth network.

We developed a standalone Bluetooth smart beacon based on a commercial off-the-shelf (COTS) Bluetooth Low Energy (BLE) module. Commercially available BLE beacons in the market usually operate in the "advertising" mode. The "advertising" mode of operation is a one-way discovery mechanism that allows a BLE to be discovered by a scanning device (such as a smartphone). As opposed to the "advertising" mode of operation, we reprogramed the BLE beacons to alternate its operation between scanning (master) and advertising (slave) modes for our self-aware infrastructure. After reprogramming the firmware, these BLE beacons can monitor their neighboring peers and detect when other beacons are not functioning or have been removed or vandalized. To monitor infrastructure and ensure information integrity, statistical methodologies were developed based on the Bluetooth received signal strength indication (RSSI) for positioning and self-monitoring.

Figure 19:
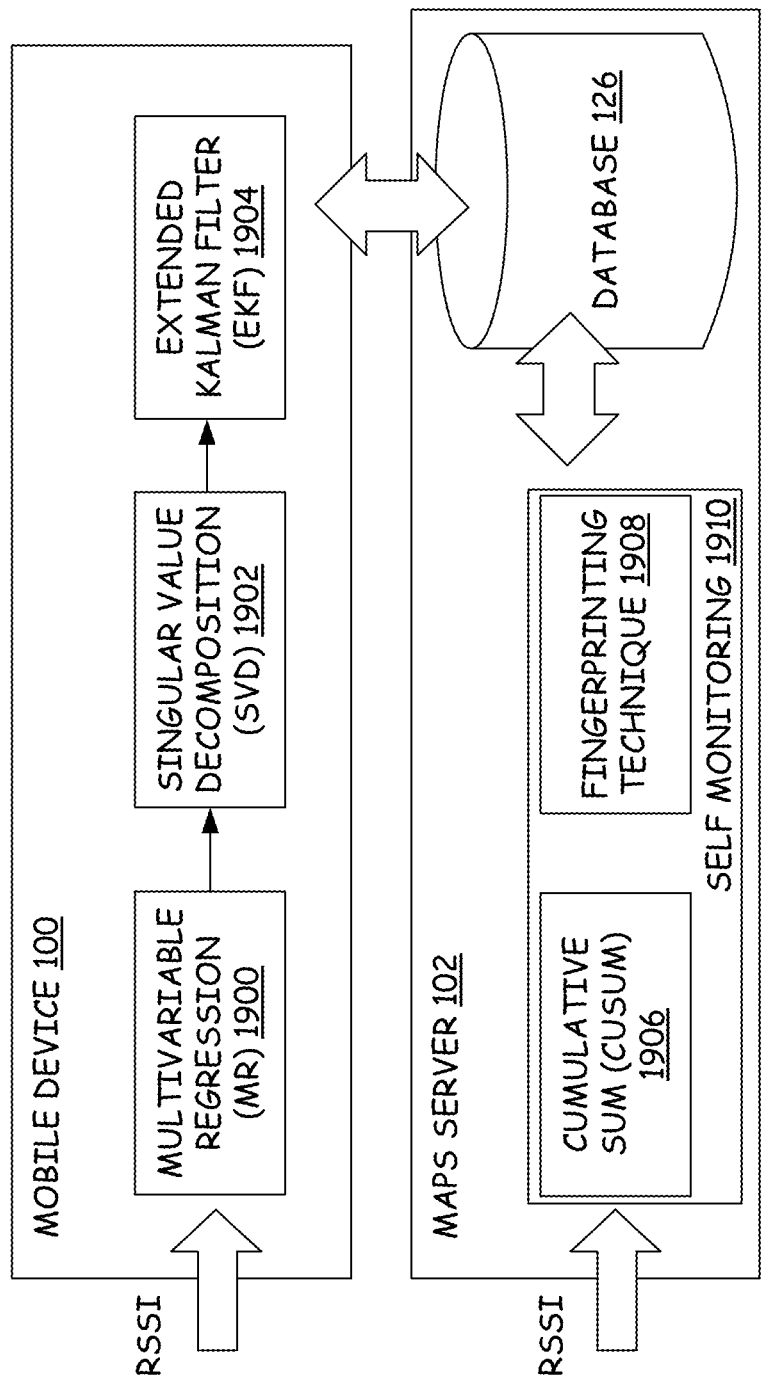
FIG. 19 is a system block diagram of a self-aware infrastructure.

The system block diagram of the self-aware infrastructure is illustrated in FIG. 19. A Multivariable Regression (MR) model 1900 is used to model the range and Bluetooth Received Signal Strength Indication (RSSI) relationships among BLE tags, forming a model of the geometric relationship of the BLE network. MR model 1900 takes the RSSI as input and finds optimal weighting parameters that best describe the geometry relationship of the BLE network. A Singular Value Decomposition (SVD) technique 1902 is introduced to remove RSSI range noise to estimate the range from mobile device 100 to BLE modules. It takes the weighting from MR model 1900 as input and generates range estimates. An Extended Kalman Filter (EKF) 1904 is formulated to determine the position of mobile device 100. from the range estimates from SVD 1902.

For self-monitoring, a self-monitoring module 1910 in MAPS server 102 uses a statistical process control technique, called Cumulative Sum (CUSUM) 1906, is implemented to monitor if the location of one or multiple BLE beacons in a network is changed based on Bluetooth RSSI measurements. In addition, two wireless signal fingerprinting techniques 1908, based on the Jaccard and Normalized Weighted Signal Level Change (NWSLC) indices, are introduced to detect geometry changes of a BLE network.

A crowdsourcing approach was used to update the status of BLE beacons and update BLE messages associated with each beacon. That is, the RSSI network information and corresponding messages of beacons in a BLE network are updated through the available wireless communication on a user's mobile device.

Most of the BLE beacons on the market are pre-programmed to pair up with a mobile device application. The BLE beacons operate in broadcasting mode, which means they are waiting for a master device, such as a mobile device, to scan, detect and communicate with them. When a wireless data communication is desired between a master device (e.g., a mobile device) and a slave BLE beacon, a pairing protocol is used to establish a wireless connection for data exchange.

In one embodiment, we re-programed the firmware of the COTS BLE beacons to operate both as a master (central) and as a slave (peripheral). Our BLE beacon operates in the scanning mode for a few seconds to detect its neighboring devices and records the corresponding Media Access Control (MAC) ID and RSSI measurements. The BLE beacons then switch to broadcasting mode for one minute. The cycle time of switching between scanning and broadcasting modes can be configured differently to preserve battery power.

A self-monitoring sensor network refers to a class of sensor networks used for monitoring or surveillance. For example, consider a class of Bluetooth wireless sensor network, S, which consists of n sensor nodes where $B(i) \in S$ and $i \in [1,n]$. Each node, e.g., $B(i)$, is able to scan and detect its neighbor's ID, e.g., $B(j)$, and the corresponding range, $d(i,j)$, where $i,j \in [1,n]$ and $i \neq j$. We use the unique Media Access Control (MAC) address of each BLE beacon as the ID and the Received Signal Strength Indication (RSSI) as a measure of range between two BLE beacons.

Figure 20:
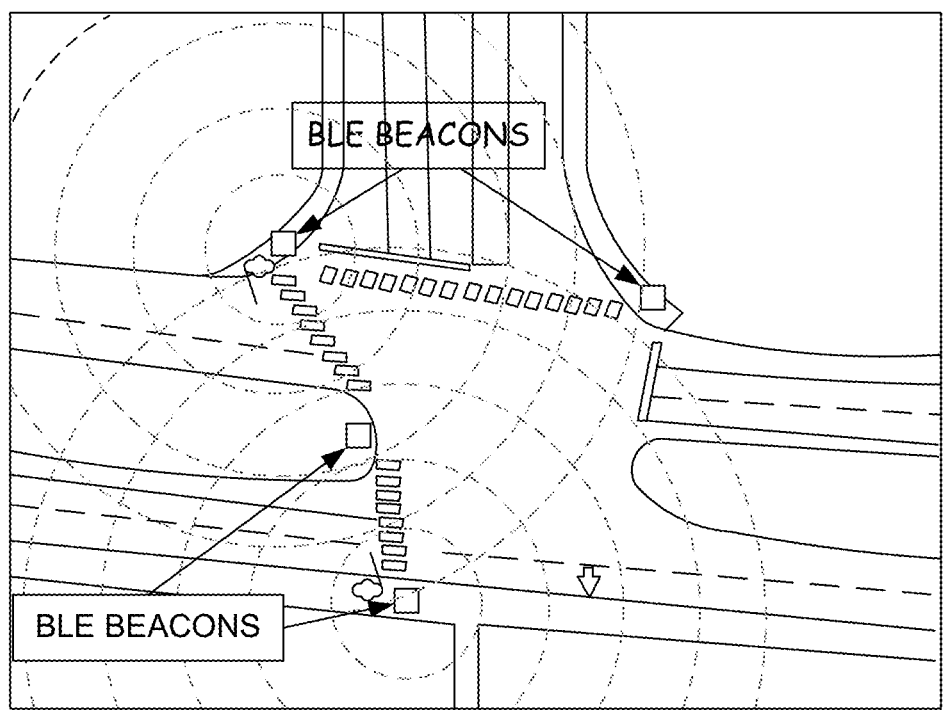
FIG. 20 is a plan view of a self-monitoring BLE network at an intersection.

FIG. 20 illustrates an example of strategic placement of proposed BLE-master beacons near a non-orthogonal intersection. Each BLE beacon is associated with a corresponding message to inform a user's location and other information at that particular location. The square dots represent the BLE beacons placed at each corner of an intersection (on light posts) or at decision locations where pedestrians may approach the intersection. The placement of the BLE beacons allows the system to form a local map using a trilateration algorithm. The relative position of the BLE beacons to each other can be monitored by the system in case a BLE beacon is malfunctioning or is removed. The audible message associated with a BLE beacon will not be available to the visually impaired pedestrian if the beacon was removed from the previously formed local map. This mapping method is used to ensure that the correct audible information (such as those related to signal timing and intersection geometry information at an intersection or wayfinding information at a skyway) is provided to users at the right location.

The purpose of using Bluetooth beacons as smart beacons is to identify a pedestrian's location more accurately and reliably at a decision location or a point of interest (for example, corner of an intersection, bus stop, or entrance of a building, etc.). We will discuss several scenarios for using the Bluetooth beacons for identifying a traveler's location at decision points.

For example, an outdoor scenario for a pedestrian who is blind traveling from an origin to a destination involves the following steps: (1) walk from an origin to an intersection, (2) cross the intersection to arrive at a bus stop, (3) get on the bus and travel to a destination bus stop, and (4) get off the bus and walk across an intersection prior to arriving at a destination.

Figure 21:
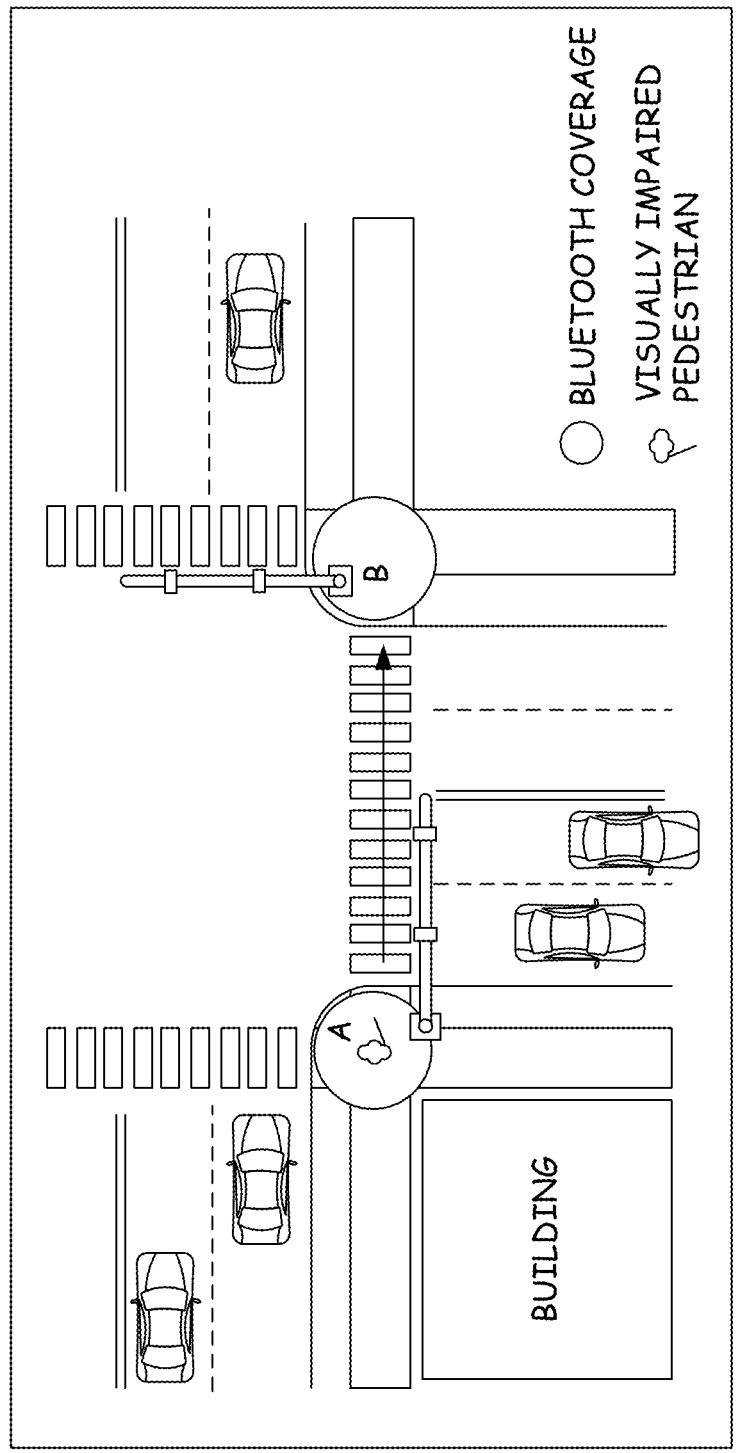
FIG. 21 is a plan view of Bluetooth beacon placement at an intersection.
Figure 22:
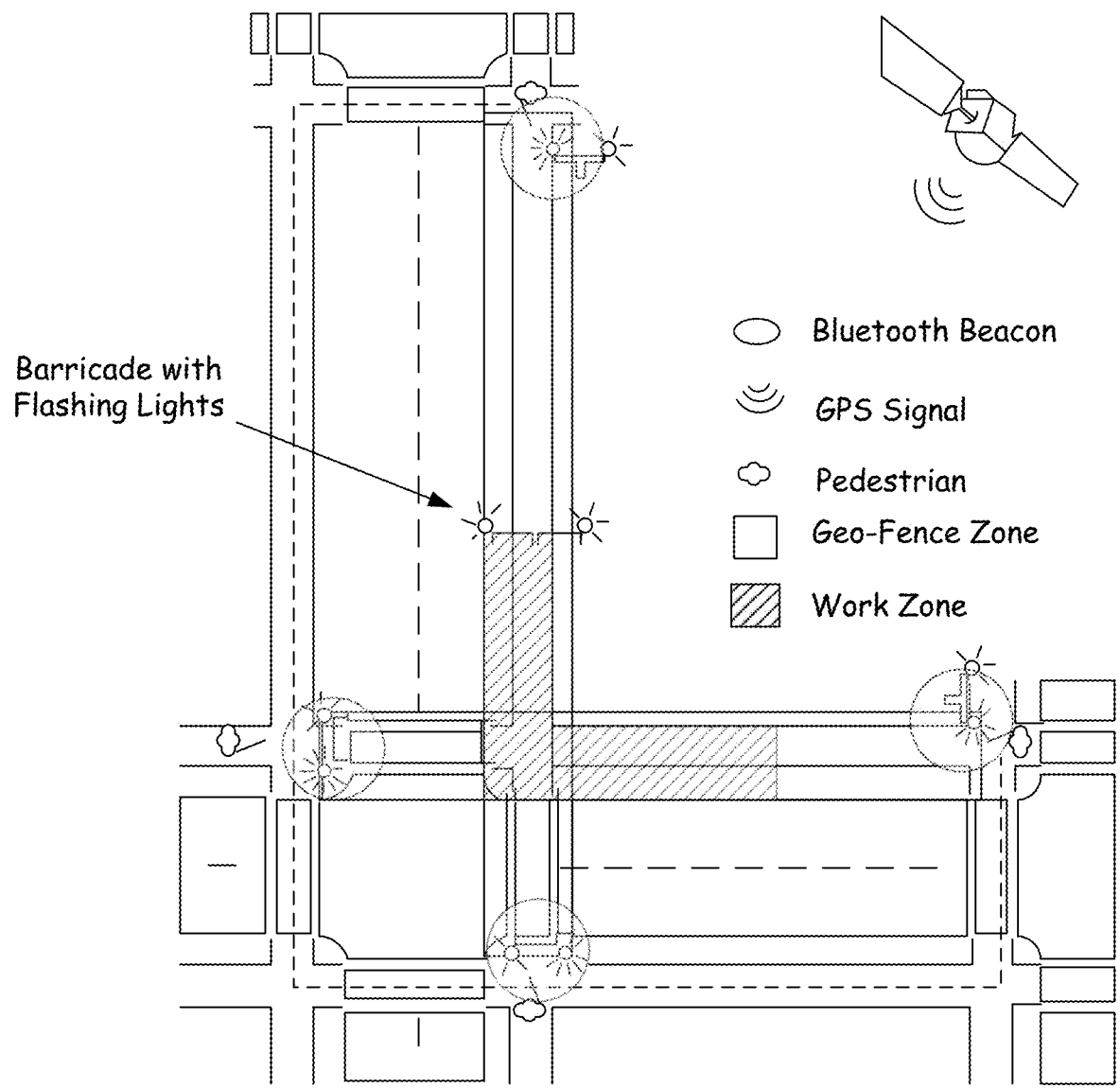
FIG. 22 is a plan view of Bluetooth beacon placement around a work zone.

In this scenario, the boarding/alighting bus stops and the intersection corners are considered as decision points equipped with Bluetooth beacons as illustrated in FIG. 21. Smart Bluetooth beacons can be placed at intersection corners, or at key decision points near a work zone to provide more accurate position and guidance information as shown in FIG. 22. Corresponding audible message can provide appropriate bypassing or detouring information to the visually impaired travelers.

The development of new low power Bluetooth 4 technology allows Bluetooth beacons to operate on a single "coinstyle" cell battery. The low power consumption feature of Bluetooth beacons running in discovery mode for the proposed work zone application could extend the battery life significantly. The compact size of BLE beacons makes it even easier to deploy by attaching the Bluetooth beacons to barricades, traffic cones, or flashers in a work zone.

Bluetooth Low Energy (BLE) Technology

BLE technology typically has a wireless communication range up to 50 meters based on line of sight, according to its specifications. Commercially available BLE modules are usually configured as non-paired and discoverable Bluetooth beacons. The BLE module can "broadcast" its service name or other information. When MAPS application 120 receives the wireless signal from a BLE module, it also receives a Received Signal Strength Indicator (RSSI) value with that broadcasted message. The RSSI is used to evaluate distance from mobile device 100 to the BLE module. BLE modules, which are primarily designed to be detected or discovered, do not communicate with each other.

As our results indicated, the Bluetooth RSSI values exhibit high variability in space and time, mostly because of the randomness of the radio signals. As such, it is not possible to use a single Bluetooth RSSI value from a single BLE module to determine the distance between the mobile device and the BLE module. So we need to develop a method to remove or reduce the noise of the Bluetooth RSSI.

Noise Reduction for Received Bluetooth Signal

The RSSI measurements can be expressed as a vector in a D-dimensional space with noise and pure signal lying in orthogonal subspaces. A Hankel matrix is constructed for the RSSI measurements for altering its singular spectrum. The high energy components are supposed to contain a pure signal, whereas the low energy components are supposed to contain only noise. The RSSI measurements y consisting of the pure signal x and the noise n can be expressed as follows.

$$y(i)=x(i)+n(i) \tag{5-3}$$

Where i represents the index of BLE beacons, $y(i)$ and $n(i)$ represent the RSSI values and environment noise from the i-th BLE beacon, respectively.

Therefore, we create overlapping frames of D samples of the RSSI measurements, $Y=[y(0), y(1), y(2), \ldots, y(D-1)]^T$. A Hankel-form matrix, $H_Y$, is expressed as, $$H_Y = \begin{bmatrix} y(0) & y(1) & \cdots & y(M-1) \\ y(1) & y(2) & \cdots & y(M) \\ \vdots & \vdots & \ddots & \vdots \\ y(K-1) & y(K) & \cdots & y(D-1) \end{bmatrix} \tag{5-4}$$

The dimension $H_Y$ is K×M, where K≥M, and M+K=T+1.

According to the assumption of additive noise, we can also write, $$Y=X+N \tag{5-5}$$

Where, Y, X, and N are the raw RSSI measurement, pure RSSI signal and noise vectors, respectively.

Singular Value Decomposition (SVD)

Using the SVD technique, the matrix $H_Y$ can be decomposed and expressed as, $$H_Y = U\Sigma V^T \tag{5-6}$$

Where,

U∈R (K×K) is the orthonormal left singular vectors,
V∈R (M×M) is the orthonormal right singular vectors, and $\Sigma=\text{diag}(c_1, c_2, \ldots, c_p)$, and $c_1, c_2, \ldots, c_p$ represent the singular values of the matrix, $H_Y$, where $c_1 \geq c_2 \ldots \geq c_p \geq 0$ and p=min(K, M).

SVD Reconstruction

The largest singular components in equation (5-6) capture almost only signal information whereas the smallest ones contain almost only noise. The noise reduction can be obtained by adapting a diagonal weighting matrix W to equation (5-6).

$$H_{\hat{X}}=U(W\Sigma)V^T \tag{5-7}$$

Matrix $H_{\hat{X}}$ is no longer in the Hankel form. However, the non-diagonal components of $H_{\hat{X}}$ can be averaged to extract the improved signal $\overline{X}=[\hat{x}(0), \hat{x}(1) \ldots, \hat{x}(D-1)]^T$.

A Least Square (LS) estimation or rank reduction approach is applied to select the weighting matrix W. We assume the pure RSSI signal X consists of r complex components such that the rank of $H_{\hat{X}}$ is r. The LS estimates of $H_Y$ is obtained by setting the M−r smallest eigenvalues to zero.

$$H_{Y,r} = [U_r \ U_{M-r}] \begin{bmatrix} \Sigma_T & 0 \\ 0 & 0 \end{bmatrix} \begin{bmatrix} V_r^T \\ V_{M-r}^T \end{bmatrix} \tag{5-8}$$

Where $\Sigma_r$ contains the r largest singular values, and $H_{Y,r}$ is the best rank-r estimation of $H_Y$.

Validation

Figure 23:
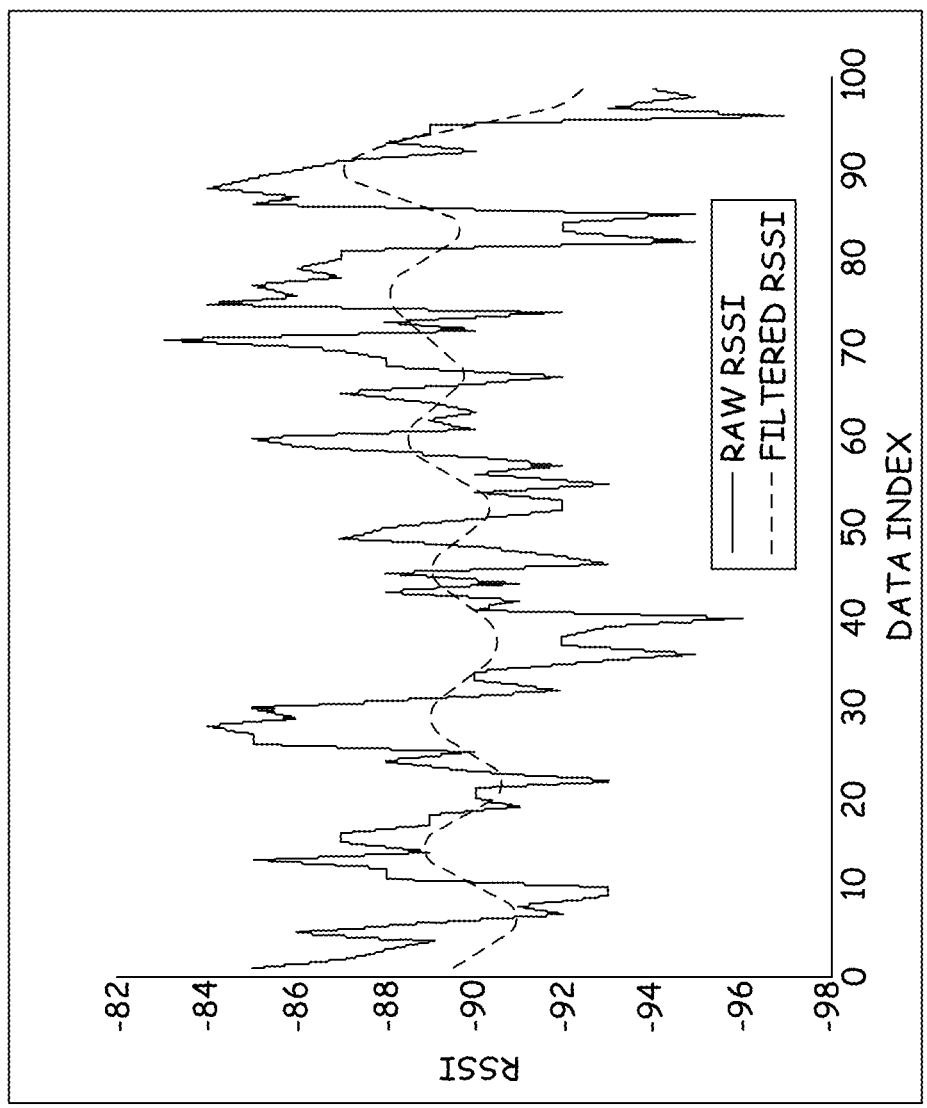
FIG. 23 is a graph showing noisy RSSI and filtered RSSI using SVD (r=2).

The SVD based RSSI noise reduction discussed above was implemented and tested using the raw RSSI signal as illustrated in FIG. 23. FIG. 23 displays the results of the filtered RSSI signal using LS estimation with rank r=2. The resulting singular values found in this case are $c_1$=4,473, $c_2$=49. We further reduce the rank to 1 because the two largest singular values differ by two orders of magnitude.

Figure 24:
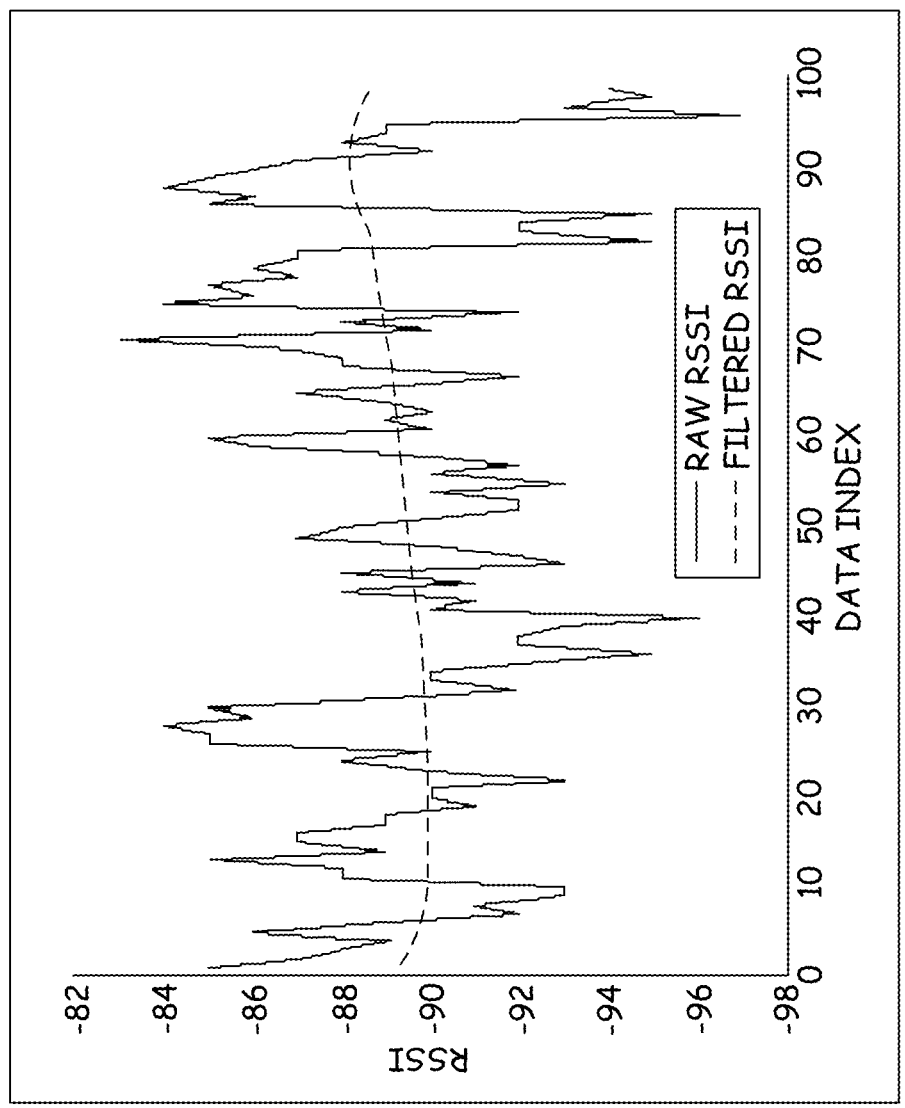
FIG. 24 is a graph showing noisy RSSI and filtered RSSI using SVD (r=1).

FIG. 24 shows the results of the filtered RSSI signal using the LS estimation with rank r=1. Without completely removing information from the signal, we use rank r=2 in our model for better range estimation as described in the following section.

Enhanced Bluetooth Range Estimation

We adopted a SVD-based Multivariable Regression (MR) approach for a Bluetooth Low Energy (BLE) network. The goal is to create a mapping between RSSI and distance using an MR-based approach in real-time to better characterize the RSSI-distance relationship at an intersection. Our approach is used to better estimate the distances between a mobile device and BLE beacons based on a local mapping of the received Bluetooth signals. The estimated distances between a mobile device and BLE beacons are then incorporated into an Extended Kalman Filter (EKF), which is described in the following section, for positioning estimation.

Multivariable Regression (MR) Model

A Multivariable Regression (MR) model is selected to map the distance from a BLE to all the other BLE beacons to be described by a weighted combination of RSSI values from all BLE beacons. The MR model is expressed as, $$\log(d_i)=S_i W_i + \varepsilon_i \tag{5-9}$$

Where, $D_i=[d_1, d_2, \ldots, d_n]$ is n distance matrix from the i-th BLE to the n-th BLE beacons, $d_i=[d_{in}^1, d_{in}^2, \ldots, d_{in}^m]^T$ is a vector of m measurements of distance from the i-th to the n-th BLE beacons, $S_i$ refers to the input variables of the i-th BLE, $W_i=[w_0, w_1, \ldots, w_n]^T$ is the weighting matrix, and $\varepsilon_i$ is an error term.

For m RSSI records received by the i-th BLE, the corresponding $d_i$ and $S_i$ matrices are expressed as the following, respectively.

$$D_i = \begin{bmatrix} d_{i1}^1 & d_{i2}^1 & \cdots & d_{in}^1 \\ d_{i1}^2 & d_{i2}^2 & \cdots & d_{in}^2 \\ \vdots & \vdots & \ddots & \vdots \\ d_{i1}^m & d_{i2}^m & \cdots & d_{in}^m \end{bmatrix} \quad (5\text{-}10)$$

$$D_i = \begin{bmatrix} 1 & s_{i1}^1 & \cdots & s_{in}^1 \\ 1 & s_{i1}^2 & \cdots & s_{in}^2 \\ \vdots & \vdots & \ddots & \vdots \\ 1 & s_{i1}^m & \cdots & s_{in}^m \end{bmatrix}$$

Where,
$d_{in}^m$ refers to the m-th distance measurement between the i-th and the n-th BLE, and
$s_{in}^m$ is the m-th RSSI value received by the i-th BLE from the n-th BLE beacon.

The matrix Di(m×n) contains m regress outputs, indicating m estimated distances from multiple RSSI values. The matrix $S_i$ is a m×(n+1) matrix. The weighting $W_i$ represents a regression by which the RSSI values are combined to determine distance. The weighting $W_i$ can be obtained by using a linear MR approach to minimize the sum of squared errors (SSE) which is defined as, $$SSE_i = \varepsilon_i^T \varepsilon_i = [\log(d_i) - S_i W_i]^T [\log(d_i) - S_i W_i] \quad (5\text{-}12)$$

To minimize $SSE_i$, we can take the derivative of $SSE_i$ with respect to $W_i$, $$\frac{\partial(SSE_i)}{\partial(W_i)} = 0 \quad (5\text{-}13)$$

Therefore, $$\partial(-\log(d_i)^T S_i W_i - W_i^T S_i^T (d_i) + W_i^T S_i^T S_i W_i) / \partial(W_i) = 0 \quad (5\text{-}14)$$

Applying matrix differentiation propositions, the results from equation (5-14) can be expressed as, $$-\log(d_i)^T S_i - \log(d_i)^T S_i + 2 W_i^T S_i^T S_i = 0 \quad (5\text{-}15)$$

And, the solution to equation (5-15) is computed as, $$W_i = (S_i^T S_i)^{-1} S_i^T \log(d_i)$$

The RSSI mapping is created by considering the RSSI values from all BLE beacons in a local network where a smartphone is located. This mapping is updated dynamically to reflect the current environment. As a result, it can better characterize the RSSI-distance relationship in a target area.

BLE Range Estimation Using SVD

As previously discussed, the large variation of Bluetooth RSSI resulting from noise causes bias error in the RSSI-distance mapping. To improve the robustness of the proposed mapping, we use the SVD method as discussed above by defining a mapping relationship as $H_i=[W_1, \ldots, W_n]$, where $W_1$ is the regression weights from equation (5-16). With SVD technique, $H_i$ can be decomposed as, $$H_i = U \Sigma V^T \quad (5\text{-}17)$$

Where,
$U \in R\ (n+1) \times (n+1)$ is the orthonormal left singular vectors,
$V \in R\ (n \times n)$ is the orthonormal right singular vectors, and
$\Sigma = \text{diag}(c_1, c_2, \ldots, c_n)$, $c_1, c_2, \ldots, c_n$ are the singular values of the matrix, $H_i$.

$c_1 \geq c_2 \ldots \geq c_n \geq 0$

The largest singular components in equation (5-17) capture almost only signal information whereas the smallest ones contain almost only noise. The noise reduction can be obtained by adapting a diagonal weighting matrix $\Gamma$ to equation (5-17).

$$\hat{H}_i = U(\Gamma \Sigma) V^T \quad (5\text{-}18)$$

Equation (5-18) represents a reconstructed matrix $\hat{H}_i$ with enhanced RSSI-distance mapping. The weighting matrix $\Gamma$ can be selected using the least square method by considering the first p singular values as clean mapping and the last (n−p) singular values representing the noise.

$$\Gamma = \begin{bmatrix} I_p & 0 \\ 0 & 0 \end{bmatrix} \quad (5\text{-}19)$$

Where,
$I_p$ is a p×p identity matrix.

The distance from a smartphone (u) to a BLE beacon (i) can be estimated as, $$\hat{d}_{u,i} = \exp(S_u \hat{H}_i) \quad (5\text{-}20)$$

Where,
$\hat{d}_{u,i}$ is the estimated distance from the smartphone (u) to a BLE beacon (i),
$S_u = [1, s_{u1}, s_{u2}, \ldots, s_{un}]$,
$s_{un}$ is the RSSI value from the smartphone (u) to a BLE beacon (n), and
$\hat{H}_i$ is the enhanced RSSI-distance mapping.

Comparison of Range Estimation Methodologies

Figure 25:
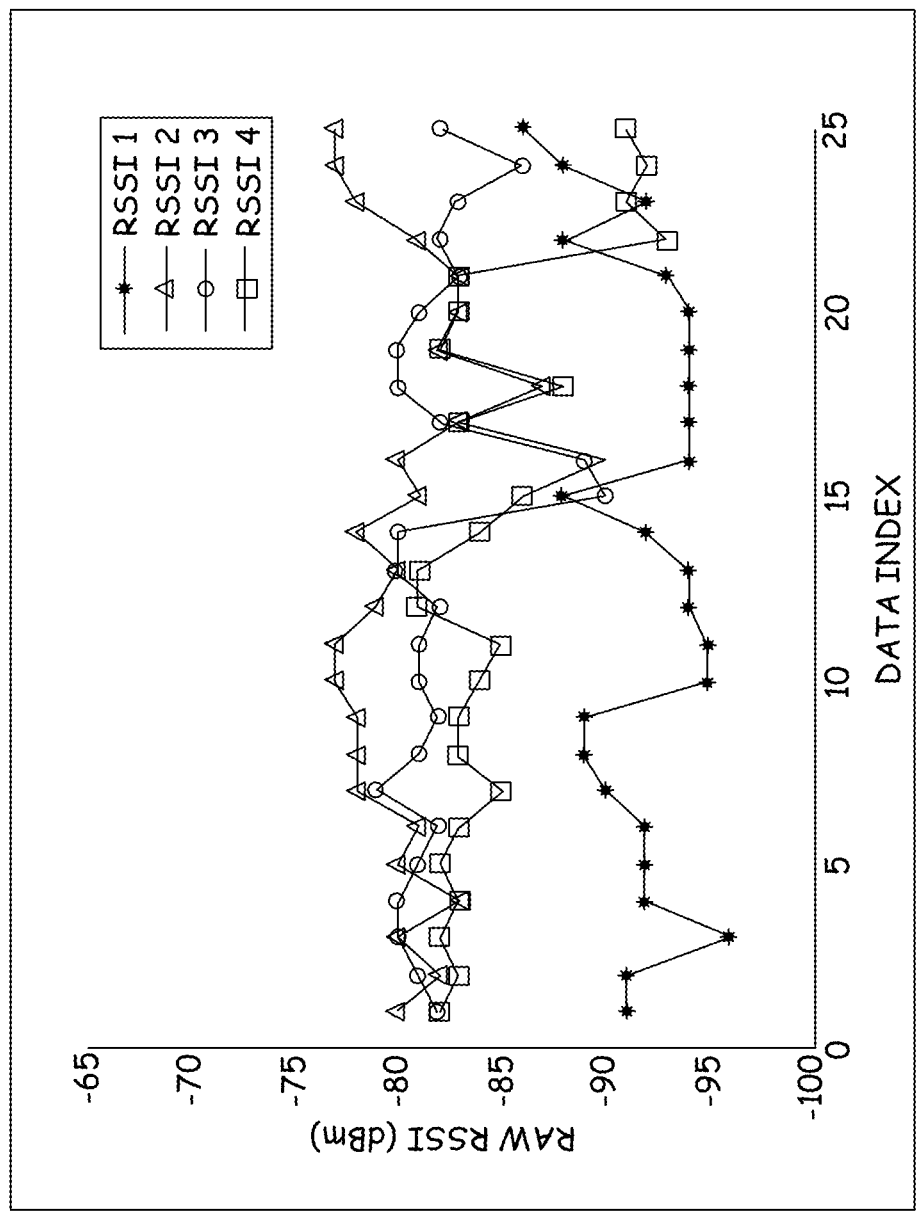
FIG. 25 is a graph of raw RSSI data received over time by a mobile device from four different BLE beacons.
Figure 26:
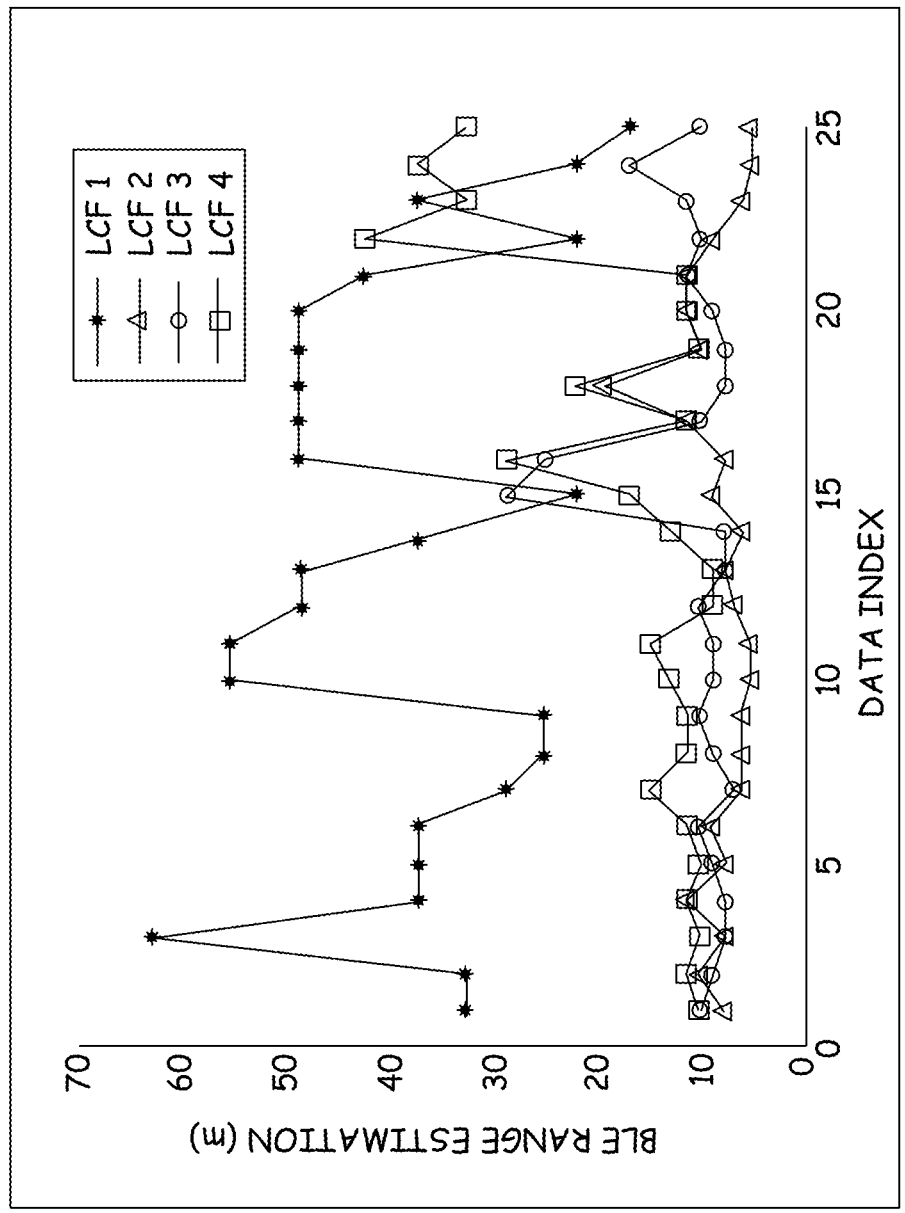
FIG. 26 is a graph of range estimates to four different BLE beacons using a LCF model.

FIG. 25 displays the raw RSSI values received on a mobile device from four BLE beacons in a network. The data index in the X axis represents the sequence of received signal strength for a 5-sec scan. The location of the mobile device is fixed during the period of data collection. The distance from the mobile device to each BLE beacon is estimated using a Logarithmic Curve Fitting (LCF) model. The range estimation using the LCF model is plotted in FIG. 26 for each BLE beacon. As illustrated in FIG. 26, beacon #1, which is farther away from the mobile device, has the highest variation in range estimation. The range estimations of the four BLE beacons in the network using the SVD-based Multivariable Regression (MR) method as previously described above are shown in FIG. 27.

Figure 27:
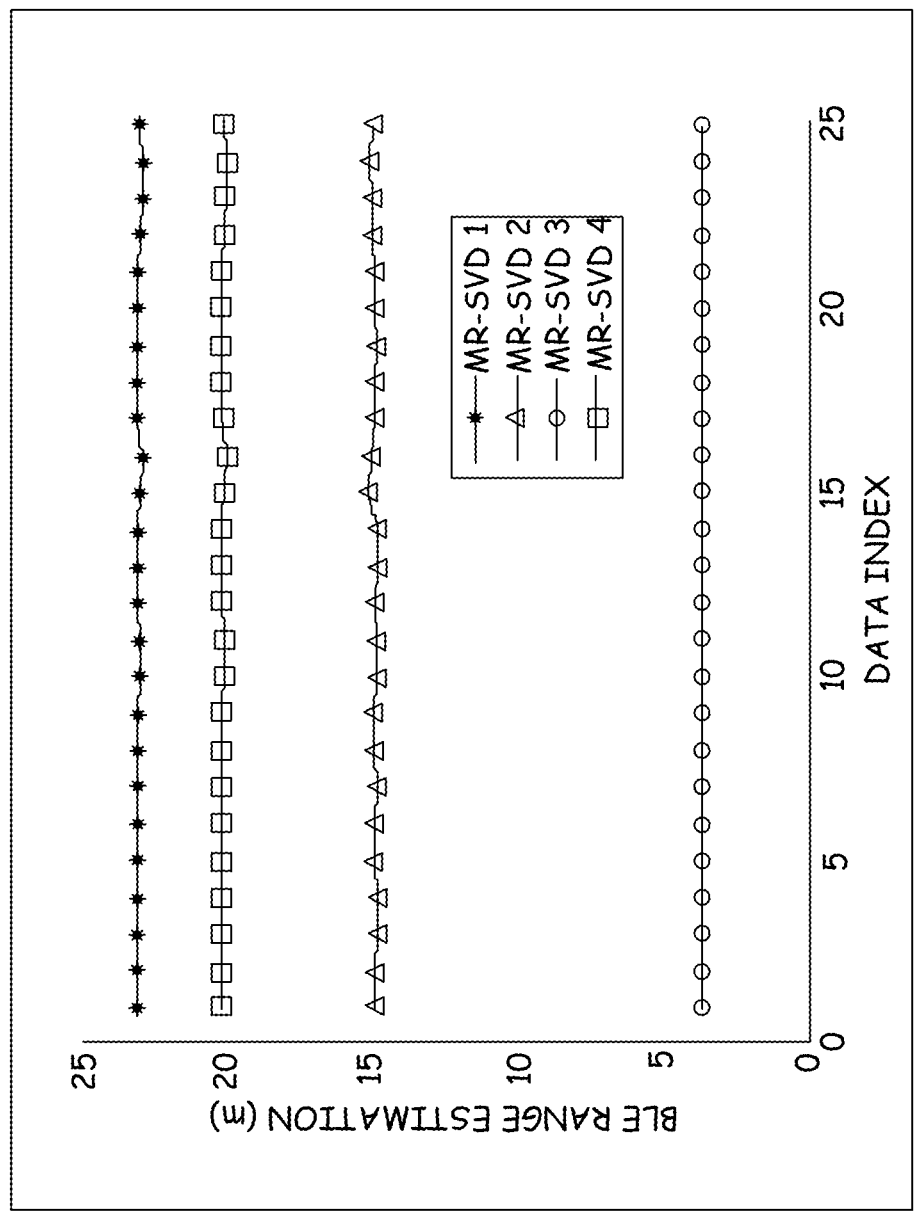
FIG. 27 is a graph of range estimates to four different BLE beacons over time using a MR-SVD model in accordance with one embodiment.

When a Bluetooth network is formed, the SVD-based MR model use the RSSI measures among the BLE beacons to determine the optimal weighting parameters ($\hat{H}_i$, as shown in equation 5-20) for range estimates. Using equation 5-20, the range estimates shown in FIG. 27 are computed using optimal weighting parameters ($\hat{H}_i$) and the raw RSSI measures ($S_u$) from a mobile device to four BLE beacons in a network (as shown in FIG. 25). The regression model successfully improves the range estimation by removing the RSSI fluctuations based on the mapping of the RSSI and distance relationship of the BLE network. The BLE beacons displayed in FIG. 27 are the same set of beacons as those in FIGS. 25 and 26.

Figure 28:
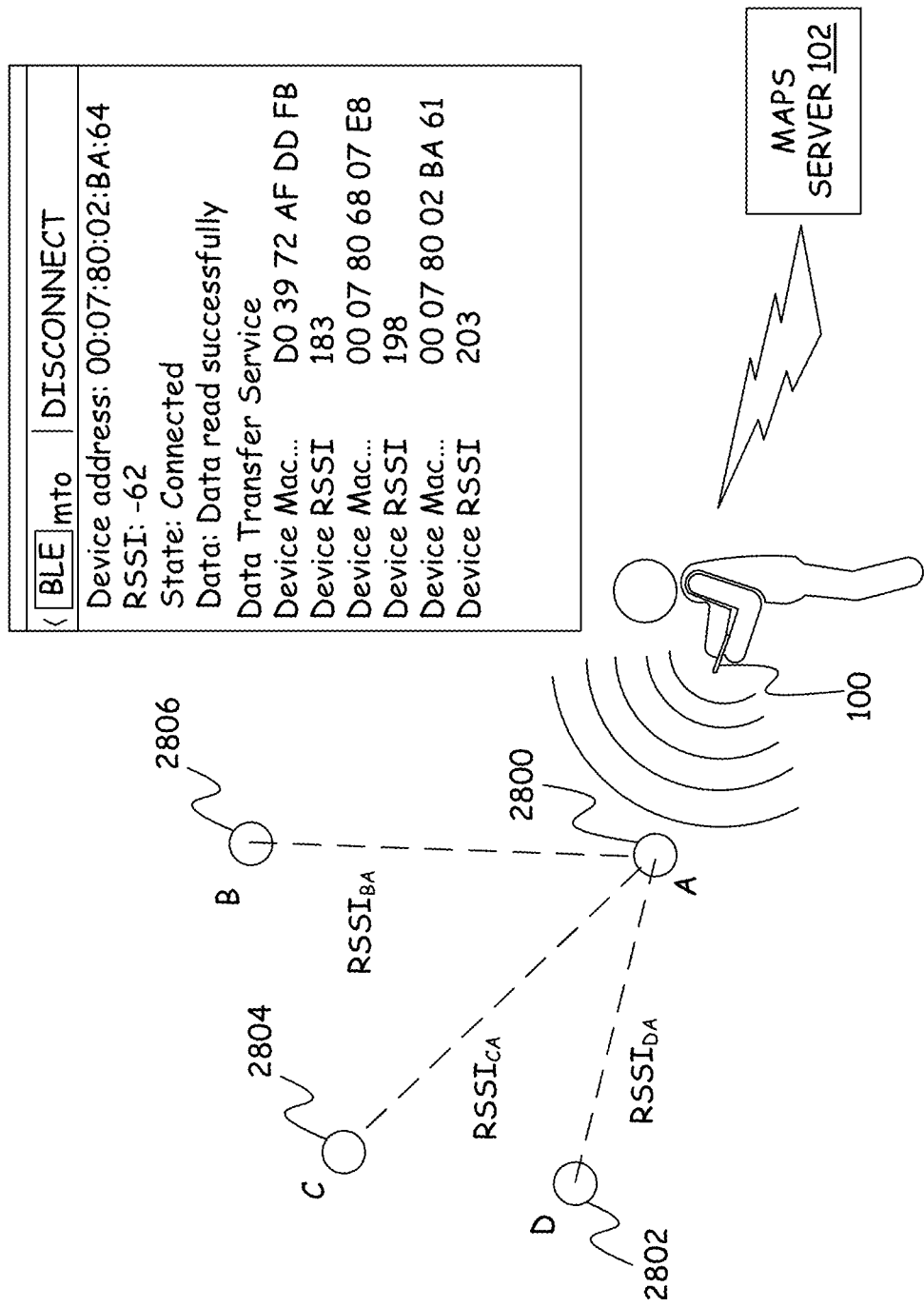
FIG. 28 is a block diagram showing updating of RSSI mappings.

This network based mapping and mapping algorithm eliminates the need of updating the RSSI-distance relationship for each user. For example, FIG. 28 illustrates how the RSSI mapping is updated when a person approaches a BLE network. The customized BLE firmware running in each beacon periodically scans its vicinity and stores the MAC ID and RSSI values of neighboring node in its local memory. For example BLE module 2800 receives and stores the MAC ID and RSSI values of BLE modules 2802, 2804, and 2806. When a user (with mobile device 100 running MAPS application 120) arrives at an intersection, the MAPS application 120 detects the beacons within the wireless communication range and immediately connects to the nearest beacon (e.g., BLE module 2800). It then downloads a list of MAC IDs and RSSI values (e.g., $RSSI_{BA}$, $RSSI_{CA}$, $RSSI_{DA}$) from the connected beacon (A) 2800 and transfers the data to MAPS server 102 through a cellular or Wi-Fi network. That is, the RSSI mapping information of a BLE network is updated through the available wireless network on a user's mobile device.

The MR-SVD based method offers better Bluetooth range estimation between a mobile device and BLE beacons. It is incorporated into an Extended Kalman Filter (EKF), which is described in the following section, for positioning estimation.

The stored RSSI values between BLE beacons in MAPS server 102 are used to provide a positioning and mapping solution and to monitor location changes of BLE beacons or network geometry changes. Methodologies to detect beacon location and network geometry changes are discussed below.

Position Estimation Using Extended Kalman Filter (EKF)

R. E. Kalman developed a recursive solution to estimate unknown variables based on a series of measurements containing noise and other inaccuracies over time.

The Kalman Filter method was selected to optimally fuse current position estimates with the most recent measurements. We use the KF approach to estimate the location of mobile device 100 based on the received signal strength measurement from its neighboring Bluetooth beacons. Based on the knowledge about the uncertainties of the current position estimates and the measurement, the KF combines the information to minimize the estimation error. The geometric relationship between a node and other neighboring nodes can be described by equation (5-21) as follows.

$$(X-X_i)(X-X_i)^T = r_i^2 \quad (5\text{-}21)$$

Where,
X is the location of mobile device 100,
$X_i$ is the location of BLE beacon i, and
$r_i$ is the distance between scanner X and sensor $X_i$, $i \in [1, 2, \ldots, n]$.

The extended Kalman filter (EKF) was used for the non-linear system. The location of mobile device 100 (X) was selected as the state variables which can be modeled in the following discrete form.

$$X_{k+1} = X_k + w_k \quad (5\text{-}22)$$

Where,
$X_k$ (3×1) is the position of BLE scanner at time step $t_k$,
$w_k$ (3×1) is assumed to be a uncorrelated sequence with known variance $E[w_k w_k^T = Q_k]$.

The observation or measurement of the above discrete process is assumed to occur at discrete points in time according to the following relationship.

$$Z_k = h(X_k) + v_k \quad (5\text{-}23)$$

Where,
$v_k$ (m×1) is random measurement noise with variance $E[v_k v_k^T] = R_k$,
$Z_k$ (m×1) is the range measurement at time step $t_k$,
m is the number of neighboring Bluetooth beacons.

The elements of $h(X_k)$ are the distances between mobile device 100 and its neighboring beacons, which can be rewritten from equation (5-21) as, $$h_i(X_k) = \sqrt{(X_k - X_i)^T (X_k - X_i)} \quad (5\text{-}24)$$

Where, $h_i(X_k)$ is the distance between mobile device 100 and the $i^{th}$ neighboring Bluetooth beacon, i is the index of neighboring beacon, and $X_i$ is the location of the neighboring beacon.

The measurement equation (5-23) needs to be linearized in order to use the discrete KF. The current state estimate is selected as the reference trajectory about which the equations are linearized. Assume $\Delta X_k$ is a small difference between the actual position $X_k$ and the current estimate, $\hat{X}_k$. Using the Taylor's series expansion with first order form, the $h(X_k)$ can be linearized as, $$h(X_k) = h(\hat{X}_k) + H_k \Delta X_k \quad (5\text{-}25)$$

$$H_k = \left[\frac{\partial h}{\partial x}\right]_{X = \hat{X}_k} \quad (5\text{-}26)$$

The rows of the linearized $H_k$ matrix represents a sensor measurement which can be expressed based on the measurement equation (5-24) as follows.

$$h_i^T = (X_i^T - \hat{X}_k^T)/h_i(\hat{X}_k)$$

We assume that at an initial time, $t_k$, all estimates were based on knowledge prior to $t_k$. This prior (or priori) estimate can be denoted as $\hat{X}_k^-$. Therefore the estimation error can be calculated as, $$e_k^- = X_k - \hat{X}_k^- \quad (5\text{-}27)$$

And the associated error covariance matrix is, $$P_k^- = E[e_k^- e_k^{-T}] = E[(X_k - \hat{X}_k^-)(X_k - \hat{X}_k^-)^T] \quad (5\text{-}28)$$

A linear blending of the prior estimate and the noisy measurement can be formulated using the following equation.

$$\hat{X}_k = \hat{X}_k^- K_k (Z_k - H_k \hat{X}_k^-) \quad (5\text{-}29)$$

Where,
$\hat{X}_k$ is the updated estimate
$K_k$ is a blending factor which can be expressed as follows:

$$K_k = P_k^- H_k^T (H_k P_k^- H_k^T + R_k)^{-1} \quad (5\text{-}30)$$

This particular $K_k$, namely the one that minimizes the mean square estimation error, is called the Kalman gain. The covariance matrix associated with the optimal estimate can therefore be computed as, $$P_k = (I - K_k H_k) P_k^- \quad (5\text{-}31)$$

The Kalman filter can be initialized by setting the $\hat{X}_0$ and $P_0$ to constant values. The first measurement update is evaluated iteratively until a predefined converge criteria is satisfied.

Based on the range estimation discussed in section 5.4, the EKF method is incorporated with the MR-SVD model to identify the location of mobile device 100 in a BLE network. The EKF uses the MR and SVD combined model to find the range estimates from mobile device 100 to the BLE beacons. The estimates of the range from mobile device 100 to each beacon are used to determine the location of the mobile device 100 with respect to a selected local coordinate system.

Detection of Location and Network Geometry Changes

Figure 29:
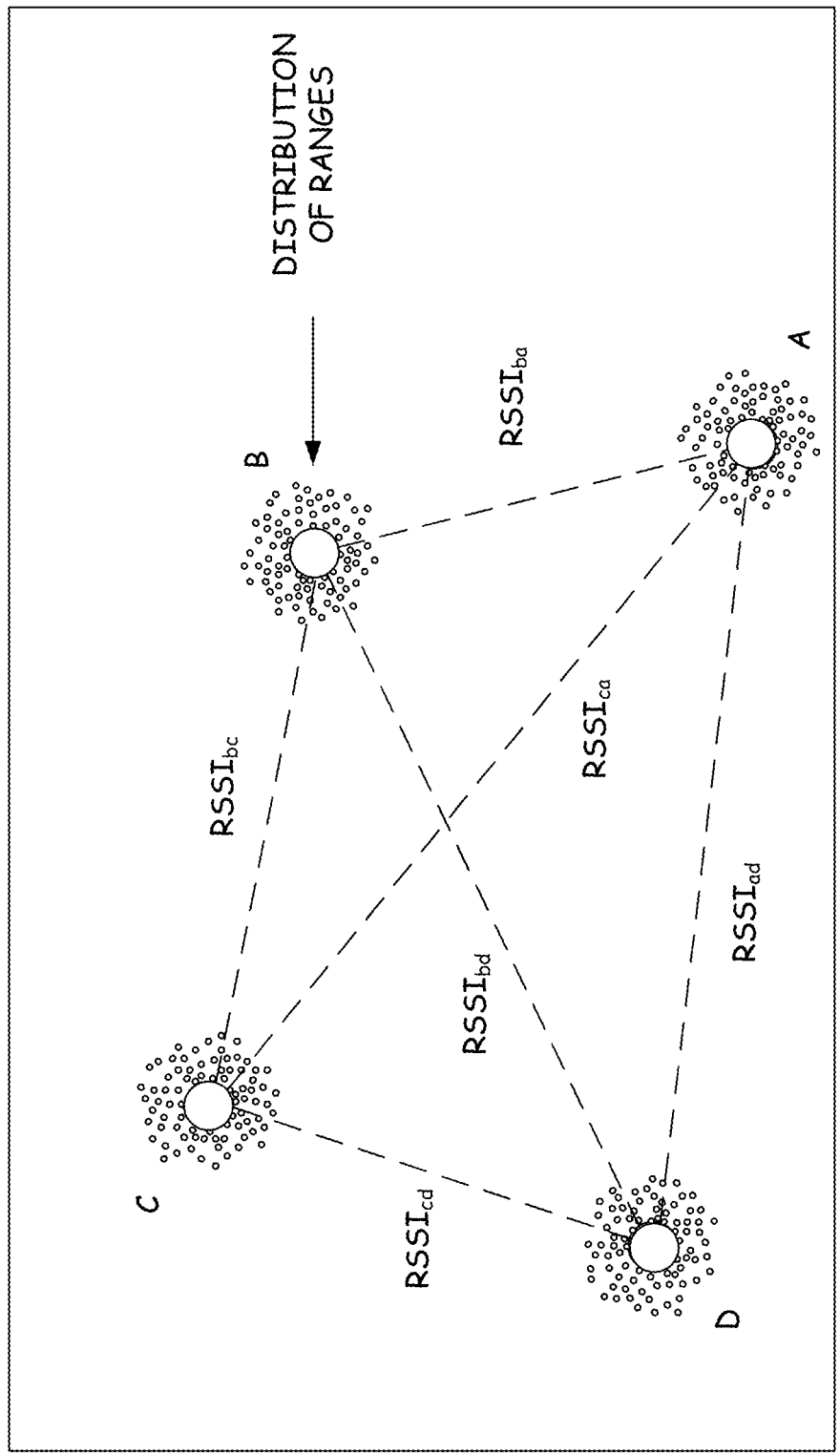
FIG. 29 is a plan view showing RSSI signals between four BLE beacons.

FIG. 29 illustrates a simple BLE network in which each BLE beacon has the capability to scan and receive the Bluetooth signal from the other BLE beacons. Statistical methodologies are investigated to detect changes of the location of a BLE beacon within its network configuration.

A cumulative summation (CUSUM) method and two location change indices were introduced to test what happens if the location of a BLE module is changed or the configuration of the BLE network is altered. The CUSUM technique is used to evaluate the location changes of a single BLE module. The Jaccard index and a normalized weighted signal level change (NWSLC) index were used to evaluate the geometry configuration of a local BLE network.

Statistical Process Control (SPC)

A Statistical Process Control (SPC) method known as Cumulative Sum (CUSUM), can be performed to detect and identify any changes of BLE locations. The cumulative sum of difference between each measurement and the benchmark value is calculated as the CUSUM value. The CUSUM is expressed as follows.

$$C_n = \Sigma_{i=1}^{n}(X_i - \mu) \quad (5\text{-}32)$$

Or in the recursive form, $$C_n = C_{n-1} + (X_i - \mu) \quad (5\text{-}33)$$

Where, $X_i$ is the $i^{th}$ data reading from BLE modules, $\mu$ is the data mean, and $C_n$ is the sum of independent normal $N(0, \sigma^2)$ quantities.

The CUSUM equations (5-32 & 5-33) can also be standardized to have zero mean and unit standard deviation as follows.

$$U_i = (X_i - \mu)/\sigma \quad (5\text{-}34)$$

$$S_n = \Sigma_{i=1}^{n} = U_i \quad (5\text{-}35)$$

Or in recursive form, $$S_n = S_{n-1} + U_n \quad (5\text{-}36)$$

Where, $U_i$ is the difference of measurement from mean in unit of standard deviation, $S_n$ is the cumulative difference in unit of standard deviation, and $\sigma$ is the standard deviation of a data set.

Figure 30:
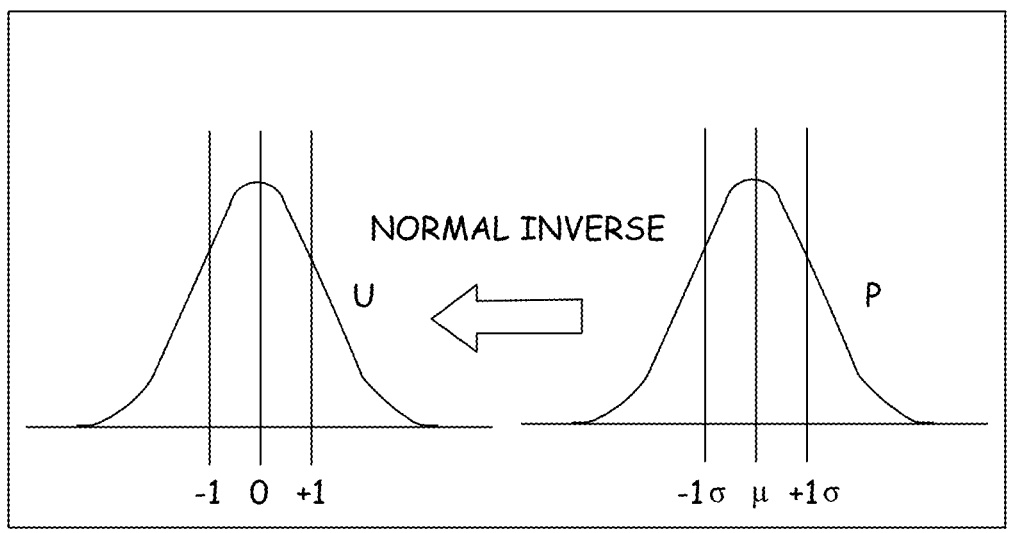
FIG. 30 is an illustration of normal inverse cumulative distribution function.

The cumulative distribution function and the normal inverse cumulative distribution function (illustrated in FIG. 30) were used to normalize the deviation statistics before calculating CUSUM. The following equations can be used to calculate the adjusted CUSUM.

$$\bar{x}_1 = \frac{\Sigma_{i=0}^{n_0} \mu_i}{n_0}$$

$$w_1 = \sum_{i=1}^{n_0} (\mu_i - \bar{x}_1)^2$$

$$\bar{x}_{j+1} = \bar{x}_j + \left[\frac{(\mu_{j+n_0} - \bar{x}_j)}{j + n_0}\right]$$

$$W_{j+1} = w_j + (j + n_0 - 1)\left[\frac{(\mu_{j+n_0} - \bar{x}_j)^2}{j + n_0}\right]$$

$$\sigma_j^2 = \frac{w_j}{j + n_0 - 1}$$

$$T_j = \frac{\mu_{j+n_0} - x_j}{\sigma_j}$$

$$p_j = tcdf\left(T_j \cdot \sqrt{\frac{j + n_0 - 1}{j + n_0}}, j + n_0 - 2\right)$$

$$U_j = norminv(p_j, 0, 1)$$

$$adj.cusum_j = \sum_{k=1}^{j} U_k$$

Where, n=number of measurements, $n_0$=3, initial number of measurements, $w_j$ is sum of squared difference between individual data and mean, $\sigma_j^2$, is the variance, m=n-$n_0$, $\mu$ is an array of RSSI average, p=tcdf(x, v) is the student's t cumulative distribution function (CDF).

The result, p, is the probability that a single observation from the t distribution with v degrees of freedom falls in the interval [-∞, x], and U=norminv(p, $\mu$=0, $\sigma$=1) is the normal inverse cumulative distribution function. It computes the inverse of the normal CDF with parameters (mean) and $\sigma$ (standard deviation) the corresponding probabilities in p.

The standardized CUSUM form, $S_n$ (Eq. 3-6), can be used to directly interpret random walks and linear drifts of a process mean. The Decision Interval (DI) of CUSUM is proposed to detect a process shift in mean that changes from general horizontal motion to a non-horizontal linear drift. For example, a particular slope k and leg height h can be specified to test a shift. The sequence to monitor an upward shift in mean is defined in equation (5-37 & 5-38) as follows.

$$S_0^+ = 0 \quad (5\text{-}37)$$

$$S_n^+ = \max(0, S_{n-1}^+ + U_n - k) \quad (5\text{-}38)$$

It signals an upward shift in mean if $S_0^+$<h. Similarly, the sequence to monitor a downward shift in mean is defined in equation (5-39 & 5-40) as follows.

$$S_0^+ = 0 \quad (5\text{-}39)$$

$$S_n^+ = \min(0, S_{n-1}^+ + U_n + k) \quad (5\text{-}40)$$

It signals a downward shift in$_0$ mean if $S_0^-$<h. The constant k represents a reference value or allowance, and constant h is the decision interval. The k value is chosen for optimal response that the CUSUM process will detect a shift of 2×k standard deviations.

We used the CUSUM method to monitor the changes of RSSI between two BLE beacons. The CUSUM method allows us to test what happens if the location of a BLE module is changed. In addition, we also would like to monitor the configuration of a formed BLE network. Two signal fingerprinting techniques are discussed in the following section to monitor any changes of relative distance among beacons in a local Bluetooth network.

Wireless Signal Fingerprint

Fingerprinting is a localization process that represents a radio transmitter by the unique ID and the signal strength at the current location. It requires a robust Received Signal Strength Indication (RSSI) database which is used for generating signal strength maps as well as for identifying locations. Each location reference point includes signal strengths measured from all accessible Access Points (AP). Live RSSI data can then be compared to the find the closest match from the database which stores the location of each reference point.

Wireless location fingerprinting consists of two phases: the off-line data training and online positioning. We use the wireless fingerprint positioning process to determine the change in location of a BLE module, which allows for a much more efficient use of BLE data. Importantly, our approach does not require the additional layer of complexity incurred by the need to form and maintain external RSSI databases as well as querying them for each location determination. In particular, the BLE module can record the wireless fingerprint when the network is installed. The scanned BLE signals are stored in the cloud and are used as a reference signature. When a BLE module detects any suspicious movement using the CUSUM method, the app on a user's smartphone informs the server to compare the current BLE signal fingerprint with the stored reference to determine and validate if the location of a BLE module has changed.

Each record from the BLE scan result list includes a MAC address and Received Signal Strength Indication (RSSI). The MAC address is a unique identifier associated with each BLE module. The RSSI is the received signal strength from the corresponding BLE module. The RSSI is expressed in dBm which is defined as the power ratio in decibels (dB) of the measured power referenced to one milliwatt (mW) as displayed in Equation (5-41).

$$dBm = 10\log_{10}\frac{Power}{1\ mW} \quad (5\text{-}41)$$

The RSSI signal strength in dBm can be converted into a discrete N-level signal indication (where N=5 is a commonly used value), often displayed using bars on smartphone screens. The Android API provides a function to compute signal strength level based on the RSSI, SigLevel=WifiManager.calculateSignalLevel(RSSI,N)  (5-42)

Where,
RSSI is the measured signal strength in dBm,
N is the total number of signal levels, and
SigLevel∈[0, 1, . . . , N−1].

We use the MAC ID and Received Signal Strength Indication (RSSI) as elements of the BLE fingerprint. That is, a BLE fingerprint $F_x$ of at given location x is represented as $F_x=\{(MAC_i, RSSI_i)\}$, where each tuple ($MAC_i$, $RSSI_i$) indicates a specific ($i^{th}$) BLE network (ID and signal strength) visible at location x. Both the Jaccard and a normalized weighted signal level change indices are discussed as follows.

Jaccard Index

The Jaccard index, or similarity coefficient, was previously developed by Paul Jaccard to compare regional floras. The similarity index is also widely used in data-mining for comparing the similarity and diversity of a finite number of sample sets. Specifically, similarity of two sets $S_1$ and $S_2$ is defined as:

$$J(S_1, S_2) = \frac{|S_1 \cap S_2|}{|S_1 \cup S_2|} \in [0, 1] \quad (5\text{-}43)$$

In our case, $S_1$ and $S_2$ are the reference MAC ID list and the current MAC ID list, respectively. More specifically, given two Wi-Fi fingerprints $F_1$ and $F_2$ from two different locations, $S_1$ and $S_2$ are defined to include MAC IDs of only those networks that have signal level (ranging from 0 to 4) equal or greater than 1 for Jaccard index calculation. Formally, $$S_i=\{MAC\ ID|(MAC\ ID,RSSI)\in F_i, SigLevel(RSSI,5) \geq 1\},\text{ for } i=1,2 \quad (5\text{-}44)$$

That is, this approach uses the changes in the fingerprint of the strong-signal networks (with signal strength of 1 or higher) for location change determination. By definition, the value of $J(S_1,S_2)$ is always between 0 and 1. We define that the location of a smartphone is changed when the Jaccard index drops below some threshold $H_{threshold}$, i.e., $J(S_1, S_2)<J_{threshold}$, which essentially indicates that the overlap between two sets of Wi-Fi networks from scans $F_1$ and $F_2$ is minimal.

The Jaccard index has an initial value of 1 when no signal strength changes occur in a network. However, it is sensitive to the initial signal strength of a wireless network. The changes of Jaccard index of a network with stronger initial signal strength among beacons is less significant than the changes of a wireless network with weaker signal strength initially.

Normalized Weighted Signal Level Change (NWSLC) Index

We introduced an alternative measure called the normalized weighted signal level change (NWSLC) index for detecting a beacon location change detection, because the Jaccard index approach was inadequate. NWSLC index describes the changes of a network signature by weighting the signal level differences between the reference (from $F_1$ scan) and current (from $F_2$ scan) signal level with its reference signal strength and then taking the normalized average. It is defined as follows.

$$A = \frac{1}{Nn}\sum_{i=1}^{n} SigLevel_{ref_i} \times |SigLevel_{cur_i} - SigLevel_{ref_i}| \quad (5\text{-}45)$$

Where,
A is the NWSLC index,
n is the number of intersection samples (i.e., n=|$F_1 \cap F_2$|),
N is the total number of signal levels (i.e., N=5 in our case),
$SigLevel_{ref_i}$ is the signal level of reference BLE i (from scan $F_1$), and
$SigLevel_{cur_i}$ is the signal level of current BLE i (from scan $F_2$).

We determine that the location of a beacon is changed when the NWSLC index is larger than a certain threshold $A_{threshold}$, $A \geq A_{threshold}$, which takes into account not only the change in visible Wi-Fi networks but also the relative change in their signal strength.

The NWSLC index performs better than the Jaccard index. It normalizes the changes of a signal based on its initial signal states. As a network geometry configuration changes, the NWSLC index increase proportionally to the amount of changes with respect to its initial signal strength.

Analysis Results

We reprogrammed the firmware of commercial off-the-shelf Bluetooth Low Energy (BLE) beacons for our experiments. The characteristics of the Received Signal Strength Indication (RSSI) were examined. Four BLE beacons were installed at an intersection to evaluate the positioning and mapping method as discussed previously using RSSI. Statistical methodologies discussed above were also tested to validate the capability of a self-aware BLE network.

Program Bluetooth Low Energy (BLE) Beacons

We developed a standalone Bluetooth smart system (called BLE-master) that integrates a commercial off-the-shelf BLE module operating in dual modes (master/slave or scanning/broadcasting) with necessary interface elements to sense other BLE-master beacons within its range of communication. The BLE-master units periodically scan the other BLE-master beacons in their communication range to ensure the integrity of the local map and to provide correct positioning information in an environment.

A Texas Instruments (TI) CC2540 development kit (including CC debugger) was acquired and used to program the BLE modules.

Figure 31:
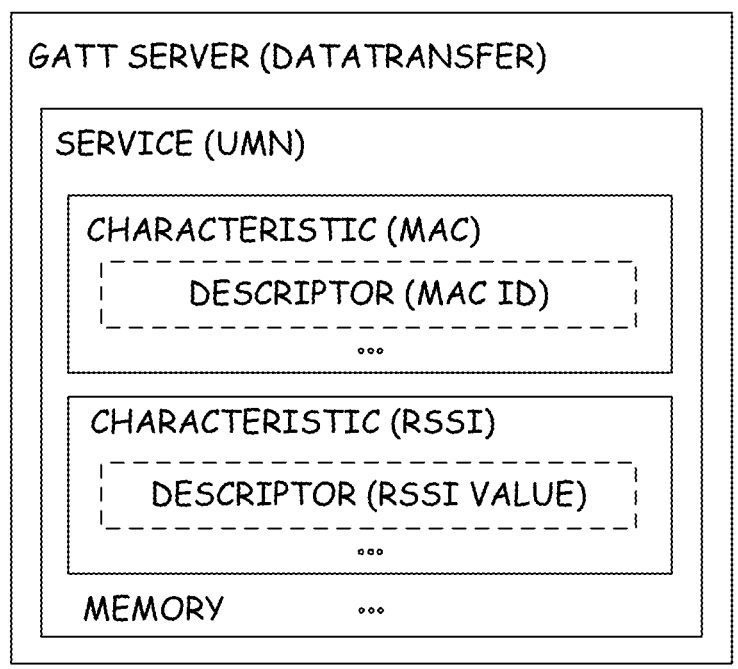
FIG. 31 is a block diagram of a Gatt server on a BLE module.

The generic attribute (GATT) layer of the Bluetooth 4.x protocol stack is used by the application for data communication between two BLE beacons when one of them acts as a GATT server and the other as a GATT client. A GATT server consists of one or more GATT services, which are collections of data to accomplish a particular function or feature. "Characteristics" are values that are used by a service, along with properties and configuration information. GATT defines the sub-procedures for discovering, reading, and writing attributes over a BLE connection. The characteristic values, along with their properties and their configuration data (also known as "descriptors") on the GATT server are stored in the attribute table. FIG. 31 illustrates our implementation (in parenthesis) of the GATT server and service on each BLE beacon. Each BLE beacon is programmed to be in central mode (master) for 10 seconds after which it switches to peripheral mode (slave) and remains in that role for 50 seconds. When in central mode, the application searches for surrounding BLE beacons that are programmed for our application and gets their corresponding MAC addresses and RSSI values and stores them locally. When in peripheral mode, the application hosts a GATT server with the GATT service and is ready to be connected to a central beacon. The GATT service hosts the sensor's MAC addresses and RSSI values previously read in the central mode. A central BLE beacon (for example, a smartphone) can now connect to the beacon in peripheral mode and read the values of MAC addresses and RSSI values of its neighboring BLE beacons from the GATT server.

Figure 32:
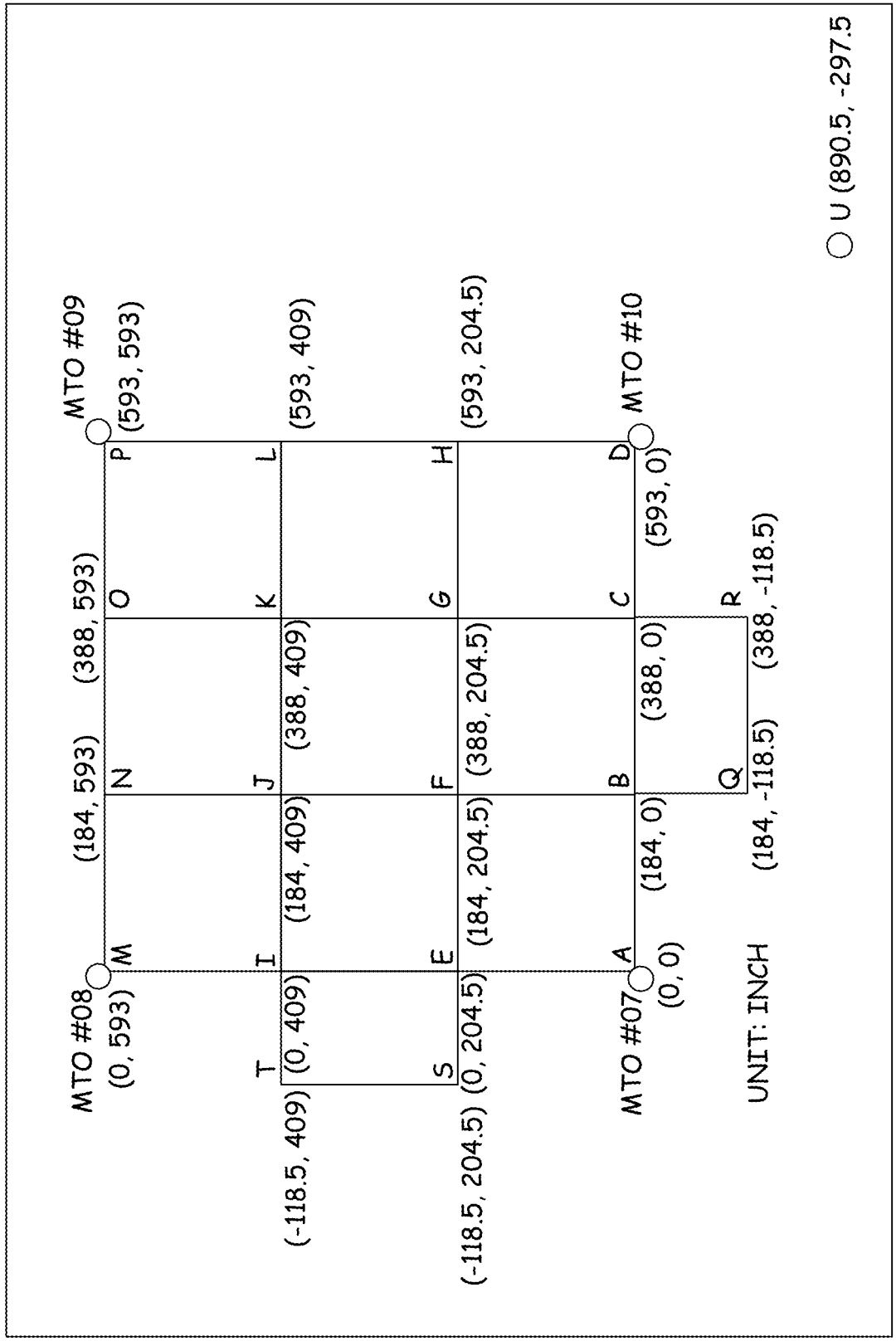
FIG. 32 is a layout of BLE Beacons in a test environment.
Figure 33:
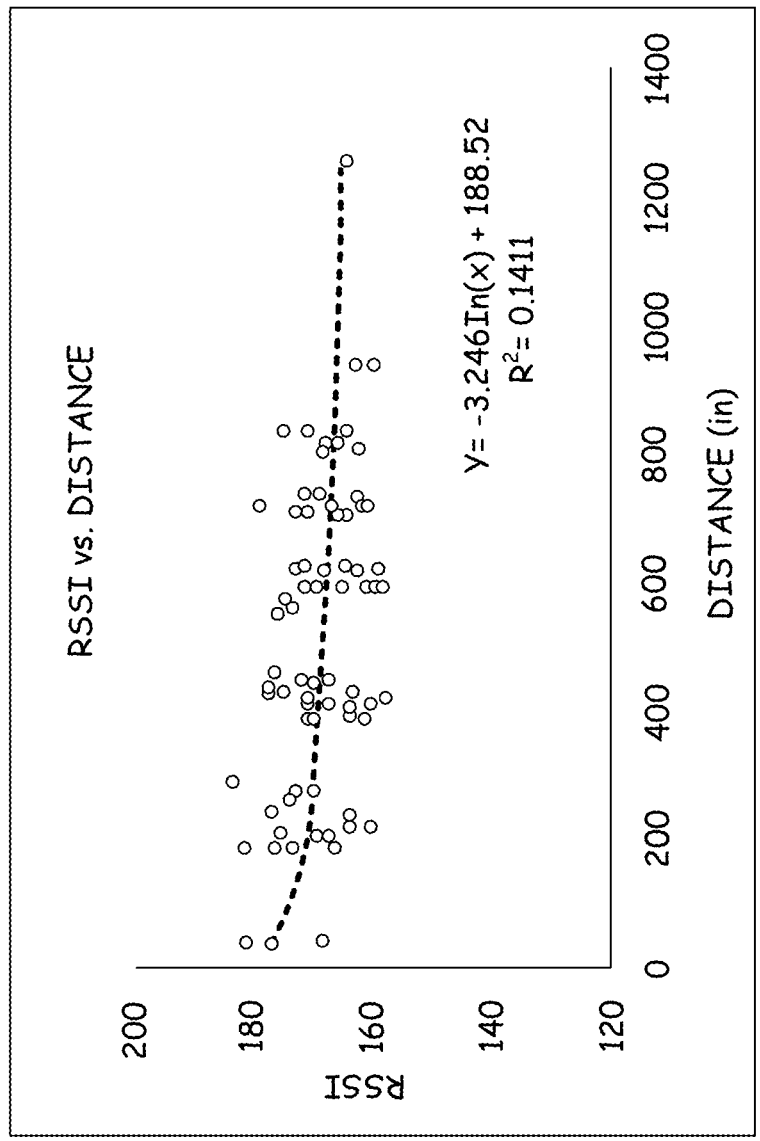
FIG. 33 is a graph of raw RSSI measurements as a function of distance.

We tested the reprogrammed BLE beacons and explored the relationship between actual distance and the RSSI values in the atrium of the Ralph Rapson Hall (FIG. 32) on the University of Minnesota east bank campus. A layout of the reference points and placement of four BLE beacons (located at A, D, M & P) are illustrated. The relationship between the RSSI reading and actual distance to each Bluetooth beacon from all locations as shown in FIG. 32 is plotted in FIG. 33. The results suggest a logarithmical relationship between the measured RSSI and actual distance. However, the distance estimation based on measured RSSI has a relatively low coefficient of determination (R2=0.14). The distance estimation based on the raw RSSI measurement is not reliable. We therefore cannot use the distance estimates to determine whether beacons have moved.

Figure 34:
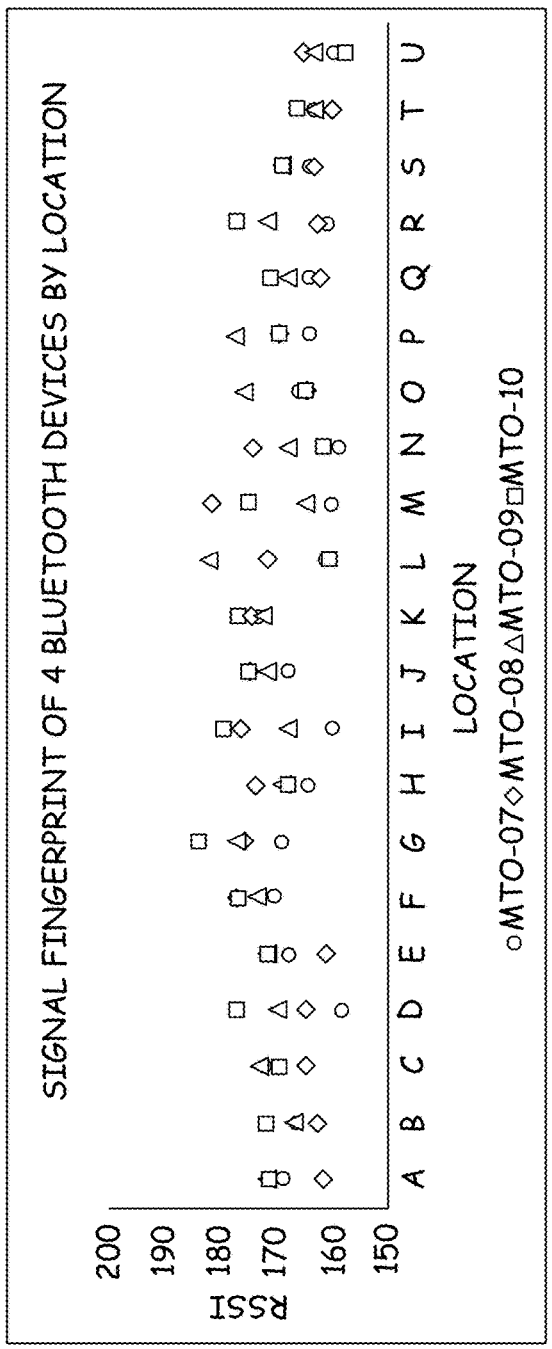
FIG. 34 is a graph of average RSSI measurements for four Bluetooth beacons by location.

We used the NWSLC based BLE fingerprinting technique to monitor the changes of RSSI values received from other Bluetooth beacons. The RSSI variation of Bluetooth beacons at each test location is displayed in FIG. 34. FIG. 34 displays the average RSSI measures of 4 beacons at A, D, M & P from location A to U. When a Bluetooth beacon is operating in scanning (master) mode and monitoring its neighboring beacons, the measured RSSI from all the other Bluetooth beacons within its range of communication are stored in local memory. If one of the neighboring Bluetooth beacons is moved, vandalized or malfunctions, the signal pattern at that particular location will be different from the historical pattern. Therefore, an alert can be triggered to inform the system administrator.

Figure 35:
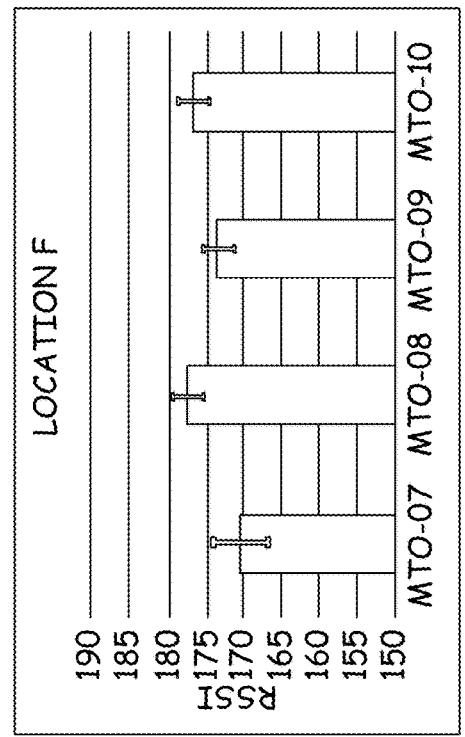
FIG. 35 is a graph of RSSI measurement and variation for four BLE beacons measured at location F.

For example, the average RSSI measurements from a mobile device placed at location F to the other four Bluetooth beacons are displayed in a column chart as shown in FIG. 35. The four BLE beacons are 49.4 ft (15 m) apart from each other in both the longitudinal and lateral directions. The smartphone, when placed at location F, exhibits a range of 23 ft (7 m), 36 ft (11 m), 47 ft (14 m), and 38 ft (12 m) to beacons #7, #8, #9, and #10, respectively. The red ticks plotted on each column represent the RSSI value of one standard deviation above and below the average measurement.

Figure 36:
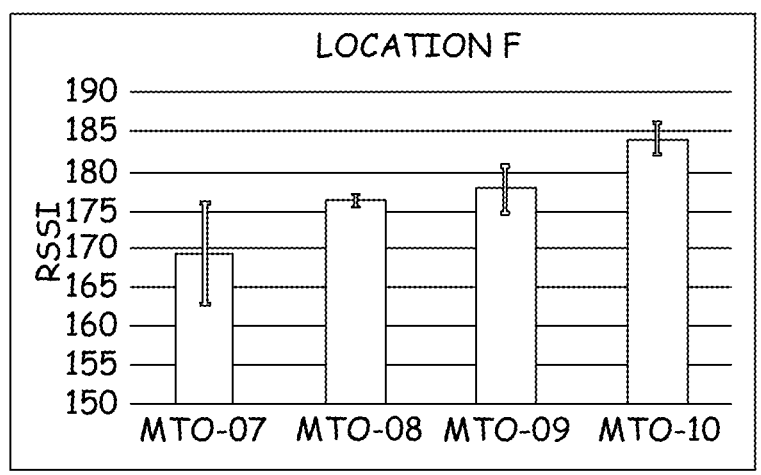
FIG. 36 is a graph of RSSI measurement and variation for four BLE beacons measured at location G.

Similarly, the fingerprint of the RSSI values and corresponding variations with the mobile device placed at location G is shown in FIG. 36. Location G is about 17 feet (5.2 m) east of location F as illustrated in FIG. 32. The mobile device, when placed at location G, exhibits a range of 37 ft (11 m), 46 ft (14 m), 37 ft (11 m), and 24 ft (7 m) to beacons #7, #8, #9, and #10, respectively. Each of these signal patterns is used to determine if any of the neighboring Bluetooth beacons (labeled MTO-07 to MTO-10) has been removed or has stopped functioning.

Figure 37:
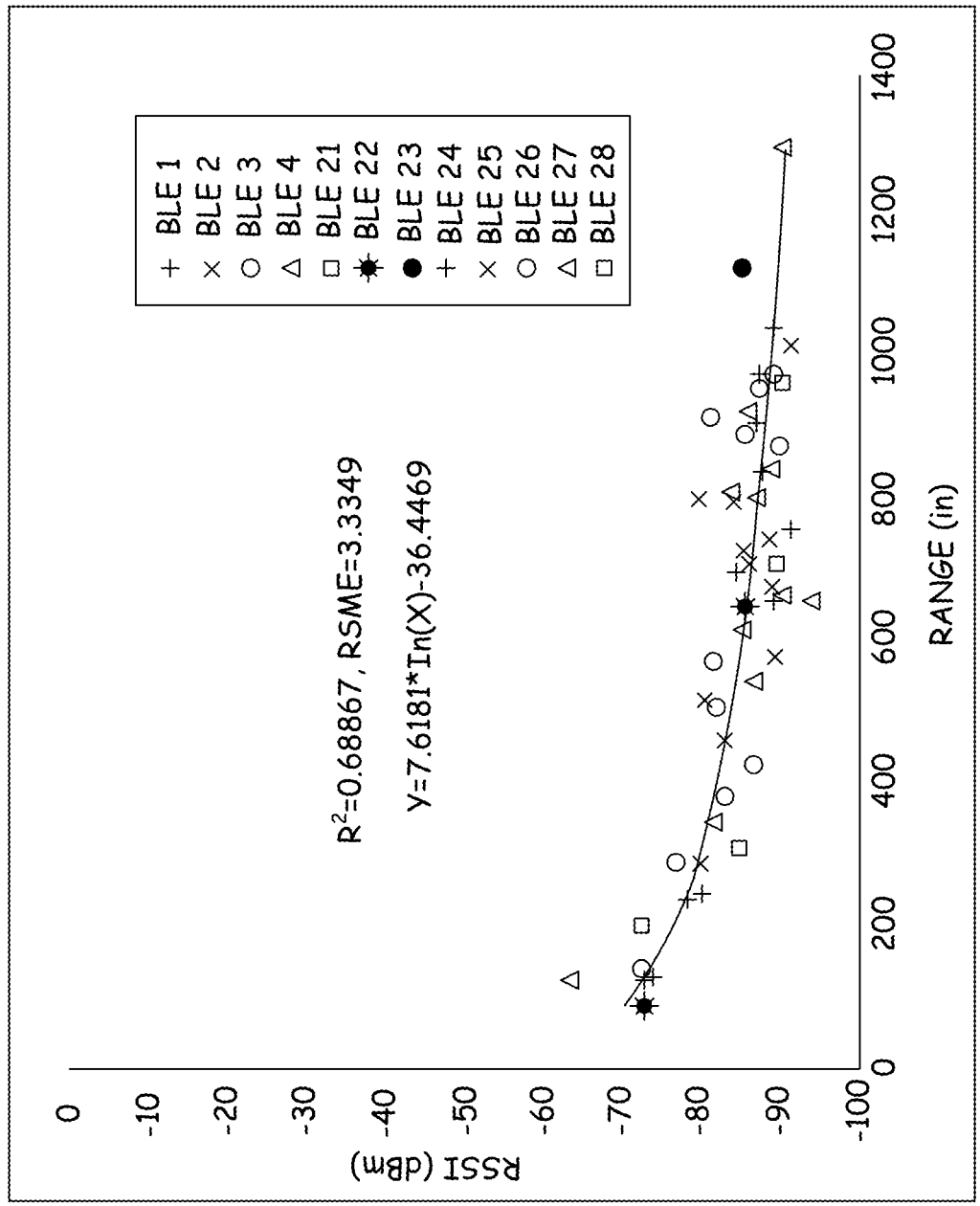
FIG. 37 is a graph of RSSI as a function of distance.

A similar analysis for 12 BLE beacons placed in an outdoor environment was also conducted to examine the RSSI-distance relationship as displayed in FIG. 37. The beacons were placed at fixed locations and a user with a mobile device walked to multiple locations to collect the RSSI data. The RSSI measurements from BLE beacons may vary by location due to the environmental dynamics and nature of the Bluetooth wireless medium.

Table 8 display a sample list of RSSI values received by a Bluetooth module when it scans its neighboring Bluetooth modules. Each Bluetooth module is referred to as a Node with a node ID that is represented by the MAC ID of the Bluetooth beacon.

TABLE 8

Sample List of Bluetooth RSSI Data

| Intersection ID | Node ID | Neighboring Node ID | RSSI |
| --- | --- | --- | --- |
| 101 | 00:12:F3:0B:4A:11 | 00:12:F3:0B:4A:27 | −93 |
| 101 | 00:12:F3:0B:4A:27 | 00:12:F3:0B:49:A6 | −87 |
| 101 | 00:12:F3:0B:49:A6 | 00:12:F3:0B:49:4C | −108 |
| 101 | 00:12:F3:0B:49:4C | 00:12:F3:0B:4A:11 | −95 |

RSSI Mapping and Positioning Experiment at Intersection

Figure 38:
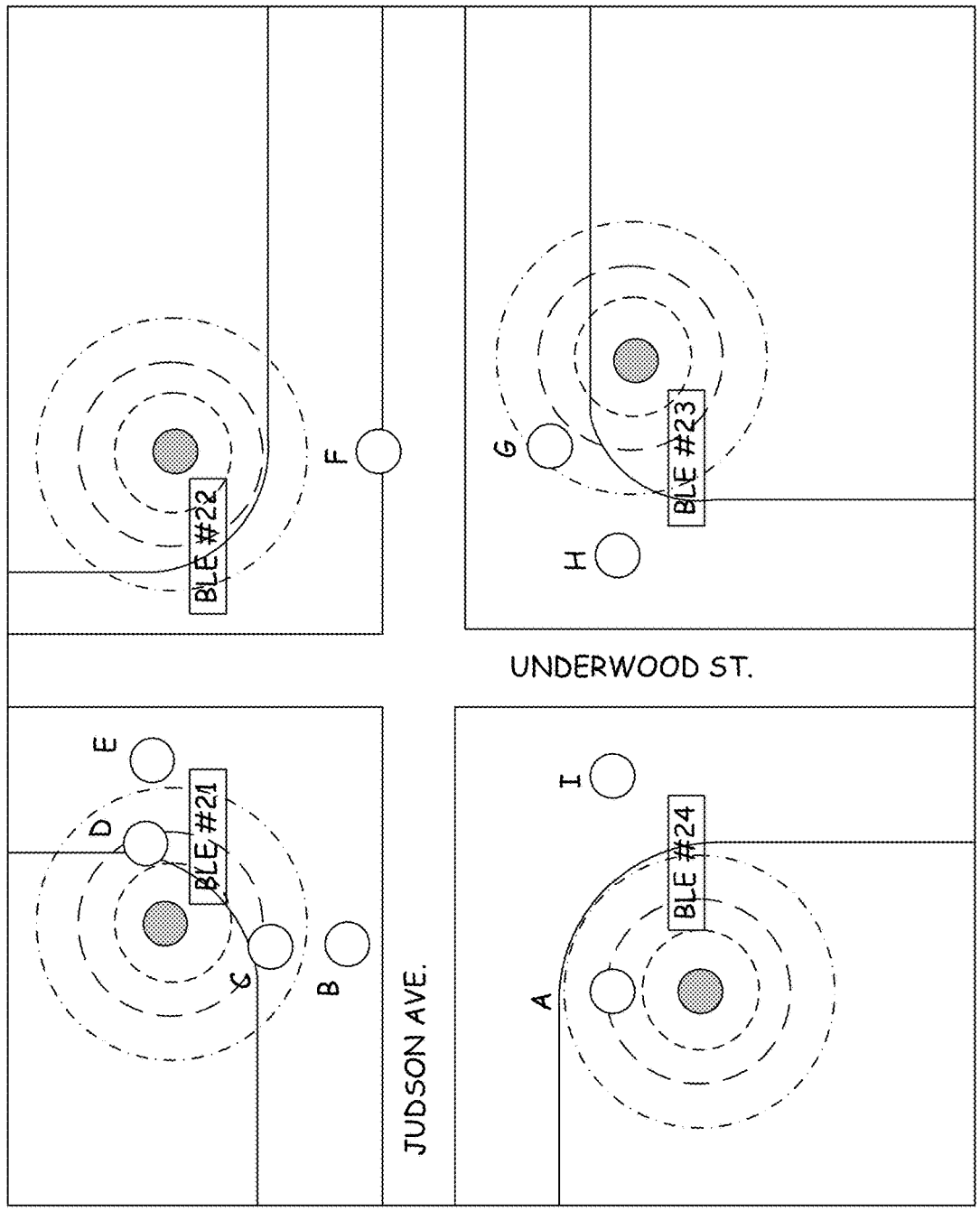
FIG. 38 is a plan view of a Bluetooth beacon network.
Figure 39:
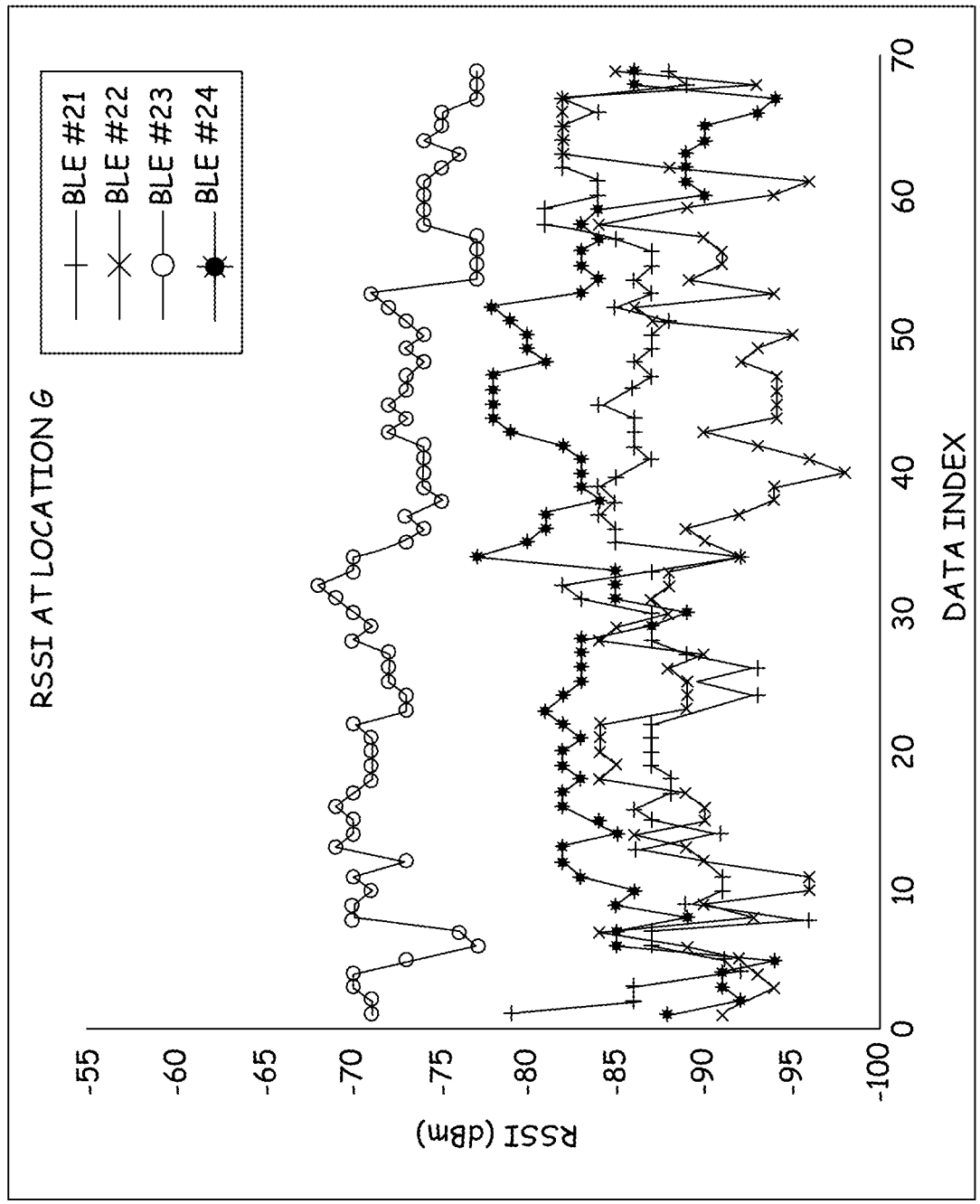
FIG. 39 is a graph of RSSI received from four beacons at location G over time.
Figure 40:
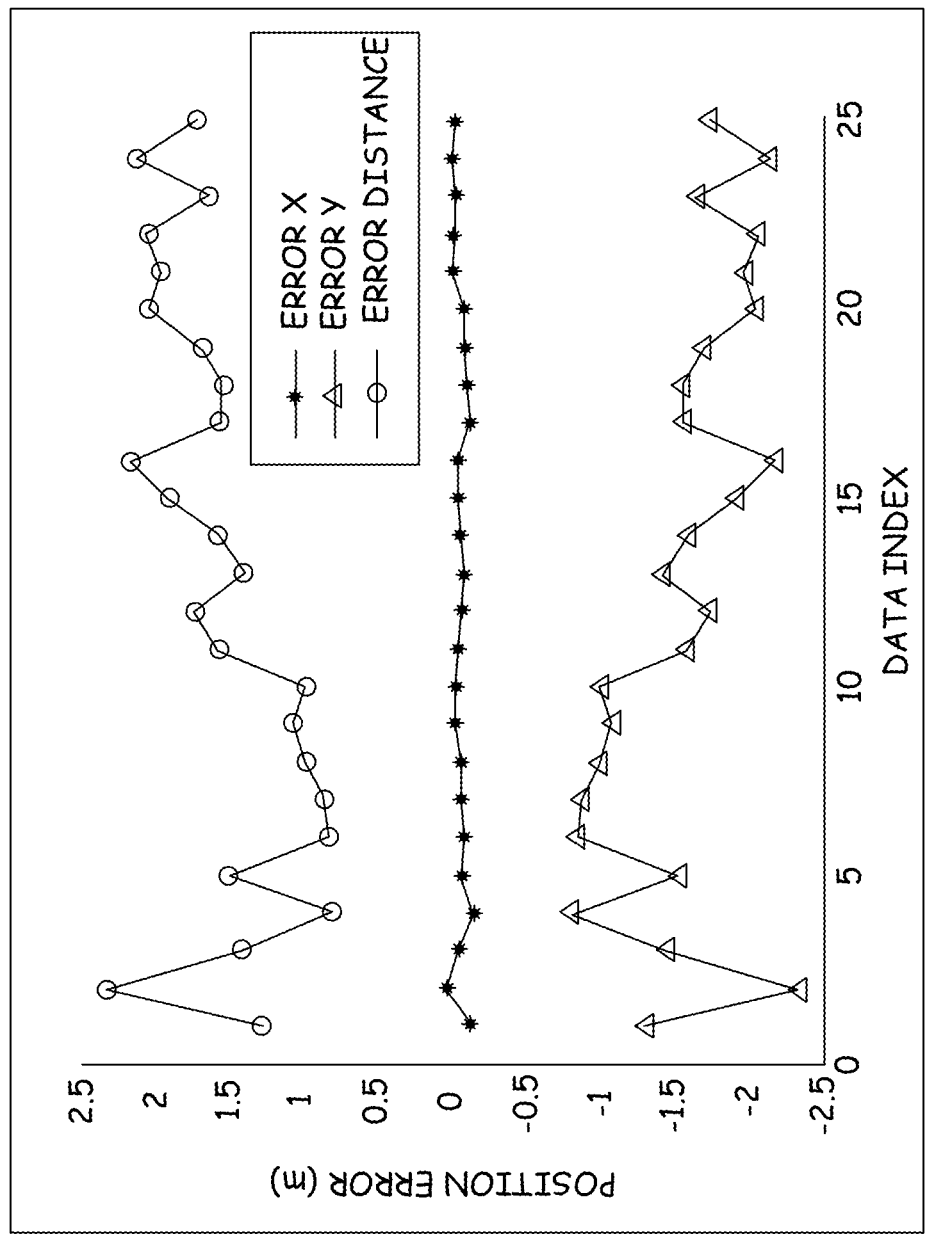
FIG. 40 is a graph of position error at location A using a MR-SVD-EKF method.
Figure 41:
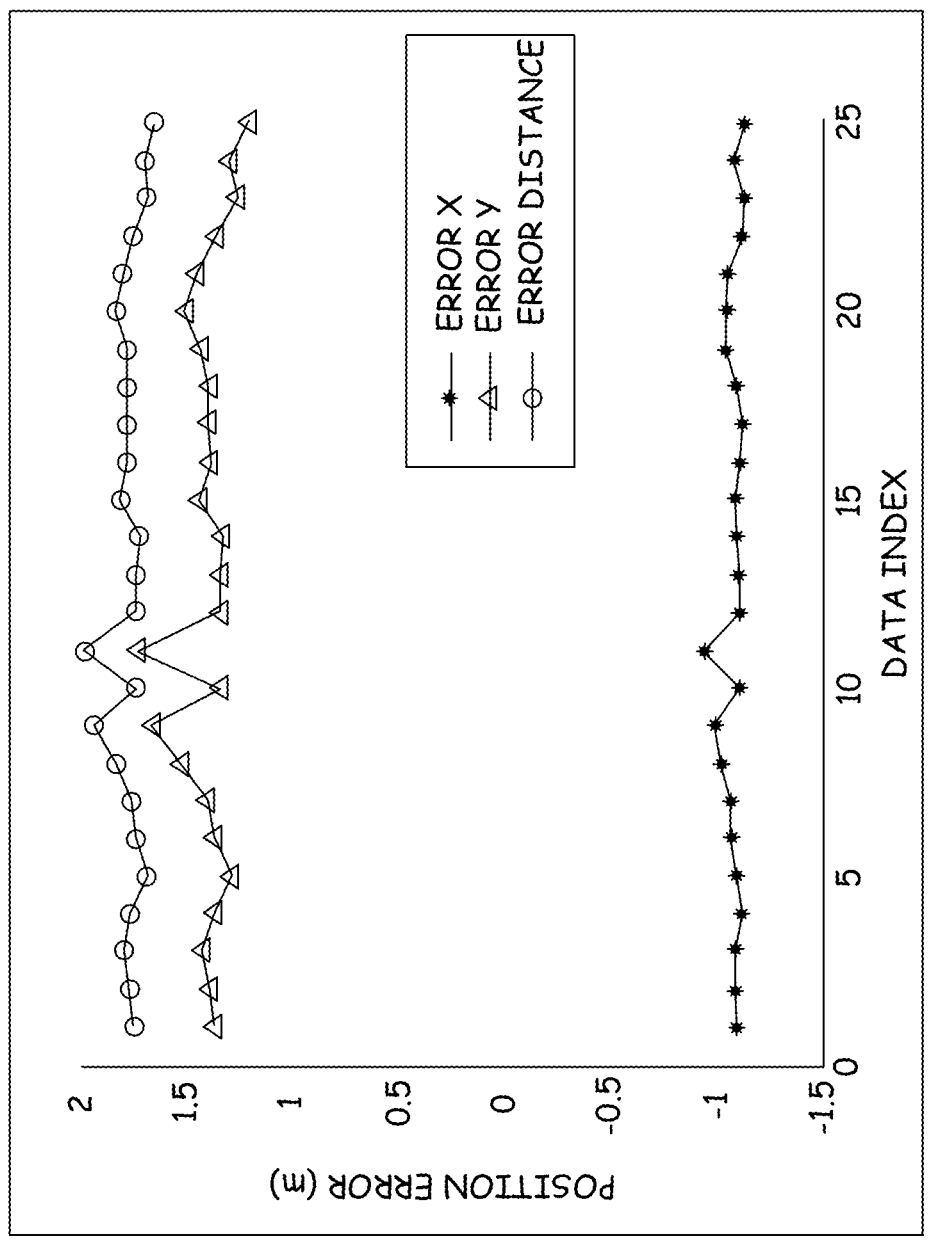
FIG. 41 is a graph of position error at location C using a MR-SVD-EKF method.
Figure 42:
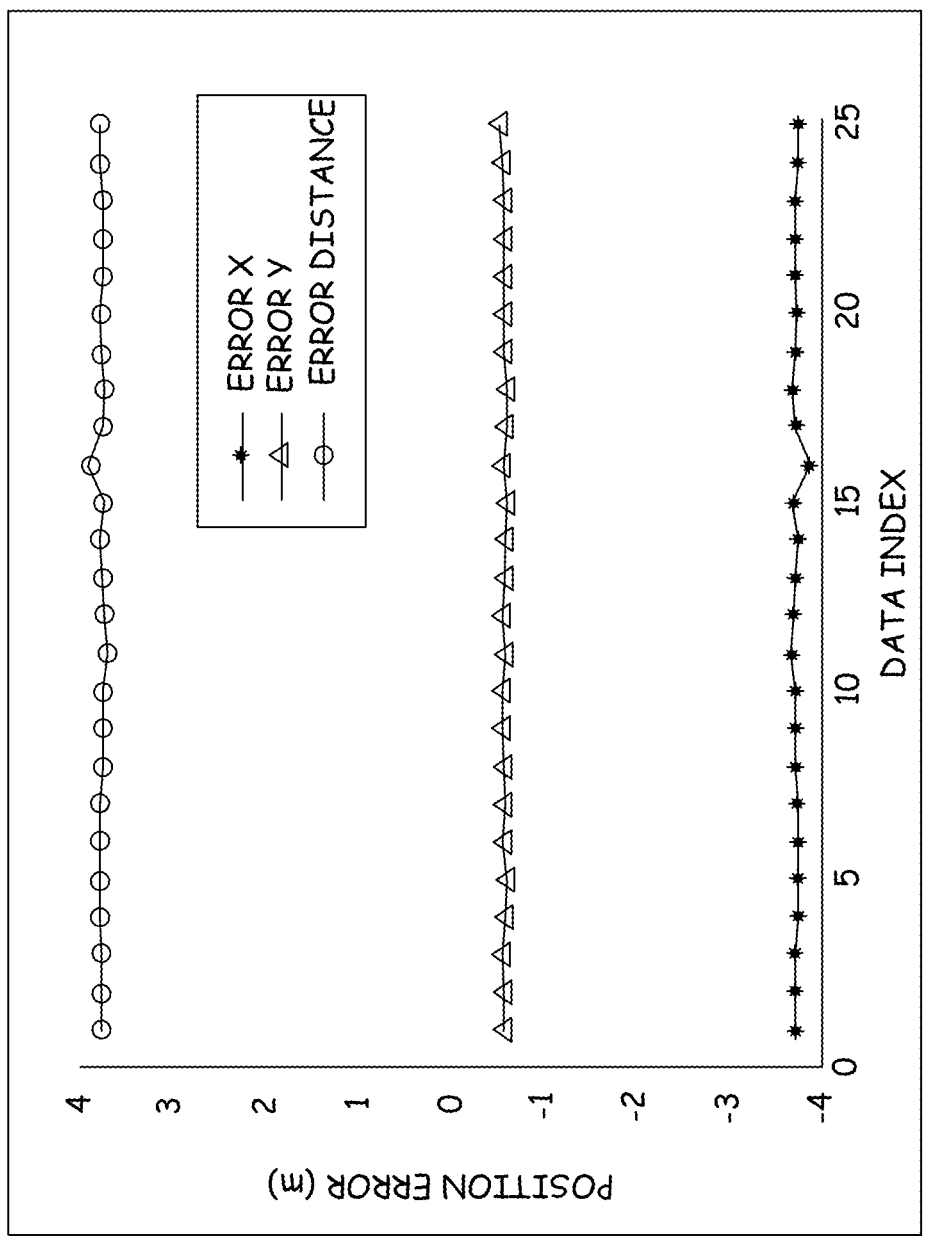
FIG. 42 is a graph of position error at location D using a MR-SVD-EKF method.
Figure 43:
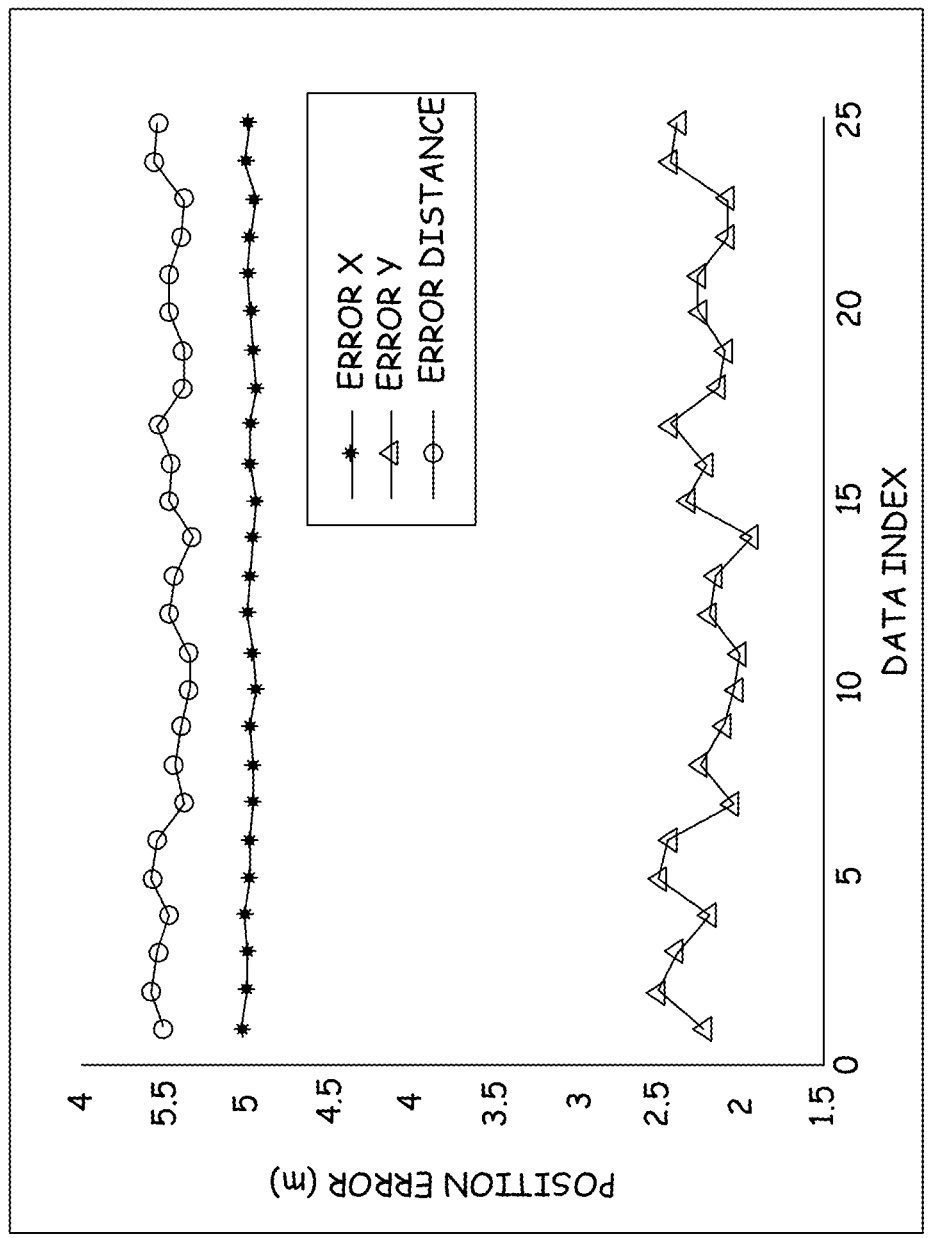
FIG. 43 is a graph of position error at location H using a MR-SVD-EKF method.

Four Bluetooth low energy beacons were installed at an intersection (Judson Ave. and Underwood St.) in St. Paul as illustrated in FIG. 38. Nine reference points (location A to I) were selected as position references where a mobile device was located in order to collect RSSI measurements from four BLE beacons (BLE #21-24 as shown in FIG. 38). FIG. 39 displays a sample of raw (noisy) RSSI signals received from 4 other BLE beacons (BLE #21-#24) from a mobile device placed at location G (as shown in FIG. 38).

We first implemented the Logarithmic Curve Fitting (LCF) based RSSI-range model for range estimates, but the results were not acceptable. We then implemented the Multivariable Regression (MR) model (discussed above) to estimate the actual distance between BLE beacons. One minute of RSSI data was collected at all 9 locations (A to I) using a mobile device at the test site as illustrated in FIG. 38. Each collected dataset include RSSI received from all other neighboring BLE beacons. The estimated distance between the mobile device and each BLE beacon is then provided to the Extended Kalman Filter (EKF) to determine the location of the mobile device.

We collected RSSI measures from a mobile device at 9 locations (A to I as shown in FIG. 38) near the intersection to validate our methodologies. We used equation (5-10) and (5-11) for our data modeling and analysis. The number of BLE beacons is 4 (n=4) and number of RSSI measurements for the MR model is 20 (m=20). The first two (p=2) singular values are selected in equation (5-19) for the weighting matrix $\Gamma$ to improve the range estimates.

Figure 44:
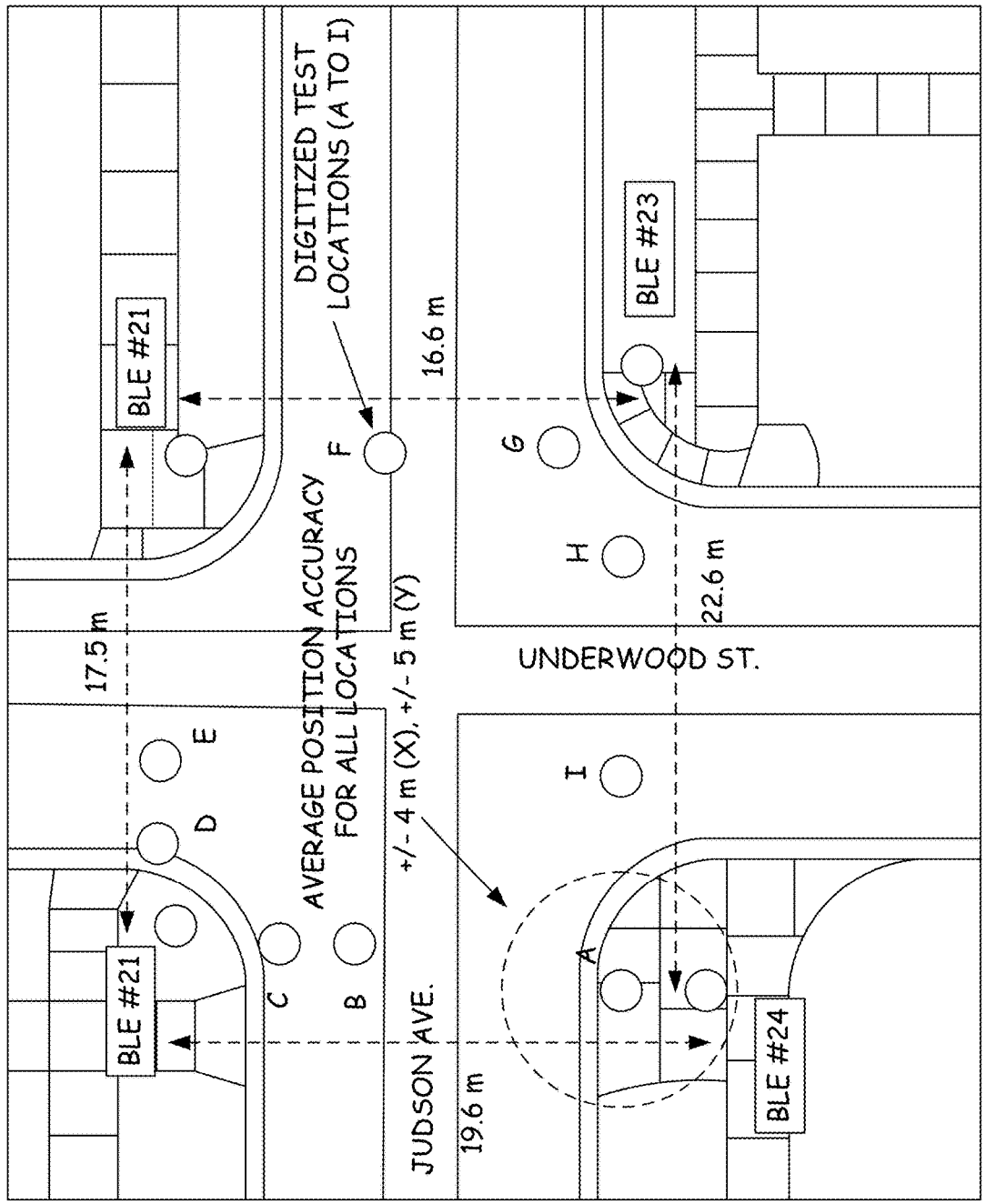
FIG. 44 is a plan view of a BLE beacon network.

FIGS. 40-43 respectively display the position error in both X and Y directions at location A, D, F and H (as indicated in FIG. 38), respectively. Table 9 compares the average position error of the 9 locations for both models. The LCF and EKF combined model has an average position error of 7.3 m (X axis) and 9.5 m (Y axis), respectively. The MR and EKF combined model improves the position error by about 44% with an average position error of 4.1 m (X axis) and 5.4 m (Y axis), respectively, for all 9 positions. At some locations, such as A & C, the average position errors are less than 2 m. However, the position errors at location D & H are almost 5 m. The average positioning accuracy is illustrated in FIG. 44.

The positioning solution from the combined MR and EKF method is significantly better than the LCF and EKF combined approach. Although, the positioning performance is not sufficient for detecting a pedestrian veering at crosswalks. It provides acceptable positioning to identify a person's location at a corner of an intersection in a GPS unfriendly environment.

TABLE 9

Comparison of Average Position Error

| | Absolute Position Error (m) | | Standard Deviation (SD) | |
|---|---|---|---|---|
| Direction | X | Y | X | Y |
| LCF + EKF | 7.3 | 9.5 | 5.7 | 6.2 |
| MR + EKF | 4.1 | 5.4 | 3.8 | 4.4 |
| % Change | −44.1% | −43.6% | −33.3% | −29.0% |

CUSUM Analysis for Detecting BLE Location Changes

Figure 45:
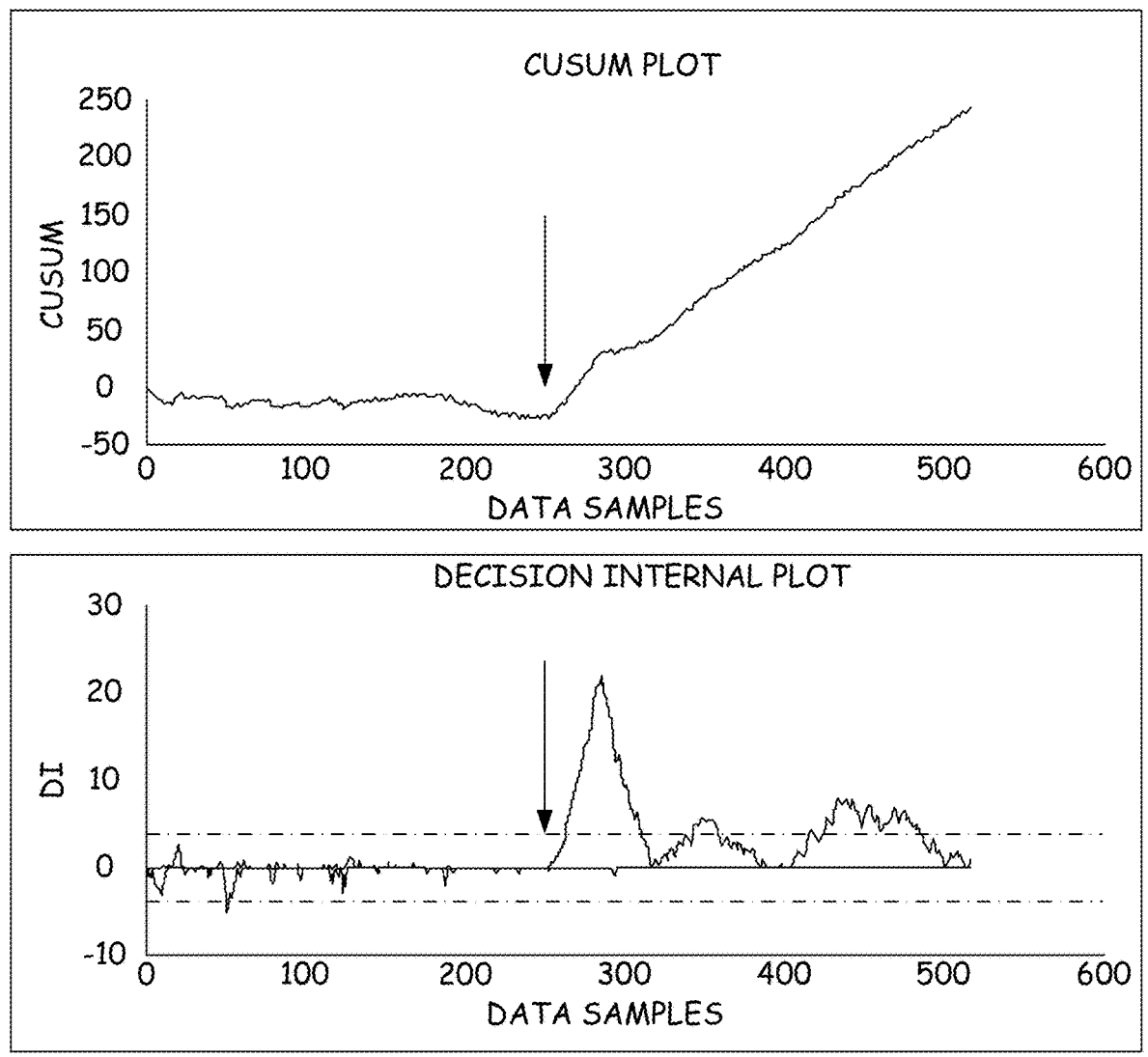
FIG. 45 shows graphs of CUMSUM and DI for a moving BLE beacon.

In order to detect the location change of a BLE beacon or changes of a BLE network geometry, the methodologies described above were used for validation. Experiments were conducted by moving one of the BLE beacon at 3 meter increments in both the lateral and longitudinal directions. FIG. 45 displays the CUSUM and Decision Interval (DI) plots when a BLE beacon (for example, BLE #22, as shown in FIG. 5-34) was moved away from its neighboring node (BLE #21) for about 6 meters after 50 seconds (250 samples). The CUSUM algorithm is able to detect changes of RSSI shortly after BLE #22 beacon is removed as indicated by the down arrow shown in FIG. 45.

Test results of moving the BLE beacons are listed in Table 10. Table 10 lists the results of a BLE beacon being initially placed at a location from 3 to 33 meters (with 3 meter increments) away from a mobile device with BLE technology. The RSSI measurements were recorded on the mobile device for CUSUM analysis. The BLE beacon is first moved 3 or 6 meters toward from the mobile device. The beacon is then moved 3 or 6 meters away from the mobile device to evaluate the success rate of CUSUM detection. Our results indicate that the CUSUM detection algorithm is able to detect the location changes of a peer BLE beacon at 3 meters range 86% of the times. The CUSUM detection rate increases to 100% when a BLE tag is moved over 6 meters away from its original location.

TABLE 10

Success Rate of CUSUM Test for Detecting BLE Location Change

| | CUSUM Detection | | | |
|---|---|---|---|---|
| Starting | Move away from a peer | | Move toward a peer | |
| Location (m) | +3 meters | +6 meters | −3 meters | −6 meters |
| 3 | Yes | Yes | NA | NA |
| 6 | No | Yes | Yes | Yes |
| 9 | Yes | Yes | No | Yes |
| 12 | Yes | Yes | Yes | Yes |
| 15 | Yes | Yes | Yes | Yes |
| 18 | Yes | Yes | Yes | Yes |
| 21 | Yes | Yes | Yes | Yes |
| 24 | Yes | Yes | Yes | Yes |
| 27 | Yes | Yes | Yes | Yes |
| 30 | Yes | Yes | No | Yes |
| 33 | Yes | Yes | Yes | Yes |

RSSI Fingerprint for BLE Network Configuration Changes

Figure 46:
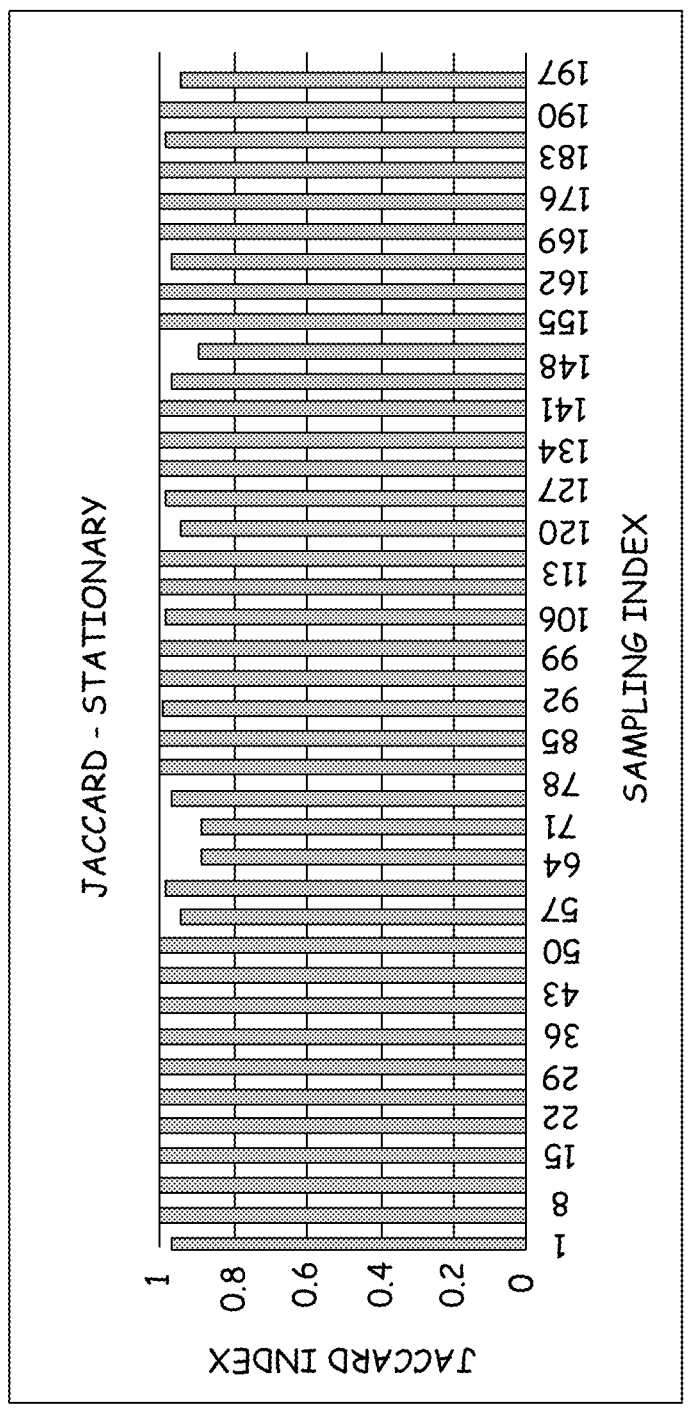
FIG. 46 is a graph of a Jaccard Index for a non-changing BLE network.
Figure 47:
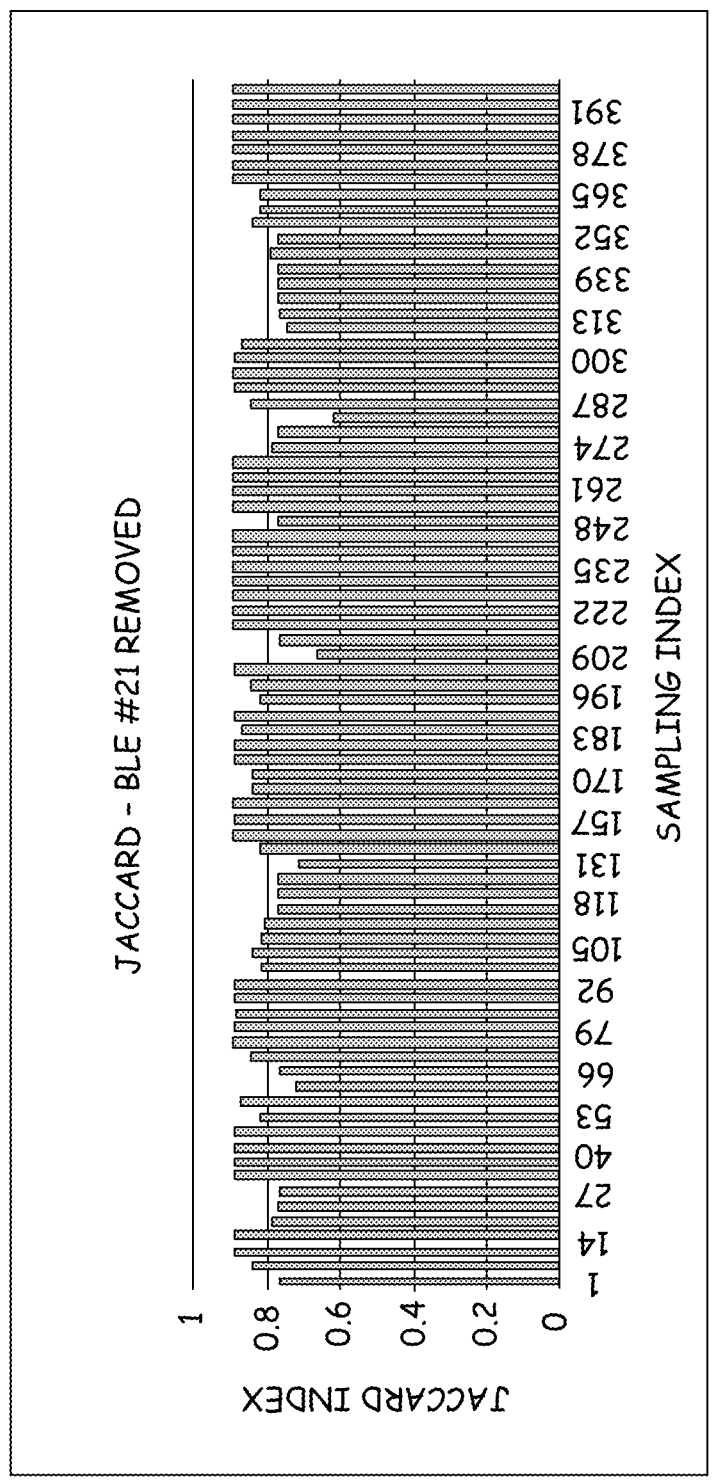
FIG. 47 is a graph of the Jaccard Index when a BLE is removed from the network.
Figure 48:
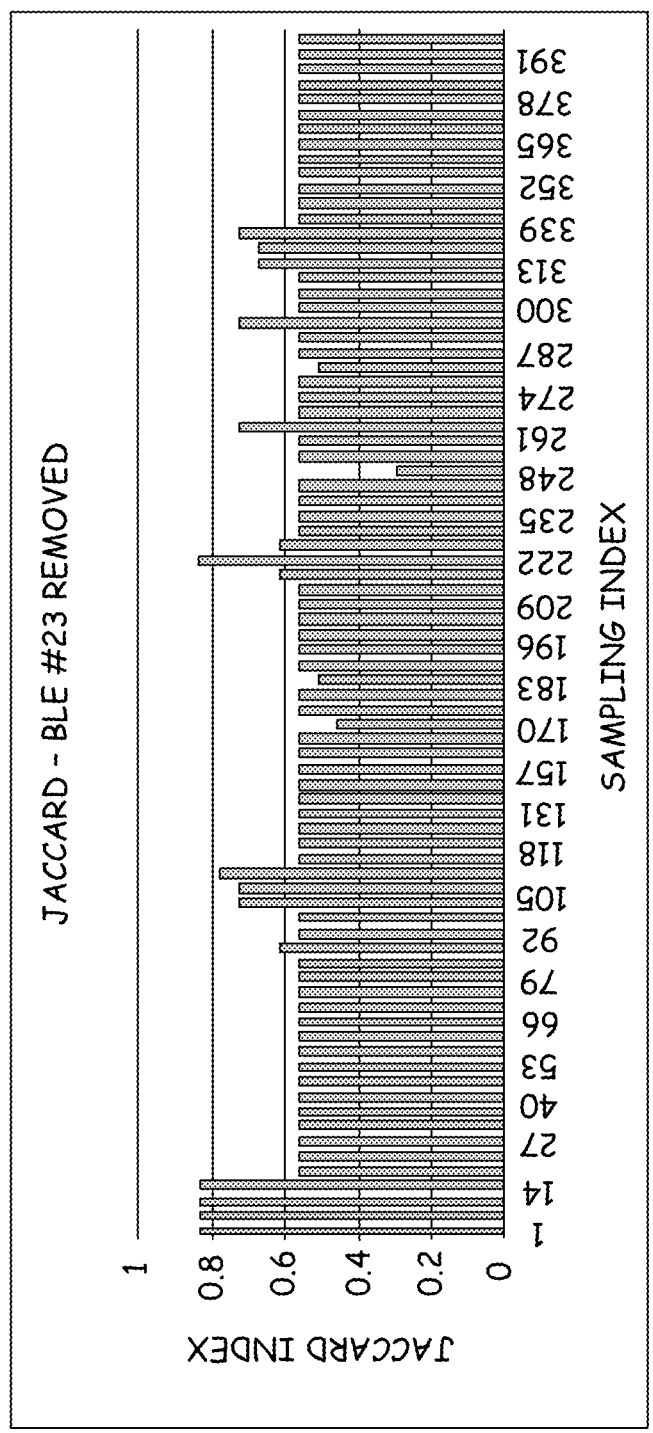
FIG. 48 is a graph of the Jaccard Index when a different BLE is removed from the network.

We validated both RSSI signal fingerprint techniques, the Jaccard and the NWSLC index, as discussed above. FIG. 46 shows the Jaccard index signature of the Judson Ave. and Underwood St. intersection as displayed in FIG. 38 when all 4 BLE beacons are mounted at their original locations. The initial Jaccard signature is based on 196 sets of RSSI measurements. When BLE #21 is removed from the network, the RSSI fingerprint changes and the average Jaccard index drops from 0.98 to 0.82 as shown in FIG. 47. Similarly, the average Jaccard index drops from 0.98 to 0.53 (as plotted in FIG. 48) when BLE #21 is returned back to its original location and BLE #23 is removed from the network.

Figure 49:
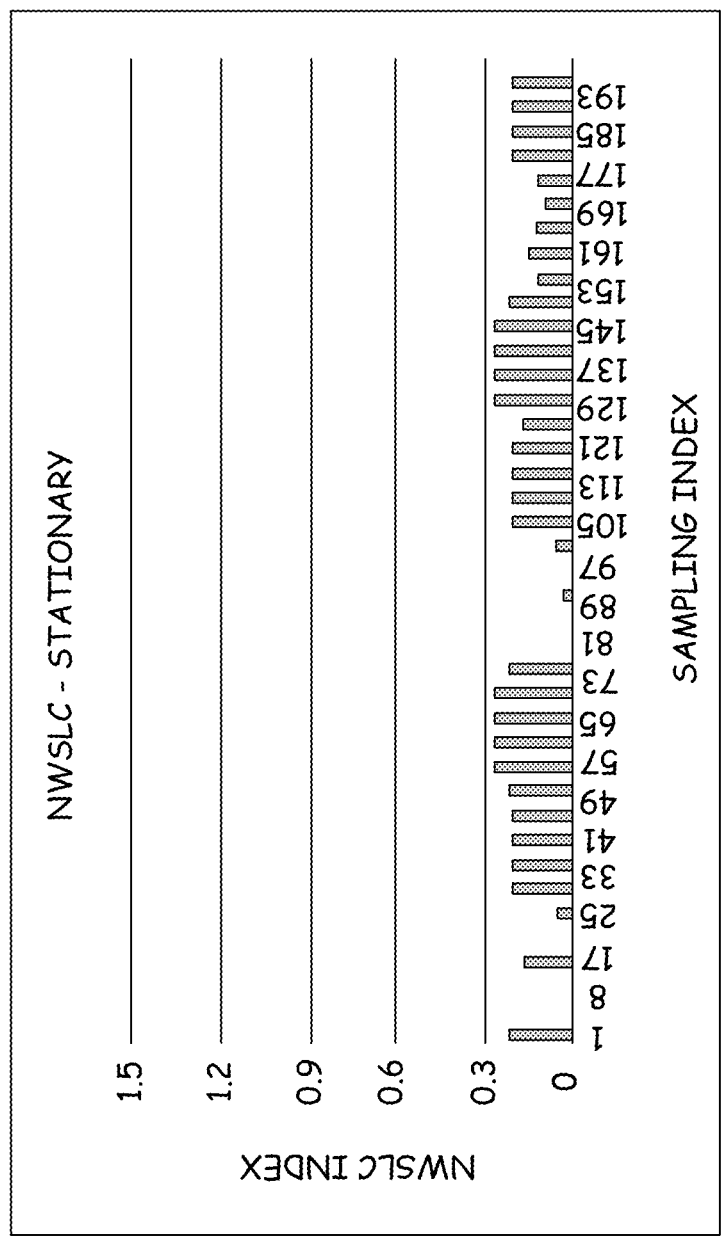
FIG. 49 is a graph of the NWSLC Index for a non-changing BLE network.
Figure 50:
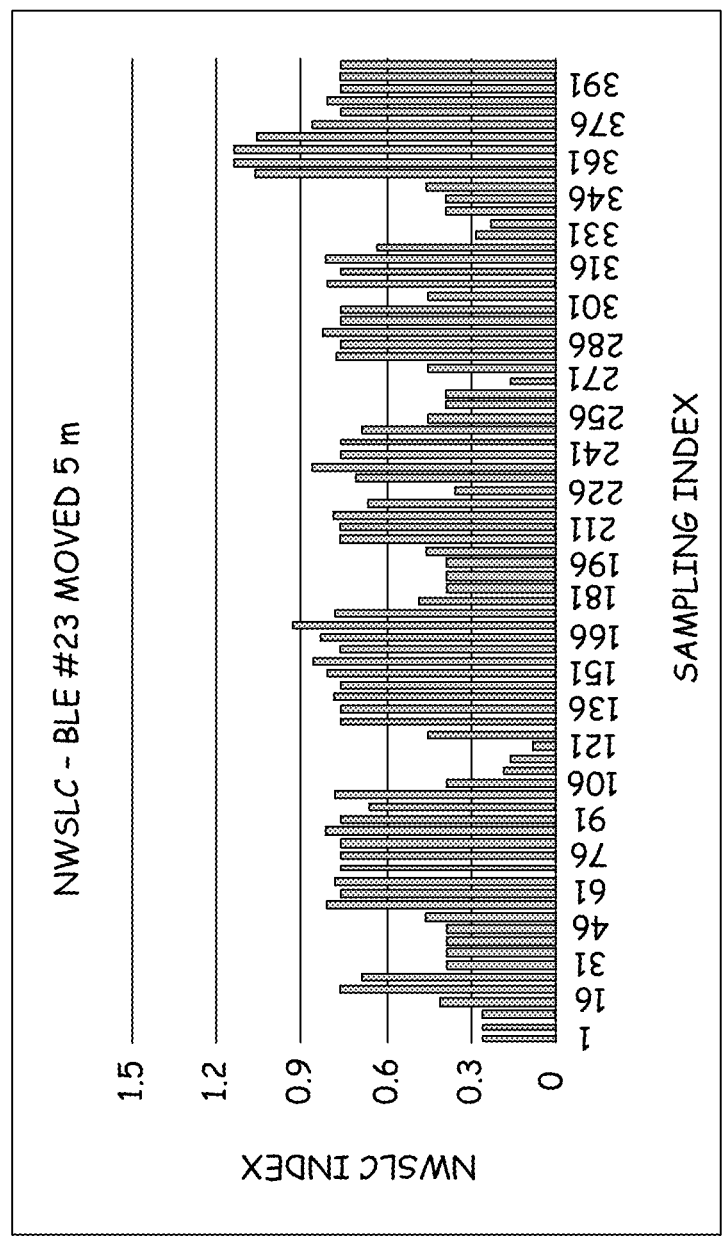
FIG. 50 is a graph of the NWSLC Index when a BLE is moved.
Figure 51:
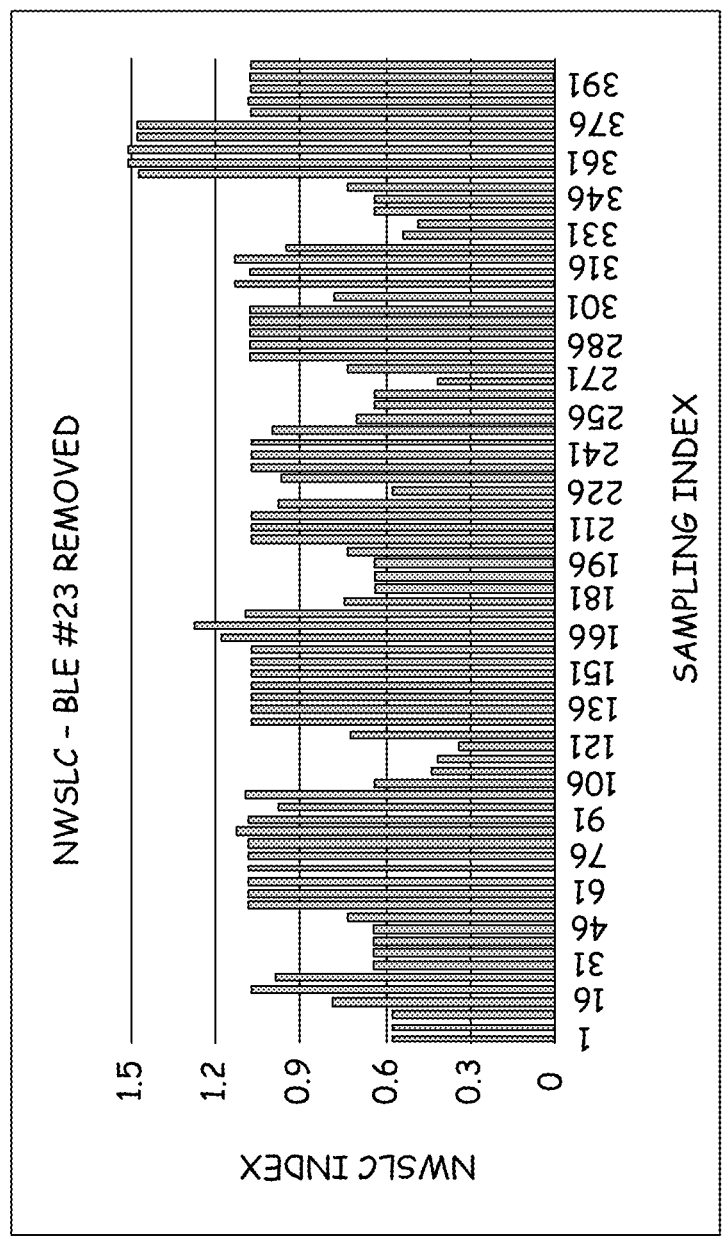
FIG. 51 is a graph of the NWSLC Index when a BLE is removed from the network.

The NWSLC index (from equation 5-45) is also examined at the same intersection. FIG. 49 illustrates the NWSLC index when all BLE beacons are at their original locations based on 196 sets of RSSI measurements. The average NWSLC is 0.15 with a standard deviation (SD) of 0.09. When the BLE #23 is moved 5 meters away, the NWSLC signature changes with an average index increased to 0.62 and its SD is 0.24, as shown in FIG. 50. Our fingerprint method used a two-tailed t-test (at the 95% confidence interval) to confirm a significant change of the NWSLC index pattern. Similarly, the NWSLC index in FIG. 51 increases to 0.91 in average with a SD of 0.28 when the BLE #23 beacon is removed from the self-monitoring BLE network.

Thus, some embodiments described herein provide a position sensing and a self-monitoring infrastructure to ensure information provided to the visually impaired is up-to-date and at right location. We developed a method that uses the ability of a smartphone with Bluetooth to sense the proximity of Bluetooth modules, and their ability to sense each other. For positioning and mapping, we evaluated two methodologies, Logarithmic Curve Fitting (LCF) and Multi Regression (MR), to find a robust positioning solution to identify a user's relative location near an intersection. Our results indicated that the Multivariable Regression (MR) method using Singular Value Decomposition (SVD) algorithm outperforms the LCF method in modeling the relationship between Received Signal Strength Indication (RSSI) and the actual ranging distance in an outdoor environment. The MR-SVD approach successfully reduces the environmental uncertainty and dynamic nature of the RSSI measurements. The range output from the MR-SVD model is integrated with an Extended Kalman Filter (EKF) model to determine a user's location.

Due to the significant noise associated with the RSSI measurements, the LCF model has large position errors (7.3 and 9.5 m in X and Y axis, respectively). The MR-SVD and EKF combined model improves the position error by about 44% (to 4.1 and 5.4 m in X and Y axis, respectively). Because of the low power characteristics of the BLE beacons, the received signal strength is subject to influences from many external parameters.

Although, the positioning performance of the MR-SVD and EKF combined method is not sufficient for detecting pedestrian veering at crosswalks, it provides reasonable positioning to identify a person's location at a corner of an intersection in a GPS-unfriendly environment.

To create the self-monitoring infrastructure, a Cumulative Sum (CUSUM) technique is implemented to monitor if the location of one or multiple BLE beacons in a network is changed based on Bluetooth RSSI measurements. Our results indicate that the CUSUM detection algorithm is able to detect the range changes of a peer BLE beacon of 3 meters 86% of the time. The CUSUM detection rate increases to 100% when a BLE module is moved over 6 meters away from its original location.

In addition, we evaluated two wireless signal fingerprinting indices, the Jaccard and Normalized Weighted Signal Level Change (NWSLC) indices, to detect geometry changes of a BLE network. Both indices were able to successfully detect the change of a BLE beacon when it was moved over by 3 to 6 meters away, removed or disappears (e.g., due to vandalism or lost power) from a network. However, the NWSLC index performs better than the Jaccard index. It normalizes the changes of a signal based on its initial signal states. As a network geometry configuration changes, the NWSLC index increases proportionally to the amount of change with respect to its initial signal strength.

The MR-SVD and EKF combined method is incorporated in our system for positioning. The CUSUM and NWSLC techniques are both incorporated in our system for self-monitoring infrastructure. The CUSUM is used to detect changes between 2 BLE beacons. And, the NWSLC index is used to monitor the changes of BLE network geometry.

Figure 52:
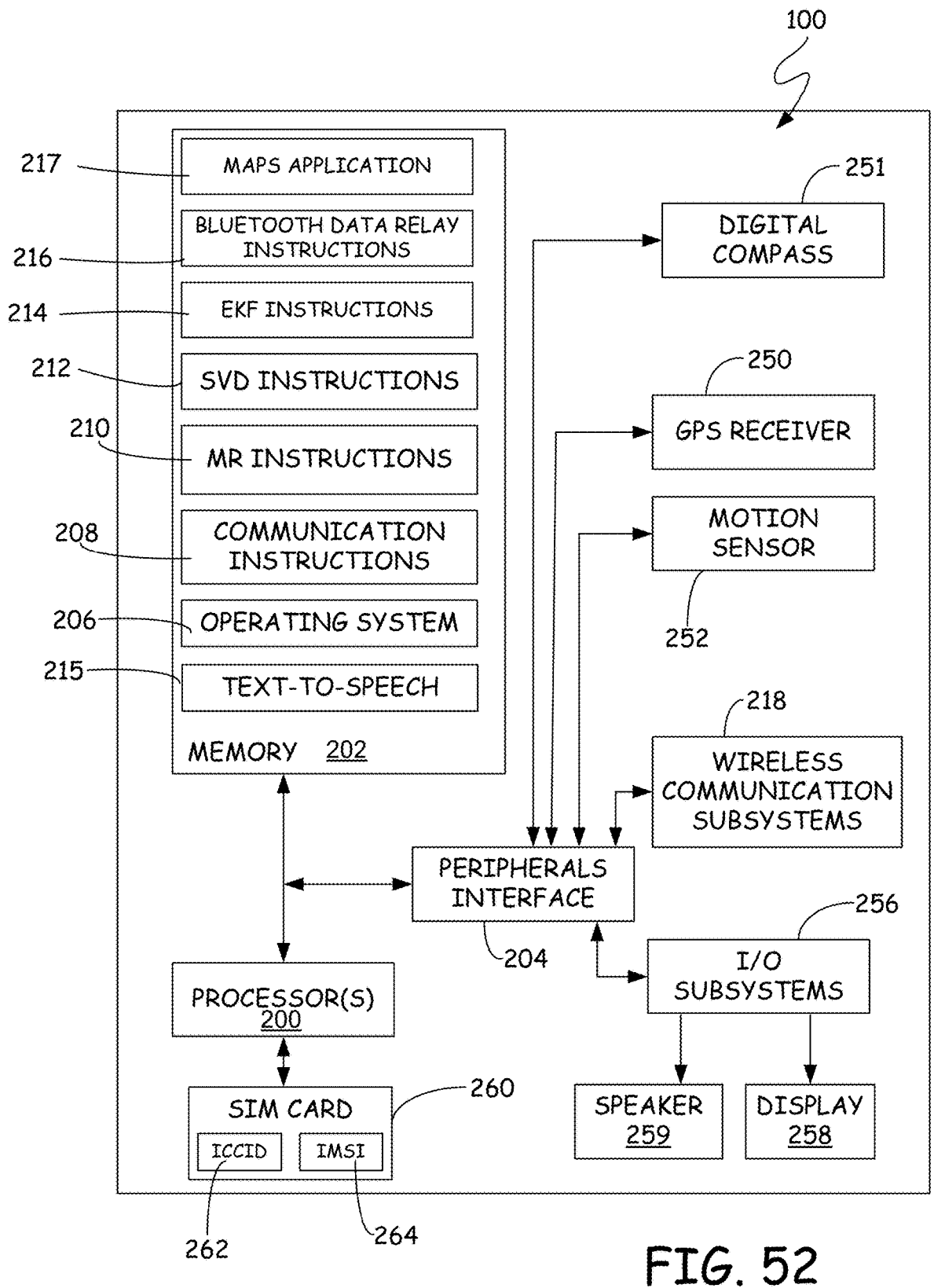
FIG. 52 provides a block diagram of an exemplary mobile device/smart phone that can be used with the various embodiments.

FIG. 52 provides a block diagram of an example implementation of mobile device/smart phone 100 that can be used with the embodiments described above. Mobile device 100 includes one or more processors 200, such as a central processing unit or image processors, and a memory 202. Processor(s) 200 and memory 202 are connected by one or more signal lines or buses. Memory 202 includes an operating system 206 that includes instructions for handling basic system services and performing hardware-dependent tasks. In some implementations, operating system 206 can be a kernel. Memory 202 also includes various instructions representing applications that can be executed by processor(s) 200 including communication instructions 208, MR instructions 210, SVD instructions 212, EKF instructions 214, Text-to-Speech instructions 215, Bluetooth data relay instructions 216, and MAPS application 217. MR instructions 210 perform the multi-variable regression discussed above, SVD instructions 212 perform the singular value decomposition discussed above, and EKF instructions 214 perform the extended Kalman filtering discussed above to identify a location of mobile device 102 based on Bluetooth signals received from one or more Bluetooth beacons. Bluetooth relay instructions 216 relay signal strengths and MAC ids received from Bluetooth beacons to a server through wireless communication subsystems 218, which permit communication over Wi-Fi and cellular networks. The relayed signal strengths and MAC ids are used by the server to determine if the network of Bluetooth beacons has changed. and MAPS application 217 uses the position information provided by MR instructions 210, SVD instructions 212, and EKF instructions 214 to retrieve the audio description of an intersection geometry or work zone that mobile device 102 is near, broadcast that audio information through speaker 259 and submit requests for pedestrian crossing to traffic signal controllers as discussed above. Memory 202 can also store intersection geometry information and work zone information for areas beyond the current location of the mobile device such that if communication is lost with the server, the mobile device can continue to guide the user. Communication instructions 208 allow processor 200 to communicate through peripheral interface 204 and wireless communication subsystems 218 to a cellular network and other devices such as the Bluetooth Low Energy Beacons.

Peripheral interface 204 also provides access between processor(s) 200 and one or more of a GPS receiver 250, digital compass 251, motion sensors 252, and input/output subsystems 256. GPS receiver 250 receives a signal from GPS satellites and converts the signals into longitudinal and latitude information describing the location of mobile device 102. As discussed above, the position of mobile device 102 is further determined by applying the signal strengths received from Bluetooth Beacons to MR instructions 210, SVD instructions 212, and EKF instructions 214.

Motion sensors 252 can take the form of one or more accelerometers, a magnetic compass, a gravity sensor and/or a gyroscope. Motion sensors 252 provide signals indicative of movement or orientation of mobile device 102.

I/O subsystems 256 control input and output for mobile device 102. I/O subsystems 256 can include a touchscreen display 258 which can detect contact and movement or break thereof using any of a plurality of touch sensitivity technologies including, but not limited to capacitive, resistive, infrared and surface acoustic wave technologies as well as other proximity sensor arrays or other elements for determining one or more points of contact with display 258. Other inputs such as one or more buttons, rocker switches, thumb wheel, infrared port, USB port and/or pointer device such as a stylus. Other outputs include a speaker 259 through which audio descriptions of intersection geometry and work zone alerts can be broadcast to the user.

Mobile device 102 also includes a subscriber identity module, which in many embodiments takes the form of a SIM card 260. SIM card 260 stores an ICCID 262 and an IMSI 264. ICCID 262 is the Integrated Circuit Card Identifier, which uniquely identifies this card on all networks. IMSI 264 is the international mobile subscriber identity, which identifies the SIM card on an individual cellular network. When communicating through wireless communication subsystems 218, processors 200 can use identifiers 262 and/or 264 to uniquely identify mobile device 102 during communications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving from a mobile device respective signal strengths of signals received by a first placed beacon, separate from the mobile device, wherein the signals were received by the first placed beacon from a plurality of other placed beacons including from a second placed beacon and the signal strengths were stored on the first placed beacon and then the signal strengths were relayed through the mobile device when the mobile device came into a communication range of the first placed beacon;

comparing the received signal strength of the signal received by the first placed beacon from the second placed beacon to a past signal strength for signals received by the first placed beacon from the second placed beacon; and using the comparison to indicate that the second placed beacon may have been moved relative to the first placed beacon.

2. The method of claim 1 further comprising after indicating that the second placed beacon may have been moved relative to the first placed beacon, using the signal strengths received from the mobile device to determine a network fingerprint of the plurality of placed beacons and using the network fingerprint to confirm whether the second placed beacon has moved relative to the first placed beacon.

3. The method of claim 2 wherein determining the network fingerprint comprises determining a normalized weighted signal change index.

* * * * *

UNITED STATES PATENT AND TRADEMARK OFFICE
CERTIFICATE OF CORRECTION

PATENT NO. : 10,547,967 B2
APPLICATION NO. : 15/897854
DATED : January 28, 2020
INVENTOR(S) : Chen-Fu Liao and Max Donath It is certified that error appears in the above-identified patent and that said Letters Patent is hereby corrected as shown below:

In the Specification

Column 23, Line 15, Delete:

"
$$D_i = \begin{bmatrix} d_{i1}^1 & d_{i2}^1 & \cdots & d_{in}^1 \\ d_{i1}^2 & d_{i2}^2 & \cdots & d_{in}^2 \\ \vdots & \vdots & \ddots & \vdots \\ d_{i1}^m & d_{i2}^m & \cdots & d_{in}^m \end{bmatrix}$$

(5-10)

$$D_i = \begin{bmatrix} 1 & s_{i1}^1 & \cdots & s_{in}^1 \\ 1 & s_{i1}^2 & \cdots & s_{in}^2 \\ \vdots & \vdots & \ddots & \vdots \\ 1 & s_{i1}^m & \cdots & s_{in}^m \end{bmatrix}$$
"

And insert:

$$D_i = \begin{bmatrix} d_{i1}^1 & d_{i2}^1 & \cdots & d_{in}^1 \\ d_{i1}^2 & d_{i2}^2 & \cdots & d_{in}^2 \\ \vdots & \vdots & \ddots & \vdots \\ d_{i1}^m & d_{i2}^m & \cdots & d_{in}^m \end{bmatrix}$$

(5-10)

$$S_i = \begin{bmatrix} 1 & s_{i1}^1 & \cdots & s_{in}^1 \\ 1 & s_{i1}^2 & \cdots & s_{in}^2 \\ \vdots & \vdots & \ddots & \vdots \\ 1 & s_{i1}^m & \cdots & s_{in}^m \end{bmatrix}$$

--  --

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*

Column 23, Line 43, replace equation (5-14) with:

$$\partial(-\log(d_i)^T S_i W_i - W_i^T S_i^T \log(d_i) + W_i^T S_i^T S_i W_i)/\partial(W_i) = 0$$

Column 27, Line 41, replace equation (5-35) with:

$$S_n = \sum_{i=1}^{n} U_i$$

Column 28, Line 49, replace equation (5-39) with:

$$S_0^- = 0$$

Column 28, Line 51, replace equation (5-40) with:

$$S_n^- = \min(0, S_{n-1}^- + U_n + k)$$

In the Claims

Column 37 & 38, Line 16-12, Claim 1, delete:
"1. A method comprising:
    receiving from a mobile device respective signal strengths of signals received by a first placed beacon, separate from the mobile device, wherein the signals were received by the first placed beacon from a plurality of other placed beacons including from a second placed beacon and the signal strengths were stored on the first placed beacon and then the signal strengths were relayed through the mobile device when the mobile device came into a communication range of the first placed beacon;
    comparing the received signal strength of the signal received by the first placed beacon from the second placed beacon to a past signal strength for signals received by the first placed beacon from the second placed beacon; and
    using the comparison to indicate that the second placed beacon may have been moved relative to the first placed beacon."

And insert:
--1. A method comprising:
    receiving from a mobile device respective signal strengths of signals received by a first placed beacon, separate from the mobile device, wherein the signals were received by the first placed beacon from a plurality of other placed beacons including from a second placed beacon and the signal strengths were stored on the first placed beacon and then the signal strengths were relayed through the mobile device when the mobile device came into a communication range of the first placed beacon:
    comparing the received signal strength of the signal received by the first placed beacon from the second placed beacon to a past signal strength for signals received by the first placed beacon from the second placed beacon and;
    using the comparison to indicate that the second placed beacon may have been moved relative to the first placed beacon;
    wherein comparing the received signal strength to the past signal strength comprises determining a cumulative sum using the received signal strength and the past signal strength and wherein using the comparison to indicate that the second placed beacon may have been moved relative to the first placed beacon comprises comparing the cumulative sum to at least one threshold.--